US008237106B2

(12) United States Patent
Castro-Perez et al.

(10) Patent No.: US 8,237,106 B2
(45) **Date of Patent: *Aug. 7, 2012**

(54) MASS SPECTROMETER

(75) Inventors: Jose M. Castro-Perez, Walpole, MA (US); Jane Kirby, Alderley Edge (GB); John Philip Edward Shockcor, Milford, MA (US)

(73) Assignee: Micromass UK Limited, Manchester (GB)

( * ) Notice: Subject to any disclaimer, the term of this patent is extended or adjusted under 35 U.S.C. 154(b) by 800 days.

This patent is subject to a terminal disclaimer.

(21) Appl. No.: 12/299,996

(22) PCT Filed: May 10, 2007

(86) PCT No.: PCT/GB2007/001726

§ 371 (c)(1), (2), (4) Date: Mar. 30, 2009

(87) PCT Pub. No.: WO2007/129107

PCT Pub. Date: Nov. 15, 2007

(65) Prior Publication Data

US 2009/0302210 A1 Dec. 10, 2009

Related U.S. Application Data

(60) Provisional application No. 60/801,883, filed on May 19, 2006.

(30) Foreign Application Priority Data

May 10, 2006 (GB) .................................. 0609253.0

(51) Int. Cl.
*B01D 59/44* (2006.01)

(52) U.S. Cl. ........................................ 250/281; 250/282

(58) Field of Classification Search ........................ None
See application file for complete search history.

(56) References Cited

U.S. PATENT DOCUMENTS

| | | | |
|---|---|---|---|
| 4,851,669 | A | 7/1989 | Aberth |
| 5,073,713 | A | 12/1991 | Smith et al. |
| 5,298,743 | A | 3/1994 | Kato |
| 5,661,298 | A | 8/1997 | Bateman |

(Continued)

FOREIGN PATENT DOCUMENTS

EP 1043676 10/2000

(Continued)

OTHER PUBLICATIONS

Yost et al, "Tandem Quadrupole Mass Spectrometry", John Wiley & Sons, 1983, pp. 175-195, Ch. 8.

(Continued)

*Primary Examiner* — David A Vanore
*Assistant Examiner* — Andrew Smyth
(74) *Attorney, Agent, or Firm* — Diederiks & Whitelaw PLC

(57) ABSTRACT

A mass spectrometer comprising a collision, fragmentation or reaction cell (4) is disclosed. The collision, fragmentation or reaction cell (4) is repeatedly switched back and forth between a high fragmentation mode of operation and a low fragmentation mode of operation. Mass spectral data sets are obtained in both modes of operation. A decimal mass filter is applied to one or both sets of data. In particular, fragment ions or metabolites related to a parent or precursor ion of interest are identified on the basis of having a decimal mass which is similar to that of the parent or precursor ion of interest.

15 Claims, 18 Drawing Sheets

U.S. PATENT DOCUMENTS

| | | | | |
|---|---|---|---|---|
| 5,744,798 | A | 4/1998 | Kato | |
| 5,885,841 | A | 3/1999 | Higgs, Jr. et al. | |
| 5,910,655 | A | 6/1999 | Skilling | |
| 6,002,130 | A | 12/1999 | Kato | |
| 6,087,657 | A | 7/2000 | Kato | |
| 6,107,623 | A | 8/2000 | Bateman et al. | |
| 6,204,500 | B1 | 3/2001 | Whitehouse et al. | |
| 6,323,482 | B1 | 11/2001 | Clemmer et al. | |
| 6,331,702 | B1 | 12/2001 | Krutchinsky et al. | |
| 6,489,121 | B1 | 12/2002 | Skilling | |
| 6,489,608 | B1 | 12/2002 | Skilling | |
| 6,586,727 | B2 | 7/2003 | Bateman et al. | |
| 6,717,130 | B2 * | 4/2004 | Bateman et al. | 250/282 |
| 6,794,640 | B2 | 9/2004 | Bateman et al. | |
| 6,835,927 | B2 | 12/2004 | Becker et al. | |
| 6,982,414 | B2 | 1/2006 | Bateman et al. | |
| 7,112,784 | B2 | 9/2006 | Bateman et al. | |
| 7,202,473 | B2 | 4/2007 | Bateman et al. | |
| 7,365,309 | B2 | 4/2008 | Denny | |
| 7,417,226 | B2 | 8/2008 | Bajic et al. | |
| 7,473,892 | B2 * | 1/2009 | Sano et al. | 250/281 |
| 7,595,484 | B2 * | 9/2009 | Yokosuka et al. | 250/282 |
| 7,683,314 | B2 * | 3/2010 | Green et al. | 250/288 |
| 7,759,638 | B2 | 7/2010 | Makarov | |
| 7,928,363 | B2 * | 4/2011 | Bateman | 250/283 |
| 2001/0052569 | A1 * | 12/2001 | Bateman et al. | 250/288 |
| 2002/0053545 | A1 | 5/2002 | Greef | |
| 2002/0063206 | A1 | 5/2002 | Bateman et al. | |
| 2002/0115056 | A1 | 8/2002 | Goodlett et al. | |
| 2002/0119490 | A1 | 8/2002 | Aebersold et al. | |
| 2004/0041091 | A1 | 3/2004 | Bateman et al. | |
| 2004/0155180 | A1 | 8/2004 | Zubarev | |
| 2004/0188603 | A1 | 9/2004 | Bateman et al. | |
| 2005/0092910 | A1 | 5/2005 | Geromanos et al. | |
| 2005/0199804 | A1 | 9/2005 | Hunt et al. | |
| 2006/0169889 | A1 * | 8/2006 | Yokosuka et al. | 250/288 |
| 2007/0114439 | A1 | 5/2007 | Bajic et al. | |
| 2007/0284521 | A1 * | 12/2007 | Green et al. | 250/283 |
| 2008/0135746 | A1 * | 6/2008 | Wildgoose et al. | 250/283 |
| 2008/0224033 | A1 | 9/2008 | Makarov | |
| 2009/0065690 | A1 | 3/2009 | Bateman | |
| 2009/0206248 | A1 | 8/2009 | Makarov et al. | |
| 2009/0272895 | A1 | 11/2009 | Makarov | |

FOREIGN PATENT DOCUMENTS

| | | |
|---|---|---|
| EP | 1047107 | 10/2000 |
| EP | 1598666 | 11/2005 |
| GB | 2300967 | 11/1996 |
| GB | 2363249 | 12/2001 |
| GB | 2364168 | 1/2002 |
| GB | 2391699 | 2/2004 |
| GB | 2392303 | 2/2004 |
| GB | 2394545 | 4/2004 |
| GB | 2405991 | 8/2005 |
| WO | 02/096540 | 12/2002 |
| WO | 03/095978 | 11/2003 |
| WO | 03/102545 | 12/2003 |
| WO | 2004/049385 | 10/2004 |
| WO | 2005/114930 | 12/2005 |
| WO | 2006/003429 | 1/2006 |

OTHER PUBLICATIONS

Huang et al, "Characterization of Cyclodextrins Using Ion-evaporation Atmospheric-pressure Ionization Tandem Mass Spectrometry", Rapid Communications in Mass Spectrometry, 1990, pp. 467-471, vol. 4, No. 11.

Morris et al, "A Novel Geometry Mass Spectrometer, the Q-TOF, for Low-Femtomole/Attomole-Range Biopolymer Sequencing", Journal of Protein Chemistry, 1997, pp. 469-479, vol. 16, No. 5.

Morris et al, "High Sensitivity Collisionally-activated Decomposition Tandem Mass Spectrometry on a Novel Quadrupole/Orthogonal-acceleration Time-of-flight Mass Spectrometer", Rapid Communications in Mass Spectrometry, 1996, pp. 889-896, vol. 10.

Borchers et al, "Preliminary comparison of precursor scans and liquid chromatography-tandem mass spectrometry on a hybrid quadrupole time-of-flight mas spectrometer", Journal of Chromatography, 1999, pp. 119-130, vol. 854.

Charlwood et al, "Structural Characterisation of N-Linked Glycan Mixtures by Precursor Ion Scanning and Tandem Mass Spectrometric Analysis", Rapid Communications in Mass Spectrometry, 1999, pp. 1522-1530, vol. 13.

Hopfgartner et al, "Exact Mass Measurement of Product Ions for the Structural Elucidation of Drug Metabolites with a Tandem Quadrupole Orthogonal-Acceleration Time-of-Flight Mass Spectrometer", Journal of American Society for Mass Spectrometry, 1999, pp. 1305-1314, vol. 10.

Gulcicek et al, "Structural Elucidation in the Millisecond Time Frame Using Fast In-Source CID API Time-of-Flight MS", ASMS Conference 1998 Book of Abstracts, pp. 891.

De Hoffman, Edmond, "Tandem Mass Spectrometry: a Primer", Journal of Mass Spectrometry, 1995, pp. 129-137, vol. 31.

Kang H D et al: "Radical detection in a methane plasma", J. Vac. Sci. Technol. A vol. 21, No. 6, Nov./Dec. 2003, pp. 1978-1980, XP007900816.

Preuss, R. et al: "Quantitative analysis of multicomponent mass spectra", AIP Conference Proceedings AIP USA, No. 617, 2002, pp. 155-162, XP007900817.

Hellerstein, M. K. et al: "Mass isotopomer distribution analysis at eight years: theoretical, analytic and experimental considerations", American Physiology:, vol. 276, No. 39, 1999, pp. E1146-E1170, XP002978087.

Bylund, D. et al: "Chromatographic alignment by warping and dynamic programming as a pre-processing tool for PARAFAC modelling of liquid chromatography-mass spectrometry data", J. of Chromatography A, 961, No. 2, Jul. 5, 2002, pp. 237-244, XP004370624.

Jain, A. K. et al: "Statistical Pattern Recognition: A Review", IEEE Transactions on Pattern Analysis and Machine Intelligence, IEEE Service Center, Los Alamitos, CA, US, vol. 22, No. 1, Jan. 2000, pp. 4-37, XP000936788, ISSN: 0162-8828, pp. 29-31.

* cited by examiner

Midazolam Parent Drug

Midazolam Hydroxylated Metabolite

Ketotifen

M+H = 310.1260

M+H = 326.1209

Verapamil

M+H = 455.2910

M+H = 617.3074

Indinavir

M+H = 614.3706

M+H = 277.2029

MASS SPECTROMETER

CROSS REFERENCE TO RELATED APPLICATIONS

This application is the National Stage of International Application No. PCT/GB2007/001726, filed on May 10, 2007, which claims priority to and benefit of United Kingdom Application Ser. No. 0609253.0, filed May 10, 2006, and U.S. Provisional Application Ser. No. 60/801,883, filed on May 19, 2006. The entire contents of these applications are incorporated herein by reference.

The present invention relates to a method of mass spectrometry and a mass spectrometer.

Tandem mass spectrometry (MS/MS) is the name given to the method of mass spectrometry wherein parent or precursor ions generated from a sample are selected by a first mass filter/analyser and are then passed to a collision cell. The ions are then fragmented by collisions with neutral gas molecules to yield daughter (or "product") ions. The fragment or daughter ions are then mass analysed by a second mass filter/analyser, and the resulting fragment or daughter ion spectra can be used to determine the structure and hence identity of the parent (or "precursor") ion. Tandem mass spectrometry is particularly useful for the analysis of complex mixtures such as biomolecules since it avoids the need for chemical clean-up prior to mass spectral analysis.

A particular form of tandem mass spectrometry referred to as parent or precursor ion scanning is known wherein in a first step the second mass filter/analyser is arranged to act as a mass filter so that it will only transmit and detect fragment or daughter ions having a specific mass to charge ratio. The specific mass to charge ratio is set so as to correspond with the mass to charge ratio of fragment or daughter ions which are known to be characteristic products which result from the fragmentation of a particular parent or precursor ion or type of parent or precursor ion. The first mass filter/analyser upstream of the collision cell is then scanned whilst the second mass filter/analyser remains fixed to monitor for the presence of fragment or daughter ions having the specific mass to charge ratio. The parent or precursor ion mass to charge ratios which yield the characteristic fragment or daughter ions can then be determined. As a second step, a complete fragment or daughter ion spectrum for each of the parent or precursor ion mass to charge ratios which produce characteristic fragment or daughter ions may then be obtained by operating the first mass filter/analyser so that it selects parent or precursor ions having a particular mass to charge ratio and scanning the second mass filter/analyser to record the resulting full fragment or daughter ion spectrum. This can then be repeated for the other parent or precursor ions of interest. Parent ion scanning is useful when it is not possible to identify parent or precursor ions in a direct mass spectrum due to the presence of chemical noise, which is frequently encountered, for example, in the Electrospray mass spectra of biomolecules.

Triple quadrupole mass spectrometers having a first quadrupole mass filter/analyser, a quadrupole collision cell into which a collision gas is introduced, and a second quadrupole mass filter/analyser are well known.

Another type of mass spectrometer (a hybrid quadrupole-Time of Flight mass spectrometer) is known wherein the second quadrupole mass filter/analyser is replaced by an orthogonal acceleration Time of Flight mass analyser.

As will be shown below, these types of mass spectrometers when used to perform conventional methods of parent or precursor ion scanning and subsequently obtaining a fragment or daughter ion spectrum of a candidate parent or precursor ion suffer from low duty cycles which render them unsuitable for use in applications which require a higher duty cycle such as on-line chromatography applications.

Quadrupoles have a duty cycle of approximately 100% when being used as a mass filter, but their duty cycle drops to around 0.1% when then are used in a scanning mode as a mass analyser, for example, to mass analyse a mass range of 500 mass units with peaks one mass unit wide at their base. orthogonal acceleration Time of Flight analysers typically have a duty cycle within the range 1-20% depending upon the relative mass to charge values of the different ions in the spectrum. However, the duty cycle remains the same irrespective of whether the Time of Flight analyser is being used as a mass filter to transmit ions having a particular mass to charge ratio, or whether the Time of Flight analyser is being used to record a full mass spectrum. This is due to the nature of operation of Time of Flight analysers. When used to acquire and record a fragment or daughter ion spectrum the duty cycle of a Time of Flight analyser is typically around 5%.

To a first approximation the conventional duty cycle when seeking to discover candidate parent or precursor ions using a triple quadrupole mass spectrometer is approximately 0.1% (the first quadrupole mass filter/analyser is scanned with a duty cycle of 0.1% and the second quadrupole mass filter/analyser acts as a mass filter with a duty cycle of 100%). The duty cycle when then obtaining a fragment or daughter ion spectrum for a particular candidate parent or precursor ion is also approximately 0.1% (the first quadrupole mass filter/analyser acts as a mass filter with a duty cycle of 100%, and the second quadrupole mass filter/analyser is scanned with a duty cycle of approximately 0.1%). The resultant duty cycle therefore of discovering a number of candidate parent or precursor ions and producing a daughter spectrum of one of the candidate parent or precursor ions is approximately 0.1%/2 (due to a two stage process with each stage having a duty cycle of 0.1%)=0.05%.

The duty cycle of a quadrupole-Time of Flight mass spectrometer for discovering candidate parent or precursor ions is approximately 0.005% (the quadrupole is scanned with a duty cycle of approximately 0.1% and the Time of Flight analyser acts a mass filter with a duty cycle of approximately 5%). Once candidate parent or precursor ions have been discovered, a fragment or daughter ion spectrum of a candidate parent or precursor ion can be obtained with an duty cycle of 5% (the quadrupole acts as a mass filter with a duty cycle of approximately 100% and the Time of Flight analyser is scanned with a duty cycle of 5%). The resultant duty cycle therefore of discovering a number of candidate parent or precursor ions and producing a daughter spectrum of one of the candidate parent or precursor ions is approximately 0.005% (since 0.005%<<5%).

As can be seen, a triple quadrupole has approximately an order higher duty cycle than a quadrupole-Time of Flight mass spectrometer for performing conventional methods of parent or precursor ion scanning and obtaining confirmatory fragment or daughter ion spectra of discovered candidate parent or precursor ions. However, such duty cycles are not high enough to be used practically and efficiently for analysing real time data which is required when the source of ions is the eluent from a chromatography device.

Electrospray and Laser Desorption techniques have made it possible to generate molecular ions having very high molecular weights and Time of Flight mass analysers are advantageous for the analysis of such large mass biomolecules by virtue of their high efficiency at recording a full mass spectrum. They also have a high resolution and mass accuracy.

Other forms of mass analysers such as quadrupole ion traps are similar in some ways to Time of Flight analysers in that like Time of Flight analysers, they can not provide a continuous output and hence have a low efficiency if used as a mass filter to continuously transmit ions which is an important feature of the conventional methods of parent or precursor ion scanning. Both Time of Flight mass analysers and quadrupole ion traps may be termed "discontinuous output mass analysers".

It is desired to provide an improved method of mass spectrometry and an improved mass spectrometer.

According to an aspect of the present invention there is provided a method of mass spectrometry comprising the steps of:

(a) passing parent or precursor ions to a collision, fragmentation or reaction device;

(b) operating the collision, fragmentation or reaction device in a first mode of operation wherein at least some of the parent or precursor ions are collided, fragmented or reacted to produce fragment, product, daughter or adduct ions;

(c) recording first mass spectral data relating to ions emerging from or which have been transmitted through the collision, fragmentation or reaction device operating in the first mode of operation;

(d) switching, altering or varying the collision, fragmentation or reaction device to operate in a second mode of operation wherein substantially fewer parent or precursor ions are collided, fragmented or reacted;

(e) recording second mass spectral data relating to ions emerging from or which have been transmitted through the collision, fragmentation or reaction device operating in the second mode of operation;

(f) repeating steps (b)-(e) a plurality of times;

(g) determining the accurate or exact mass or mass to charge ratio of one or more parent or precursor substances or ions, wherein the accurate or exact mass or mass to charge ratio of the one or more parent or precursor substances or ions comprise a first integer nominal mass or mass to charge ratio component $M_1$ and a first decimal mass or mass to charge ratio component $m_1$; and (h) searching for or determining one or more fragment, product, daughter or adduct substances or ions in or from the first mass spectral data, wherein the one or more fragment, product, daughter or adduct substances or ions comprise a second integer nominal mass or mass to charge ratio component $M_2$ and a second decimal mass or mass to charge ratio component $m_2$, wherein the second decimal mass or mass to charge ratio component $m_2$ is between 0 to $x_1$ mDa or milli-mass to charge ratio units greater than the first decimal mass or mass to charge ratio component $m_1$ and/or between 0 to $x_2$ mDa or milli-mass to charge ratio units less than the first decimal mass or mass to charge ratio component $m_1$.

According to an embodiment the one or more parent or precursor substances or ions may comprise or relate to a pharmaceutical compound, drug or active component. According to another embodiment the one or more parent or precursor substances or ions may comprise or relate to one or more metabolites or derivatives of a pharmaceutical compound, drug or active element.

The one or more parent or precursor substances or ions may comprise or relate to a biopolymer, protein, peptide, polypeptide, oligionucleotide, oligionucleoside, amino acid, carbohydrate, sugar, lipid, fatty acid, vitamin, hormone, portion or fragment of DNA, portion or fragment of cDNA, portion or fragment of RNA, portion or fragment of mRNA, portion or fragment of tRNA, polyclonal antibody, monoclonal antibody, ribonuclease, enzyme, metabolite, polysaccharide, phosphorolated peptide, phosphorolated protein, glycopeptide, glycoprotein or steroid.

The step of searching for or determining one or more fragment, product, daughter or adduct substances or ions preferably comprises searching for or determining solely on the basis of the decimal mass or mass to charge ratio component of the one or more fragment, product, daughter or adduct substances or ions and not on the basis of the integer nominal mass or mass to charge ratio component of the one or more fragment, product, daughter or adduct substances or ions.

The step of searching for or determining one or more fragment, product, daughter or adduct substances or ions preferably comprises searching for or determining some or all fragment, product, daughter or adduct substances or ions which have a second integer nominal mass or mass to charge ratio component $M_2$ which is different from the first integer nominal mass or mass to charge ratio component $M_1$.

The step of searching for or determining one or more fragment, product, daughter or adduct substances or ions further preferably comprises applying a decimal mass or mass to charge ratio window to the first mass spectral data or a mass spectrum. The decimal mass or mass to charge ratio window preferably filters out, removes, attenuates or at least reduces the significance of fragment, product, daughter or adduct substances or ions having a decimal mass or mass to charge ratio component which falls outside of the decimal mass or mass to charge ratio window.

The first integer nominal mass or mass to charge ratio $M_1$ minus the second integer nominal mass or mass to charge ratio $M_2$ preferably has a value of ΔM Daltons or mass to charge ratio units.

According to an embodiment $x_1$ and/or $x_2$ may be arranged to remain substantially constant as a function of ΔM.

According to another embodiment $x_1$ and/or $x_2$ may be arranged to vary as a function of ΔM. For example, $x_1$ and/or $x_2$ may be arranged to vary as a function of ΔM in a symmetrical, asymmetrical, linear, non-linear, curved or stepped manner. According to an embodiment $x_1$ and/or $x_2$ may be arranged to vary as a function of ΔM in a symmetrical manner about a value of ΔM selected from the group consisting of: (i) 0; (ii)±0-5; (iii)±5-10; (iv)±10-15; (v)±15-20; (vi)±20-25; (vii)±25-30; (viii)±30-35; (ix)±35-40; (x)±40-45; (xi)±45-50; (xii)±50-55; (xiii)±55-60; (xiv)±60-65; (xv)±65-70; (xvi) ±70-75; (xvii)±75-80; (xviii)±80-85; (xix)±85-90; (xx)±90-95; (xxi)±95-100; (xxii)>100; and (xxiii)<−100.

According to an embodiment $x_1$ and/or $x_2$ may be arranged to increase or decrease at a rate of y % *ΔM, wherein y is selected from the group consisting of: (i)<0.01; (ii) 0.01-0.02; (iii) 0.02-0.03; (iv) 0.03-0.04; (v) 0.04-0.05; (vi) 0.05-0.06; (viii) 0.06-0.07; (ix) 0.07-0.08; (x) 0.08-0.09; (xi) 0.09-0.10; (xii) 0.10-0.11; (xiii) 0.11-0.12; (xiv) 0.12-0.13; (xv) 0.13-0.14; (xvi) 0.14-0.15; (xvii) 0.15-0.16; (xviii) 0.16-0.17; (xix) 0.17-0.18; (xx) 0.18-0.19; (xxi) 0.19-0.20; and (xxii) >0.20.

According to an embodiment if $\Delta M<M_{lower}$ and/or $\Delta M>M_{lower}$ and/or $\Delta M<M_{upper}$ and/or $\Delta M>M_{upper}$ then $x_1$ and/or $x_2$ is arranged to have a substantially constant value.

According to an embodiment if $\Delta M<M_{lower}$ and/or $\Delta M>M_{lower}$ and/or $\Delta M<M_{upper}$ and/or $\Delta M>M_{upper}$ then $x_1$ and/or $x_2$ is arranged to vary as a function of ΔM. Preferably, if $\Delta M<M_{lower}$ and/or $\Delta M>M_{lower}$ and/or $\Delta M<M_{upper}$ and/or $\Delta M>M_{upper}$ then $x_1$ and/or $x_2$ is arranged to vary as a function of ΔM in a symmetrical, asymmetrical, linear, non-linear, curved or stepped manner.

According to an embodiment $x_1$ and/or $x_2$ may be arranged to vary as a function of ΔM in a symmetrical manner about a value of ΔM selected from the group consisting of: (i) 0; (ii)±0-5; (iii)±5-10; (iv)±10-15; (v)±15-20; (vi)±20-25; (vii) ±25-30; (viii)±30-35; (ix)±35-40; (x)±40-45; (xi)±45-50; (xii)±50-55; (xiii)±55-60; (xiv)±60-65; (xv)±65-70; (xvi) ±70-75; (xvii)±75-80; (xviii)±80-85; (xix)±85-90; (xx)±90-95; (xxi)±95-100; (xxii)>100; and (xxiii)<−100.

According to an embodiment if $\Delta M<M_{lower}$ and/or $\Delta M>M_{lower}$ and/or $\Delta M<M_{upper}$ and/or $\Delta M>M_{upper}$ then $x_1$ and/or $x_2$ is arranged to increase or decrease at a rate of y % *ΔM, wherein y is selected from the group consisting of: (i)<0.01; (ii) 0.01-0.02; (iii) 0.02-0.03; (iv) 0.03-0.04; (v) 0.04-0.05; (vi) 0.05-0.06; (viii) 0.06-0.07; (ix) 0.07-0.08; (x) 0.08-0.09; (xi) 0.09-0.10; (xii) 0.10-0.11; (xiii) 0.11-0.12; (xiv) 0.12-0.13; (xv) 0.13-0.14; (xvi) 0.14-0.15; (xvii) 0.15-0.16; (xviii) 0.16-0.17; (xix) 0.17-0.18; (xx) 0.18-0.19; (xxi) 0.19-0.20; and (xxii)>0.20.

Preferably, $M_{upper}$ is a value in Daltons or mass to charge ratio units and falls within a range selected from the group consisting of: (i)<1; (ii) 1-5; (iii) 5-10; (iv) 10-15; (v) 15-20; (vi) 20-25; (vii) 25-30; (viii) 30-35; (ix) 35-40; (x) 40-45; (xi) 45-50; (xii) 50-55; (xiii) 55-60; (xiv) 60-65; (xv) 65-70; (xvi) 70-75; (xvii) 75-80; (xviii) 80-85; (xix) 85-90; (xx) 90-95; (xxi) 95-100; and (xxii)>100.

Preferably, $M_{lower}$ is a value in Daltons or mass to charge ratio units and falls within a range selected from the group consisting of: (i)<−100; (ii) −100 to −95; (iii) −95 to −90; (iv) −90 to −85; (v) −85 to −80; (vi) −80 to −75; (vii) −75 to −70; (viii) −70 to −65; (ix) −65 to −60; (x) −60 to −55; (xi) −55 to −50; (xii) −50 to −45; (xiii) −45 to −40; (xiv) −40 to −35; (xv) −35 to −30; (xvi) −30 to −25; (xvii) −25 to −20; (xviii) −20 to −15; (xix) −15 to −10; (xx) −10 to −5; (xxi) −5 to −1; and (xxii)>−1.

Preferably, $x_1$ and/or $x_2$ is arranged to remain substantially constant as a function of $M_1$ and/or $M_2$.

According to an embodiment $x_1$ and/or $x_2$ may be arranged to vary as a function of $M_1$ and/or $M_2$. Preferably, $x_1$ and/or $x_2$ is arranged to vary as a function of $M_1$ and/or $M_2$ in a symmetrical, asymmetrical, linear, non-linear, curved or stepped manner.

According to an embodiment the decimal mass window which is preferably applied to mass spectral data has an upper threshold $x_1$ and a lower threshold $x_2$. The upper and lower thresholds $x_1$, $x_2$ are preferably about a central decimal mass value which preferably varies as a function of absolute mass. For ions having an absolute mass $M_2$ which is close to $M_1$ then the central decimal mass value is preferably close to $m_1$. For ions having an absolute mass $M_2$ which is relatively small (i.e. begins to approach zero) then the central decimal mass value preferably approaches zero.

According to an embodiment, $x_1$ and/or $x_2$ may be arranged to vary as a function of $M_1$ and/or $M_2$ in a symmetrical manner about a value of $M_1$ and/or $M_2$ selected from the group consisting of: (i) 0-50; (ii) 50-100; (iii) 100-150; (iv) 150-200; (v) 200-250; (vi) 250-300; (vii) 300-350; (viii) 350-400; (ix) 400-450; (x) 450-500; (xi) 500-550; (xii) 550-600; (xiii) 600-650; (xiv) 650-700; (xv) 700-750; (xvi) 750-800; (xvii) 800-850; (xviii) 850-900; (xix) 900-950; (xx) 950-1000; and (xxi) >1000.

According to an embodiment $x_1$ and/or $x_2$ may be arranged to increase or decrease at a rate of y % *$M_1$ and/or y % *$M_2$, wherein y is selected from the group consisting of: (i)<0.01; (ii) 0.01-0.02; (iii) 0.02-0.03; (iv) 0.03-0.04; (v) 0.04-0.05; (vi) 0.05-0.06; (viii) 0.06-0.07; (ix) 0.07-0.08; (x) 0.08-0.09; (xi) 0.09-0.10; (xii) 0.10-0.11; (xiii) 0.11-0.12; (xiv) 0.12-0.13; (xv) 0.13-0.14; (xvi) 0.14-0.15; (xvii) 0.15-0.16; (xviii) 0.16-0.17; (xix) 0.17-0.18; (xx) 0.18-0.19; (xxi) 0.19-0.20; and (xxii)>0.20.

According to an embodiment, if $M_1<M_{lower}$ and/or $M_1>M_{lower}$ and/or $M_1<M_{upper}$ and/or $M_1>M_{upper}$ and/or $M_2<M_{lower}$ and/or $M_2>M_{lower}$ and/or $M_2<M_{upper}$ and/or $M_2>M_{upper}$ then $x_1$ and/or $x_2$ is arranged to have a substantially constant value.

According to an embodiment, if $M_1<M_{lower}$ and/or $M_1>M_{lower}$ and/or $M_1<M_{upper}$ and/or $M_1>M_{upper}$ and/or $M_2<M_{lower}$ and/or $M_2>M_{lower}$ and/or $M_2<M_{upper}$ and/or $M_2>M_{upper}$ then $x_1$ and/or $x_2$ is arranged to vary as a function of $M_1$ and/or $M_2$. Preferably, if $M_1<M_{lower}$ and/or $M_1>M_{lower}$ and/or $M_1<M_{upper}$ and/or $M_1>M_{upper}$ and/or $M_2<M_{lower}$ and/or $M_2>M_{lower}$ and/or $M_2<M_{upper}$ and/or $M_2>M_{upper}$ then $x_1$ and/or $x_2$ is arranged to vary as a function of $M_1$ and/or $M_2$ in a symmetrical, asymmetrical, linear, non-linear, curved or stepped manner.

According to an embodiment $x_1$ and/or $x_2$ may be arranged to vary as a function of $M_1$ and/or $M_2$ in a symmetrical manner about a value of $M_1$ and/or $M_2$ selected from the group consisting of: (i) 0-50; (ii) 50-100; (iii) 100-150; (iv) 150-200; (v) 200-250; (vi) 250-300; (vii) 300-350; (viii) 350-400; (ix) 400-450; (x) 450-500; (xi) 500-550; (xii) 550-600; (xiii) 600-650; (xiv) 650-700; (xv) 700-750; (xvi) 750-800; (xvii) 800-850; (xviii) 850-900; (xix) 900-950; (xx) 950-1000; and (xxi) >1000.

Preferably, if $M_1<M_{lower}$ and/or $M_1>M_{lower}$ and/or $M_1<M_{upper}$ and/or $M_1>M_{upper}$ and/or $M_2<M_{lower}$ and/or $M_2>M_{lower}$ and/or $M_2<M_{upper}$ and/or $M_2>M_{upper}$ then $x_1$ and/or $x_2$ is arranged to increase or decrease at a rate of y % *$M_1$ or y % *$M_2$, wherein y is selected from the group consisting of: (i)<0.01; (ii) 0.01-0.02; (iii) 0.02-0.03; (iv) 0.03-0.04; (v) 0.04-0.05; (vi) 0.05-0.06; (viii) 0.06-0.07; (ix) 0.07-0.08; (x) 0.08-0.09; (xi) 0.09-0.10; (xii) 0.10-0.11; (xiii) 0.11-0.12; (xiv) 0.12-0.13; (xv) 0.13-0.14; (xvi) 0.14-0.15; (xvii) 0.15-0.16; (xviii) 0.16-0.17; (xix) 0.17-0.18; (xx) 0.18-0.19; (xxi) 0.19-0.20; and (xxii)>0.20.

Preferably, $M_{upper}$ is a value in Daltons or mass to charge ratio units and falls within a range selected from the group consisting of: (i) 0-50; (ii) 50-100; (iii) 100-150; (iv) 150-200; (v) 200-250; (vi) 250-300; (vii) 300-350; (viii) 350-400; (ix) 400-450; (x) 450-500; (xi) 500-550; (xii) 550-600; (xiii) 600-650; (xiv) 650-700; (xv) 700-750; (xvi) 750-800; (xvii) 800-850; (xviii) 850-900; (xix) 900-950; (xx) 950-1000; and (xxi)>1000.

Preferably, $M_{lower}$ is a value in Daltons or mass to charge ratio units and falls within a range selected from the group consisting of: (i) 0-50; (ii) 50-100; (iii) 100-150; (iv) 150-200; (v) 200-250; (vi) 250-300; (vii) 300-350; (viii) 350-400; (ix) 400-450; (x) 450-500; (xi) 500-550; (xii) 550-600; (xiii) 600-650; (xiv) 650-700; (xv) 700-750; (xvi) 750-800; (xvii) 800-850; (xviii) 850-900; (xix) 900-950; (xx) 950-1000; and (xxi)>1000.

According to an embodiment the method further comprises selecting for further analysis either:

(i) one or more second substances or ions which have a decimal mass or mass to charge ratio component which is between 0 to $x_1$ mDa or milli-mass to charge ratio units greater than the first decimal mass or mass to charge ratio component $m_1$ and/or between 0 to $x_2$ mDa or milli-mass to charge ratio units less than the first decimal mass or mass to charge ratio component $m_1$; and/or (ii) one or more second substances or ions which when collided, fragmented or reacted produce one or more fragment, product, daughter or adduct substances or ions which have a decimal mass or mass to charge ratio component which is between 0 to $x_1$ mDa or milli-mass to charge ratio units greater than the first decimal mass or mass to charge ratio component $m_1$ and/or between 0 to $x_2$ mDa or milli-mass to charge ratio units less than the first decimal mass or mass to charge ratio component $m_1$.

The step of selecting for further analysis preferably comprises fragmenting the one or more second substances or ions.

The step of selecting for further analysis preferably comprises onwardly transmitting the one or more second substances or ions which have a decimal mass or mass to charge ratio component which is between 0 to $x_1$ mDa or milli-mass to charge ratio units greater than the first decimal mass or mass to charge ratio component $m_1$ and/or between 0 to $x_2$ mDa or milli-mass to charge ratio units less than the first decimal mass or mass to charge ratio component $m_1$ to a collision, fragmentation or reaction device.

According to another aspect of the present invention there is provided a method of mass spectrometry comprising the steps of:

(a) passing parent or precursor ions to a collision, fragmentation or reaction device;

(b) operating the collision, fragmentation or reaction device in a first mode of operation wherein at least some of the parent or precursor ions are collided, fragmented or reacted to produce fragment, product, daughter or adduct ions;

(c) recording first mass spectral data relating to ions emerging from or which have been transmitted through the collision, fragmentation or reaction device operating in the first mode of operation;

(d) switching, altering or varying the collision, fragmentation or reaction device to operate in a second mode of operation wherein substantially fewer parent or precursor ions are collided, fragmented or reacted;

(e) recording second mass spectral data relating to ions emerging from or which have been transmitted through the collision, fragmentation or reaction device operating in the second mode of operation;

(f) repeating steps (b)-(e) a plurality of times;

(g) determining the accurate or exact mass or mass to charge ratio of one or more first parent or precursor substances or ions, wherein the accurate or exact mass or mass to charge ratio of the one or more first parent or precursor substances or ions comprises a first integer nominal mass or mass to charge ratio component $M_1$ and a first decimal mass or mass to charge ratio component $m_1$; and (h) searching for or determining one or more second parent or precursor substances or ions in or from the first mass spectral data, wherein the one or more second parent or precursor substances or ions comprise a second integer nominal mass or mass to charge ratio component $M_2$ and a second decimal mass or mass to charge ratio component $m_2$, and wherein the second decimal mass or mass to charge ratio component $m_2$ is between 0 to $x_1$ mDa or milli-mass to charge ratio units greater than the first decimal mass or mass to charge ratio component $m_1$ and/or between 0 to $x_2$ mDa or milli-mass to charge ratio units less than the first decimal mass or mass to charge ratio component $m_1$.

According to an embodiment the first and/or second parent or precursor substances or ions preferably comprise or relate to a pharmaceutical compound, drug or active component.

According to an embodiment the first and/or second parent or precursor substances or ions preferably comprise or relate to one or more metabolites or derivatives of a pharmaceutical compound, drug or active component.

The first and/or second parent or precursor substances or ions preferably comprise or relate to a biopolymer, protein, peptide, polypeptide, oligionucleotide, oligionucleoside, amino acid, carbohydrate, sugar, lipid, fatty acid, vitamin, hormone, portion or fragment of DNA, portion or fragment of cDNA, portion or fragment of RNA, portion or fragment of mRNA, portion or fragment of tRNA, polyclonal antibody, monoclonal antibody, ribonuclease, enzyme, metabolite, polysaccharide, phosphorolated peptide, phosphorolated protein, glycopeptide, glycoprotein or steroid.

The step of searching for or determining one or more second parent or precursor substances or ions preferably comprises searching solely on the basis of the second decimal mass or mass to charge ratio component $m_2$ and not on the basis of the second integer nominal mass or mass to charge ratio component $M_2$.

The step of searching for or determining one or more second parent or precursor substances or ions preferably comprises searching for or determining some or all second parent or precursor substances or ions which have a second integer nominal mass or mass to charge ratio component $M_2$ which is different from the first integer nominal mass or mass to charge ratio component $M_1$.

The step of searching for or determining one or more second parent or precursor substances or ions preferably further comprises applying a decimal mass or mass to charge ratio window to the first mass spectral data and/or the second mass spectral data and/or a mass spectrum. The decimal mass or mass to charge ratio window preferably filters out, removes, attenuates or at least reduces the significance of second parent or precursor substances or ions having a second decimal mass or mass to charge ratio component $m_2$ which falls outside of the decimal mass or mass to charge ratio window.

The first integer nominal mass or mass to charge ratio $M_1$ minus the second integer nominal mass or mass to charge ratio $M_2$ preferably has a value of $\Delta M$ Daltons or mass to charge ratio units.

According to an embodiment $x_1$ and/or $x_2$ are arranged to remain substantially constant as a function of $\Delta M$.

According to another embodiment $x_1$ and/or $x_2$ are arranged to vary as a function of $\Delta M$. Preferably, $x_1$ and/or $x_2$ is arranged to vary as a function of $\Delta M$ in a symmetrical, asymmetrical, linear, non-linear, curved or stepped manner. Preferably, $x_1$ and/or $x_2$ is arranged to vary as a function of $\Delta M$ in a symmetrical manner about a value of $\Delta M$ selected from the group consisting of: (i) 0; (ii) +0-5; (iii) +5-10; (iv)±10-15; (v)±15-20; (vi)±20-25; (vii)±25-30; (viii)±30-35; (ix)±35-40; (x)±40-45; (xi)±45-50; (xii)±50-55; (xiii) ±55-60; (xiv)±60-65; (xv)±65-70; (xvi)±70-75; (xvii)±75-80; (xviii)±80-85; (xix)±85-90; (xx)±90-95; (xxi)±95-100; (xxii)>100; and (xxiii)<−100.

According to an embodiment $x_1$ and/or $x_2$ are arranged to increase or decrease at a rate of y % *$\Delta M$, wherein y is selected from the group consisting of: (i)<0.01; (ii) 0.01-0.02; (iii) 0.02-0.03; (iv) 0.03-0.04; (v) 0.04-0.05; (vi) 0.05-0.06; (viii) 0.06-0.07; (ix) 0.07-0.08; (x) 0.08-0.09; (xi) 0.09-0.10; (xii) 0.10-0.11; (xiii) 0.11-0.12; (xiv) 0.12-0.13; (xv) 0.13-0.14;(xvi) 0.14-0.15; (xvii) 0.15-0.16; (xviii) 0.16-0.17; (xix) 0.17-0.18; (xx) 0.18-0.19; (xxi) 0.19-0.20; and (xxii)>0.20.

According to an embodiment, if $\Delta M<M_{lower}$ and/or $\Delta M>M_{lower}$ and/or $\Delta M<M_{upper}$ and/or $\Delta M>M_{upper}$ then $x_1$ and/or $x_2$ is arranged to have a substantially constant value.

According to an embodiment if $\Delta M<M_{lower}$ and/or $\Delta M>M_{lower}$ and/or $\Delta M<M_{upper}$ and/or $\Delta M>M_{upper}$ then $x_1$ and/or $x_2$ is arranged to vary as a function of $\Delta M$. Preferably, if $\Delta M<M_{lower}$ and/or $\Delta M>M_{lower}$ and/or $\Delta M<M_{upper}$ and/or $\Delta M>M_{upper}$ then $x_1$ and/or $x_2$ is arranged to vary as a function of $\Delta M$ in a symmetrical, asymmetrical, linear, non-linear, curved or stepped manner.

According to an embodiment $x_1$ and/or $x_2$ are arranged to vary as a function of ΔM in a symmetrical manner about a value of ΔM selected from the group consisting of: (i) 0; (ii)±0-5; (iii)±5-10; (iv)±10-15; (v)±15-20; (vi)±20-25; (vii) ±25-30; (viii)±30-35; (ix)±35-40; (x)±40-45; (xi)±45-50; (xii)±50-55; (xiii)±55-60; (xiv)±60-65; (xv)±65-70; (xvi) ±70-75; (xvii)±75-80; (xviii)±80-85; (xix)±85-90; (xx)±90-95; (xxi)±95-100; (xxii)>100; and (xxiii)<−100.

Preferably, if $\Delta M<M_{lower}$ and/or $\Delta M>M_{lower}$ and/or $\Delta M<M_{upper}$ and/or $\Delta M>M_{upper}$ then $x_1$ and/or $x_2$ is arranged to increase or decrease at a rate of y % *ΔM, wherein y is selected from the group consisting of: (i)<0.01; (ii) 0.01-0.02; (iii) 0.02-0.03; (iv) 0.03-0.04; (v) 0.04-0.05; (vi) 0.05-0.06; (viii) 0.06-0.07; (ix) 0.07-0.08; (x) 0.08-0.09; (xi) 0.09-0.10; (xii) 0.10-0.11; (xiii) 0.11-0.12; (xiv) 0.12-0.13; (xv) 0.13-0.14; (xvi) 0.14-0.15; (xvii) 0.15-0.16; (xviii) 0.16-0.17; (xix) 0.17-0.18; (xx) 0.18-0.19; (xxi) 0.19-0.20; and (xxii) >0.20.

Preferably, $M_{upper}$ is a value in Daltons or mass to charge ratio units and falls within a range selected from the group consisting of: (i)<1; (ii) 1-5; (iii) 5-10; (iv) 10-15; (v) 15-20; (vi) 20-25; (vii) 25-30; (viii) 30-35; (ix) 35-40; (x) 40-45; (xi) 45-50; (xii) 50-55; (xiii) 55-60; (xiv) 60-65; (xv) 65-70; (xvi) 70-75; (xvii) 75-80; (xviii) 80-85; (xix) 85-90; (xx) 90-95; (xxi) 95-100; and (xxii)>100.

Preferably, $M_{lower}$ is a value in Daltons or mass to charge ratio units and falls within a range selected from the group consisting of: (i)<−100; (ii) −100 to −95; (iii) −95 to −90; (iv) −90 to −85; (v) −85 to −80; (vi) −80 to −75; (vii) −75 to −70; (viii) −70 to −65; (ix) −65 to −60; (x) −60 to −55; (xi) −55 to −50; (xii) −50 to −45; (xiii) −45 to −40; (xiv) −40 to −35;(xv) −35 to −30; (xvi) −30 to −25; (xvii) −25 to −20; (xviii) −20 to −15; (xix) −15 to −10; (xx) −10 to −5; (xxi) −5 to −1; and (xxii)>−1.

According to an embodiment $x_1$ and/or $x_2$ are arranged to remain substantially constant as a function of $M_1$ and/or $M_2$.

According to an embodiment $x_1$ and/or $x_2$ are arranged to vary as a function of $M_1$ and/or $M_2$. Preferably, $x_1$ and/or $x_2$ is arranged to vary as a function of $M_1$ and/or $M_2$ in a symmetrical manner, asymmetrical, linear, non-linear, curved or stepped manner.

According to an embodiment the decimal mass window which is preferably applied to mass spectral data has an upper threshold $x_1$ and a lower threshold $x_2$. The upper and lower thresholds $x_1$, $x_2$ are preferably about a central decimal mass value which preferably varies as a function of absolute mass. For ions having an absolute mass $M_2$ which is close to $M_1$ then the central decimal mass value is preferably close to $m_1$. For ions having an absolute mass $M_2$ which is relatively small (i.e. begins to approach zero) then the central decimal mass value preferably approaches zero.

Preferably, $x_1$ and/or $x_2$ is arranged to vary as a function of $M_1$ and/or $M_2$ in a symmetrical manner about a value of $M_1$ and/or $M_2$ selected from the group consisting of: (i) 0-50; (ii) 50-100; (iii) 100-150; (iv) 150-200; (v) 200-250; (vi) 250-300; (vii) 300-350; (viii) 350-400; (ix) 400-450; (x) 450-500; (xi) 500-550; (xii) 550-600; (xiii) 600-650; (xiv) 650-700; (xv) 700-750; (xvi) 750-800; (xvii) 800-850; (xviii).850-900; (xix) 900-950; (xx) 950-1000; and (xxi)>1000.

According to an embodiment, $x_1$ and/or $x_2$ may be arranged to increase or decrease at a rate of y % *$M_1$ and/or y % *$M_2$, wherein y is selected from the group consisting of: (i)<0.01; (ii) 0.01-0.02; (iii) 0.02-0.03; (iv) 0.03-0.04; (v) 0.04-0.05; (vi) 0.05-0.06; (viii) 0.06-0.07; (ix) 0.07-0.08; (x) 0.08-0.09; (xi) 0.09-0.10; (xii) 0.10-0.11; (xiii) 0.11-0.12; (xiv) 0.12-0.13; (xv) 0.13-0.14; (xvi) 0.14-0.15; (xvii) 0.15-0.16; (xviii) 0.16-0.17; (xix) 0.17-0.18; (xx) 0.18-0.19; (xxi) 0.19-0.20; and (xxii)>0.20.

According to an embodiment if $M_1<M_{lower}$ and/or $M_1>M_{lower}$ and/or $M_1<M_{upper}$ and/or $M_1>M_{upper}$ and/or $M_2<M_{lower}$ and/or $M_2>M_{lower}$ and/or $M_2<M_{upper}$ and/or $M_2>M_{upper}$ then $x_1$ and/or $x_2$ is arranged to have a substantially constant value.

According to an embodiment if $M_1<M_{lower}$ and/or $M_1>M_{lower}$ and/or $M_1<M_{upper}$ and/or $M_1>M_{upper}$ and/or $M_2<M_{lower}$ and/or $M_2>M_{lower}$ and/or $M_2<M_{upper}$ and/or $M_2>M_{upper}$ then $x_1$ and/or $x_2$ is arranged to vary as a function of $M_1$ and/or $M_2$. Preferably, if $M_1<M_{lower}$ and/or $M_1>M_{lower}$ and/or $M_1<M_{upper}$ and/or $M_1>M_{upper}$ and/or $M_2<M_{lower}$ and/or $M_2>M_{lower}$ and/or $M_2<M_{upper}$ and/or $M_2>M_{upper}$ then $x_1$ and/or $x_2$ is arranged to vary as a function of $M_1$ and/or $M_2$ in a symmetrical, asymmetrical, linear, non-linear, curved or stepped manner.

According to an embodiment $x_1$ and/or $x_2$ is arranged to vary as a function of $M_1$ and/or $M_2$ in a symmetrical manner about a value of $M_1$ and/or $M_2$ selected from the group consisting of: (i) 0-50; (ii) 50-100; (iii) 100-150; (iv) 150-200; (v) 200-250; (vi) 250-300; (vii) 300-350; (viii) 350-400; (ix) 400-450; (x) 450-500; (xi) 500-550; (xii) 550-600; (xiii) 600-650; (xiv) 650-700; (xv) 700-750; (xvi) 750-800; (xvii) 800-850; (xviii) 850-900; (xix) 900-950; (xx) 950-1000; and (xxi) >1000.

Preferably, if $M_1<M_{lower}$ and/or $M_1>M_{lower}$ and/or $M_1<M_{upper}$ and/or $M_1>M_{upper}$ and/or $M_2<M_{lower}$ and/or $M_2>M_{lower}$ and/or $M_2<M_{upper}$ and/or $M_2>M_{upper}$ then $x_1$ and/or $x_2$ is arranged to increase or decrease at a rate of y % *$M_1$ or y % *$M_2$, wherein y is selected from the group consisting of: (i)<0.01; (ii) 0.01-0.02; (iii) 0.02-0.03; (iv) 0.03-0.04; (v) 0.04-0.05; (vi) 0.05-0.06; (viii) 0.06-0.07; (ix) 0.07-0.08; (x) 0.08-0.09; (xi) 0.09-0.10; (xii) 0.10-0.11; (xiii) 0.11-0.12; (xiv) 0.12-0.13; (xv) 0.13-0.14; (xvi) 0.14-0.15; (xvii) 0.15-0.16; (xviii) 0.16-0.17; (xix) 0.17-0.18; (xx) 0.18-0.19; (xxi) 0.19-0.20; and (xxii)>0.20.

Preferably, $M_{upper}$ is a value in Daltons or mass to charge ratio units and falls within a range selected from the group consisting of: (i) 0-50; (ii) 50-100; (iii) 100-150; (iv) 150-200; (v) 200-250; (vi) 250-300; (vii) 300-350; (viii) 350-400; (ix) 400-450; (x) 450-500; (xi) 500-550; (xii) 550-600; (xiii) 600-650; (xiv) 650-700; (xv) 700-750; (xvi) 750-800; (xvii) 800-850; (xviii) 850-900; (xix) 900-950; (xx) 950-1000; and (xxi)>1000.

Preferably, $M_{lower}$ is a value in Daltons or mass to charge ratio units and falls within a range selected from the group consisting of: (i) 0-50; (ii) 50-100; (iii) 100-150; (iv) 150-200; (v) 200-250; (vi) 250-300; (vii) 300-350; (viii) 350-400; (ix) 400-450; (x) 450-500; (xi) 500-550; (xii) 550-600; (xiii) 600-650; (xiv) 650-700; (xv) 700-750; (xvi) 750-800; (xvii) 800-850; (xviii) 850-900; (xix) 900-950; (xx) 950-1000; and (xxi)>1000.

The method preferably further comprises selecting for further analysis one or more second parent or precursor substances or ions which have a decimal mass or mass to charge ratio component $m_2$ which is between 0 to $x_1$ mDa or milli-mass to charge ratio units greater than the first decimal mass or mass to charge ratio component $m_1$ and/or between 0 to $x_2$ mDa or milli-mass to charge ratio units less than the first decimal mass or mass to charge ratio component $m_1$.

The step of selecting for further analysis preferably comprises fragmenting the one or more second parent or precursor substances or ions.

The step of selecting for further analysis preferably comprises onwardly transmitting the one or more second parent or precursor substances or ions which have a second decimal mass or mass to charge ratio component $m_2$ which is between 0 to $x_1$ mDa or milli-mass to charge ratio units greater than the first decimal mass or mass to charge ratio component $m_1$ and/or between 0 to $x_2$ mDa or milli-mass to charge ratio units less than the first decimal mass or mass to charge ratio component $m_1$ to a collision, fragmentation or reaction device.

Preferably, $x_1$ falls within a range selected from the group consisting of: (i)<1; (ii) 1-5; (iii) 5-10; (iv) 10-15; (v) 15-20; (vi) 20-25; (vii) 25-30; (viii) 30-35; (ix) 35-40; (x) 40-45; (xi) 45-50; (xii) 50-55; (xiii) 55-60; (xiv) 60-65; (xv) 65-70; (xvi) 70-75; (xvii) 75-80; (xviii) 80-85; (xix) 85-90; (xx) 90-95; (xxi) 95-100; and (xxii)>100.

Preferably, $x_2$ falls within a range selected from the group consisting of: (i)<1; (ii) 1-5; (iii) 5-10; (iv) 10-15; (v) 15-20; (vi) 20-25; (vii) 25-30; (viii) 30-35; (ix) 35-40; (x) 40-45; (xi) 45-50; (xii) 50-55; (xiii) 55-60; (xiv) 60-65; (xv) 65-70; (xvi) 70-75; (xvii) 75-80; (xviii) 80-85; (xix) 85-90; (xx) 90-95; (xxi) 95-100; and (xxii)>100.

The method preferably further comprises analysing a sample comprising at least 2, 5, 10, 20, 30, 40, 50, 60, 70, 80, 90, 100, 200, 300, 400, 500, 600, 700, 800, 900, 1000, 1500, 2000, 2500, 3000, 3500, 4000, 4500, or 5000 components, molecules or analytes having different identities or comprising different species.

The collision, fragmentation or reaction device preferably comprises a Collision Induced Dissociation device.

According to another embodiment the collision, fragmentation or reaction device may be selected from the group consisting of: (i) a Surface Induced Dissociation ("SID") fragmentation device; (ii) an Electron Transfer Dissociation fragmentation device; (iii) an Electron Capture Dissociation fragmentation device; (iv) an Electron Collision or Impact Dissociation fragmentation device; (v) a Photo Induced Dissociation ("PID") fragmentation device; (vi) a Laser Induced Dissociation fragmentation device; (vii) an infrared radiation induced dissociation device; (viii) an ultraviolet radiation induced dissociation device; (ix) a nozzle-skimmer interface fragmentation device; (x) an in-source fragmentation device; (xi) an ion-source Collision Induced Dissociation fragmentation device; (xii) a thermal or temperature source fragmentation device; (xiii) an electric field induced fragmentation device; (xiv) a magnetic field induced fragmentation device; (xv) an enzyme digestion or enzyme degradation fragmentation device; (xvi) an ion-ion reaction fragmentation device; (xvii) an ion-molecule reaction fragmentation device; (xviii) an ion-atom reaction fragmentation device; (xix) an ion-metastable ion reaction fragmentation device; (xx) an ion-metastable molecule reaction fragmentation device; (xxi) an ion-metastable atom reaction fragmentation device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

The method preferably further comprises mass analysing the fragment products or ions which result from fragmenting the one or more second substances or ions or the one or more second parent or precursor substances or ions.

The method preferably further comprises separating components, analytes or molecules in a sample to be analysed by means of a separation process. The separation process may comprise liquid chromatography. The separation process may comprise: (i) High Performance Liquid Chromatography ("HPLC"); (ii) anion exchange; (iii) anion exchange chromatography; (iv) cation exchange; (v) cation exchange chromatography; (vi) ion pair reversed-phase chromatography; (vii) chromatography; (viii) single dimensional electrophoresis; (ix) multi-dimensional electrophoresis; (x) size exclusion; (xi) affinity; (xii) reverse phase chromatography; (xiii) Capillary Electrophoresis Chromatography ("CEC"); (xiv) electrophoresis; (xv) ion mobility separation; (xvi) Field Asymmetric Ion Mobility Separation or Spectrometry ("FAIMS"); (xvii) capillary electrophoresis; (xviii) gas chromatography; and (xix) supercritical fluid chromatography.

The method preferably further comprises ionising components, analytes or molecules in a sample to be analysed. The method preferably further comprises ionising components, analytes or molecules using a continuous or pulsed ion source. The step of ionising the components, analytes or molecules preferably comprises ionising the components, analytes or molecules using an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; and (xvii) a Thermospray ion source.

The method preferably further comprises mass analysing the one or more first parent or precursor substances or ions and/or the one or more second parent or precursor substances or ions and/or the one or more second substances or ions and/or fragment products or ions using a mass analyser. The step of mass analysing preferably comprises mass analysing using a mass analyser selected from the group consisting of: (i) a Fourier Transform ("FT") mass analyser; (ii) a Fourier Transform Ion Cyclotron Resonance ("FTICR") mass analyser; (iii) a Time of Flight ("TOF") mass analyser; (iv) an orthogonal acceleration Time of Flight ("oaTOF") mass analyser; (v) an axial acceleration Time of Flight mass analyser; (vi) a magnetic sector mass spectrometer; (vii) a Paul or 3D quadrupole mass analyser; (viii) a 2D or linear quadrupole mass analyser; (ix) a Penning trap mass analyser; (x) an ion trap mass analyser; (xi) a Fourier Transform orbitrap; (xii) an electrostatic Ion Cyclotron Resonance mass spectrometer; (xiii) an electrostatic Fourier Transform mass spectrometer; and (xiv) a quadrupole mass analyser.

The exact or accurate mass or mass to charge ratio of the one or more parent or precursor substances or ions and/or the one or more fragment, product, daughter or adduct ions and/or the one or more first parent or precursor substances or ions and/or the one or more second parent or precursor substances or ions is preferably determined to within 20 ppm, 19 ppm, 18 ppm, 17 ppm, 16 ppm, 15 ppm, 14 ppm, 13 ppm, 12 ppm, 11 ppm, 10 ppm, 9 ppm, 8 ppm, 7 ppm, 6 ppm, 5 ppm, 4 ppm, 3 ppm, 2 ppm, 1 ppm or<1 ppm.

According to an embodiment the exact or accurate mass or mass to charge ratio of the one or more parent or precursor substances or ions and/or the one or more fragment, product, daughter or adduct ions and/or the one or more first parent or precursor substances or ions and/or the one or more second parent or precursor substances or ions may be determined to within 0.40 mass units, 0.35 mass units, 0.30 mass units, 0.25 mass units, 0.20 mass units, 0.15 mass units, 0.10 mass units, 0.05 mass units, 0.01 mass units, 0.009 mass units, 0.008 mass units, 0.007 mass units, 0.006 mass units, 0.005 mass units, 0.004 mass units, 0.003 mass units, 0.002 mass units, 0.001 mass units or<0.001 mass units.

A sample to be analysed may be taken from a diseased organism, a non-diseased organism, a treated organism, a non-treated organism, a mutant organism or a wild type organism.

The method preferably further comprises identifying or determining the composition of the one or more parent or precursor substances or ions and/or the one or more fragment, product, daughter or adduct ions and/or the one or more first parent or precursor substances or ions and/or the one or more second parent or precursor substances or ions.

The method preferably further comprises quantifying or determining the intensity, concentration or expression level of the one or more parent or precursor substances or ions and/or the one or more fragment, product, daughter or adduct ions and/or the one or more first parent or precursor substances or ions and/or the one or more second parent or precursor substances or ions.

According to an embodiment the method further comprises the step of recognising the one or more parent or precursor substances or ions and/or the one or more fragment, product, daughter or adduct ions and/or the one or more first parent or precursor substances or ions and/or the one or more second parent or precursor substances or ions.

According to an embodiment the method comprises the steps of:

comparing a first mass spectrum or mass spectral data with a second mass spectrum or mass spectral data obtained at substantially the same time; and recognising as parent or precursor ions, ions having a greater intensity in the second mass spectrum or mass spectral data relative to the first mass spectrum or mass spectral data.

The method preferably comprises the step of recognising fragment, product, daughter or adduct ions.

The method preferably comprises the steps of:

comparing a first mass spectrum or mass spectral data with a second mass spectrum or mass spectral data obtained at substantially the same time; and recognising as fragment, product, daughter or adduct ions, ions having a greater intensity in the first mass spectrum or mass spectral data relative to the second mass spectrum or mass spectral data.

According to an embodiment the method may comprise the step of selecting a sub-group of possible candidate parent or precursor ions from all the parent or precursor ions.

The method preferably further comprises the step of recognising parent or precursor ions and fragment, product, daughter or adduct ions from the first mass spectral or first mass spectral data and/or second mass spectra or second mass spectral data.

The method may further comprise the steps of:

generating a parent or precursor ion mass chromatogram for each parent or precursor ion;

determining the centre of each peak in the parent or precursor ion mass chromatogram;

determining the corresponding parent or precursor ions elution time(s);

generating a fragment, product, daughter or adduct ion mass chromatogram for each fragment, product, daughter or adduct ion;

determining the centre of each peak in the fragment, product, daughter or adduct ion mass chromatogram; and determining the corresponding fragment, product, daughter or adduct ion elution time(s).

According to an embodiment the method further comprises assigning fragment, product, daughter or adduct ions to parent or precursor ions according to the closeness of fit of their respective elution times.

According to an embodiment the method further comprises providing a mass filter having a mass to charge ratio transmission window upstream and/or downstream of the collision, fragmentation or reaction device.

The method preferably further comprises recognising fragment, product, daughter or adduct ions by recognising ions present in a first mass spectrum or first mass spectral data having a mass to charge value which falls outside of the transmission window of the mass filter.

According to an embodiment the method further comprises identifying a parent or precursor ion on the basis of the mass to charge ratio of the parent or precursor ion.

According to an embodiment the method further comprises identifying a parent or precursor ions on the basis of the mass to charge ratio of one or more fragment, product, daughter or adduct ions.

The method preferably further comprises identifying a protein by determining the mass to charge ratio of one or more parent or precursor ions, the one or more parent or precursor ions comprising peptides of the protein.

The method preferably further comprises identifying a protein by determining the mass to charge ratio of one or more fragment, product, daughter or adduct ions, the one or more fragment, product, daughter or adduct ions comprising fragments of peptides of the protein.

The method preferably further comprises searching the mass to charge ratios of the one or more parent or precursor ions and/or the one or more fragment, product, daughter or adduct ions against a database, the database comprising known proteins.

According to an embodiment the method further comprises searching the mass to charge ratio of the one or more parent or precursor ions against a database, the database comprising known proteins.

The method preferably further comprises searching first mass spectra or first mass spectral data for the presence of fragment, product, daughter or adduct ions which might be expected to result from the fragmentation of a parent or precursor ions.

According to an embodiment the predetermined amount is selected from the group comprising: (i) 0.25 seconds; (ii) 0.5 seconds; (iii) 0.75 seconds; (iv) 1 second; (v) 2.5 seconds; (vi) 5 seconds; (vii) 10 seconds; and (viii) a time corresponding to 5% of the width of a chromatography peak measured at half height.

The method preferably further comprises introducing a gas comprising helium, argon, nitrogen or methane into the collision, fragmentation or reaction device.

According to an embodiment the method further comprises automatically switching, altering or varying the collision, fragmentation or reaction device between at least the first mode and the second mode at least once every 1 ms, 10 ms, 100 ms, 200 ms, 300 ms, 400 ms, 500 ms, 600 ms, 700 ms, 800 ms, 900 ms, 1 s, 2 s, 3 s, 4 s, 5 s, 6 s, 7 s, 8 s, 9 s or 10 s.

An interscan delay is preferably performed after operating the collision, fragmentation or reaction device in a mode of operation and before switching, altering or varying the collision, fragmentation or reaction device to operate in another mode of operation. The interscan delay preferably has a duration of at least 1 ms, 2 ms, 3 ms, 4 ms, 5 ms, 6 ms, 7 ms, 8 ms, 9 ms, 10 ms, 11 ms, 12 ms, 13 ms, 14 ms, 15 ms, 16 ms, 17 ms, 18 ms, 19 ms, 20 ms, 30 ms, 40 ms, 50 ms, 60 ms, 70 ms, 80 ms, 90 ms or 100 ms.

According to an aspect of the present invention there is provided a mass spectrometer comprising:

a collision, fragmentation or reaction device;

a mass analyser; and a control system arranged and adapted to:

(a) pass parent or precursor ions to the collision, fragmentation or reaction device;

(b) operate the collision, fragmentation or reaction device in a first mode of operation wherein at least some of the parent or precursor ions are collided, fragmented or reacted to produce fragment, product, daughter or adduct ions;

(c) record first mass spectral data relating to ions emerging from or which have been transmitted through the collision, fragmentation or reaction device operating in the first mode of operation;

(d) switch, alter or vary the collision, fragmentation or reaction device to operate in a second mode of operation wherein substantially fewer parent or precursor ions are collided, fragmented or reacted;

(e) record second mass spectral data relating to ions emerging from or which have been transmitted through the collision, fragmentation or reaction device operating in the second mode of operation;

(f) repeat steps (b)-(e) a plurality of times;

(g) determine the accurate or exact mass or mass to charge ratio of one or more parent or precursor substances or ions, wherein the accurate or exact mass or mass to charge ratio of the one or more parent or precursor substances or ions comprise a first integer nominal mass or mass to charge ratio component $M_1$ and a first decimal mass or mass to charge ratio component $m_1$; and (h) search for or determine one or more fragment, product, daughter or adduct substances or ions in or from the first mass spectral data, wherein the one or more fragment, product, daughter or adduct substances or ions comprise a second integer nominal mass or mass to charge ratio component $M_2$ and a second decimal mass or mass to charge ratio component $m_2$, wherein the second decimal mass or mass to charge ratio component $m_2$ is between 0 to $x_1$ mDa or milli-mass to charge ratio units greater than the first decimal mass or mass to charge ratio component $m_1$ and/or between 0 to $x_2$ mDa or milli-mass to charge ratio units less than the first decimal mass or mass to charge ratio component $m_1$.

According to an aspect of the present invention there is provided a mass spectrometer comprising:

a collision, fragmentation or reaction device;

a mass analyser; and a control system arranged and adapted to:

(a) pass parent or precursor ions to the collision, fragmentation or reaction device;

(b) operate the collision, fragmentation or reaction device in a first mode of operation wherein at least some of the parent or precursor ions are collided, fragmented or reacted to produce fragment, product, daughter or adduct ions;

(c) record first mass spectral data relating to ions emerging from or which have been transmitted through the collision, fragmentation or reaction device operating in the first mode of operation;

(d) switch, alter or vary the collision, fragmentation or reaction device to operate in a second mode of operation wherein substantially fewer parent or precursor ions are collided, fragmented or reacted;

(e) record second mass spectral data relating to ions emerging from or which have been transmitted through the collision, fragmentation or reaction device operating in the second mode of operation;

(f) repeat steps (b)-(e) a plurality of times;

(g) determine the accurate or exact mass or mass to charge ratio of one or more first parent or precursor substances or ions, wherein the accurate or exact mass or mass to charge ratio of the one or more first parent or precursor substances or ions comprise a first integer nominal mass or mass to charge ratio component $M_1$ and a first decimal mass or mass to charge ratio component $m_1$; and (h) search for or determine one or more second parent or precursor substances or ions in or from the first mass spectral data, wherein the one or more second parent or precursor substances or ions comprise a second integer nominal mass or mass to charge ratio component $M_2$ and a second decimal mass or mass to charge ratio component $m_2$, wherein the second decimal mass or mass to charge ratio component $m_2$ is between 0 to $x_1$ mDa or milli-mass to charge ratio units greater than the first decimal mass or mass to charge ratio component $m_1$ and/or between 0 to $x_2$ mDa or milli-mass to charge ratio units less than the first decimal mass or mass to charge ratio component $m_1$.

The collision, fragmentation or reaction device preferably comprises a Collision Induced Dissociation device.

The collision, fragmentation or reaction device may alternatively be selected from the group consisting of: (i) a Surface Induced Dissociation ("SID") collision, fragmentation or reaction device; (ii) an Electron Transfer Dissociation collision, fragmentation or reaction device; (iii) an Electron Capture Dissociation collision, fragmentation or reaction device; (iv) an Electron Collision or Impact Dissociation collision, fragmentation or reaction device; (v) a Photo Induced Dissociation ("PID") collision, fragmentation or reaction device; (vi) a Laser Induced Dissociation collision, fragmentation or reaction device; (vii) an infrared radiation induced dissociation device; (viii) an ultraviolet radiation induced dissociation device; (ix) a nozzle-skimmer interface collision, fragmentation or reaction device; (x) an in-source collision, fragmentation or reaction device; (xi) an ion-source Collision Induced Dissociation collision, fragmentation or reaction device; (xii) a thermal or temperature source collision, fragmentation or reaction device; (xiii) an electric field induced collision, fragmentation or reaction device; (xiv) a magnetic field induced collision, fragmentation or reaction device; (xv) an enzyme digestion or enzyme degradation collision, fragmentation or reaction device; (xvi) an ion-ion reaction collision, fragmentation or reaction device; (xvii) an ion-molecule reaction collision, fragmentation or reaction device; (xviii) an ion-atom reaction collision, fragmentation or reaction device; (xix) an ion-metastable ion reaction collision, fragmentation or reaction device; (xx) an ion-metastable molecule reaction collision, fragmentation or reaction device; (xxi) an ion-metastable atom reaction collision, fragmentation or reaction device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

The mass spectrometer preferably further comprises an ion source. The ion source may be selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; and (xviii) a Thermospray ion source.

The ion source may comprise a pulsed or continuous ion source.

The ion source is preferably provided with an eluent over a period of time, the eluent having been separated from a mixture by means of liquid chromatography or capillary electrophoresis.

The ion source may alternatively be provided with an eluent over a period of time, the eluent having been separated from a mixture by means of gas chromatography.

The mass analyser is preferably selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; and (xi) a Fourier Transform mass analyser; (xii) a Time of Flight mass analyser; (xiii) an orthogonal acceleration Time of Flight mass analyser; and (xiv) an axial acceleration Time of Flight mass analyser.

According to an embodiment the mass spectrometer further comprises a mass filter arranged upstream and/or downstream of the collision, fragmentation or reaction device. The mass filter may comprise a quadrupole rod set mass filter. The mass filter is preferably operated as a highpass mass to charge ratio filter. The mass filter is preferably arranged to transmit ions having a mass to charge ratio selected from the group comprising: (i)≧100; (ii)≧150; (iii)≧200; (iv)≧250; (v)≧300; (vi)≧350;(vii)≧400; (viii)≧450; and (ix)≧500.

According to another embodiment the mass filter is operated as a lowpass or bandpass mass filter.

The mass spectrometer preferably further comprises an ion guide arranged upstream and/or downstream of the collision, fragmentation or reaction device. The ion guide is preferably selected from the group comprising: (i) a hexapole; (ii) a quadrupole; (iii) an octopole; (iv) a plurality of ring or plate electrodes having apertures through which ions are transmitted in use; and (v) a plurality of planar, plate or mesh electrodes arranged generally in the plane of ion travel.

The collision, fragmentation or reaction device is preferably selected from the group comprising: (i) a hexapole; (ii) a quadrupole; (iii) an octopole; (iv) a plurality of ring or plate electrodes having apertures through which ions are transmitted in use; and (v) a plurality of planar, plate or mesh electrodes arranged generally in the plane of ion travel.

The collision, fragmentation or reaction device preferably comprises a housing forming a substantially gas-tight enclosure apart from an ion entrance aperture, an ion exit aperture and optionally means for introducing a gas into the housing. A gas comprising helium, argon, nitrogen or methane is preferably introduced in use into the collision, fragmentation or reaction device.

A reaction device should be understood as comprising a device wherein ions, atoms or molecules are rearranged or reacted so as to form a new species of ion, atom or molecule. An X-Y reaction fragmentation device should be understood as meaning a device wherein X and Y combine to form a product which then fragments. This is different to a fragmentation device per se wherein ions may be caused to fragment without first forming a product. An X-Y reaction device should be understood as meaning a device wherein X and Y combine to form a product and wherein the product does not necessarily then fragment.

Parent or precursor ions that belong to a particular class of parent or precursor ions and which are recognisable by a characteristic daughter or fragment ion or characteristic "neutral loss" are traditionally discovered by the methods of "parent or precursor ion" scanning or "constant neutral loss" scanning.

Previous methods for recording "parent or precursor ion-"scans or "constant neutral loss" scans involve scanning one or both quadrupoles in a triple quadrupole mass spectrometer, or scanning the quadrupole in a tandem quadrupole orthogonal acceleration Time of Flight mass spectrometer, or scanning at least one element in other types of tandem mass spectrometers. As a consequence, these methods suffer from the low duty cycle associated with scanning instruments. As a further consequence, information may be discarded and lost whilst the mass spectrometer is occupied recording a "parent or precursor ion" scan or a "constant neutral loss" scan. As a further consequence these methods are not appropriate for use where the mass spectrometer is required to analyse substances eluting directly from gas or liquid chromatography equipment.

According to an embodiment, a tandem quadrupole orthogonal Time of Flight mass spectrometer is used in a way in which candidate parent or precursor ions are discovered using a method in which sequential relatively low fragmentation or reaction mass spectra followed by relatively high fragmentation or reaction mass spectra are recorded. The switching back and forth of the collision, fragmentation or reaction device is preferably not interrupted. Instead a complete set of data is preferably acquired and this is then preferably processed afterwards. Fragment, product, daughter or adduct ions may be associated with parent or precursor ions by closeness of fit of their respective elution times. In this way candidate parent or precursor ions may be confirmed or otherwise without interrupting the acquisition of data and information need not be lost.

Once an experimental run has been completed, the relatively high fragmentation or reaction mass spectra and the relatively low fragmentation or reaction mass spectra may then be post-processed. Parent or precursor ions may be recognised by comparing a high fragmentation or reaction mass spectrum with a low fragmentation or reaction mass spectrum obtained at substantially the same time and noting ions having a greater intensity in the low fragmentation or reaction mass spectrum relative to the high fragmentation or reaction mass spectrum. Similarly, fragment, product, daughter or adduct ions may be recognised by noting ions having a greater intensity in the high fragmentation or reaction mass spectrum relative to the low fragmentation or reaction mass spectrum.

According to the preferred embodiment a decimal mass filter is applied to the relatively high fragmentation mass spectra or data set and/or to the relatively low fragmentation mass spectra or data set.

Once a number of parent or precursor ions have been recognised, a sub-group of possible candidate parent or precursor ions may be selected from all of the parent or precursor ions.

According to one embodiment, possible candidate parent or precursor ions may be selected on the basis of their relationship to a predetermined fragment, product, daughter or adduct ion. The predetermined fragment, product, daughter or adduct ion may comprise, for example, ions selected from the group comprising: (i) immonium ions from peptides; (ii) functional groups including phosphate group $PO_3^-$ ions from phosphorylated peptides; and (iii) mass tags which are intended to cleave from a specific molecule or class of molecule and to be subsequently identified thus reporting the presence of the specific molecule or class of molecule.

A parent or precursor ion may be short listed as a possible candidate parent or precursor ion by generating a mass chromatogram for the predetermined fragment, product, daughter or adduct ion using high fragmentation or reaction mass spectra. The centre of each peak in the mass chromatogram is then determined together with the corresponding predetermined fragment, product, daughter or adduct ion elution time(s). Then for each peak in the predetermined fragment, product, daughter or adduct ion mass chromatogram both the low fragmentation or reaction mass spectrum obtained immediately before the predetermined fragment, product, daughter or adduct ion elution time and the low fragmentation or reaction mass spectrum obtained immediately after the predetermined fragment, product, daughter or adduct ion elution time are interrogated for the presence of previously recognised parent or precursor ions. A mass chromatogram for any previously recognised parent or precursor ion found to be present in both the low fragmentation or reaction mass spectrum obtained immediately before the predetermined fragment, product, daughter or adduct ion elution time and the low fragmentation or reaction mass spectrum obtained immediately after the predetermined fragment, product, daughter or adduct ion elution time is then generated and the centre of each peak in each mass chromatogram is determined together with the corresponding possible candidate parent or precursor ion elution time(s). The possible candidate parent or precursor ions may then be ranked according to the closeness of fit of their elution time with the predetermined fragment, product, daughter or adduct ion elution time, and a list of final candidate parent or precursor ions may be formed by rejecting possible candidate parent or precursor ions if their elution time precedes or exceeds the predetermined fragment, product, daughter or adduct ion elution time by more than a predetermined amount.

According to an alternative embodiment, a parent or precursor ion may be shortlisted as a possible candidate parent or precursor ion on the basis of it giving rise to a predetermined mass loss. For each low fragmentation or reaction mass spectrum, a list of target fragment, product, daughter or adduct ion mass to charge values that would result from the loss of a predetermined ion or neutral particle from each previously recognised parent or precursor ion present in the low fragmentation or reaction mass spectrum may be generated. Then both the high fragmentation or reaction mass spectrum obtained immediately before the low fragmentation or reaction mass spectrum and the high fragmentation or reaction mass spectrum obtained immediately after the low fragmentation or reaction mass spectrum are interrogated for the presence of fragment, product, daughter or adduct ions having a mass to charge value corresponding with a target fragment, product, daughter or adduct ion mass to charge value. A list of possible candidate parent or precursor ions (optionally including their corresponding fragment, product, daughter or adduct ions) may then formed by including in the list a parent or precursor ion if a fragment, product, daughter or adduct ion having a mass to charge value corresponding with a target fragment, product, daughter or adduct ion mass to charge value is found to be present in both the high fragmentation or reaction mass spectrum immediately before the low fragmentation or reaction mass spectrum and the high fragmentation or reaction mass spectrum immediately after the low fragmentation or reaction mass spectrum. A mass loss chromatogram may then be generated based upon possible candidate parent or precursor ions and their corresponding fragment, product, daughter or adduct ions. The centre of each peak in the mass loss chromatogram may be determined together with the corresponding mass loss elution time(s). Then for each possible candidate parent or precursor ion a mass chromatogram is generated using the low fragmentation or reaction mass spectra. A corresponding fragment, product, daughter or adduct ion mass chromatogram may also be generated for the corresponding fragment, product, daughter or adduct ion. The centre of each peak in the possible candidate parent or precursor ion mass chromatogram and the corresponding fragment, product, daughter or adduct ion mass chromatogram are then determined together with the corresponding possible candidate parent or precursor ion elution time(s) and corresponding fragment, product, daughter or adduct ion elution time(s). A list of final candidate parent or precursor ions may then be formed by rejecting possible candidate parent or precursor ions if the elution time of a possible candidate parent or precursor ion precedes or exceeds the corresponding fragment, product, daughter or adduct ion elution. time by more than a predetermined amount.

Once a list of final candidate parent or precursor ions has been formed (which preferably comprises only some of the originally recognised parent or precursor ions and possible candidate parent or precursor ions) then each final candidate parent or precursor ion can then be identified.

Identification of parent or precursor ions may be achieved by making use of a combination of information. This may include the accurately determined mass or mass to charge ratio of the parent or precursor ion. It may also include the masses or mass to charge ratios of the fragment ions. In some instances the accurately determined masses of the fragment, product, daughter or adduct ions may be preferred. It is known that a protein may be identified from the masses or mass to charge ratios, preferably the exact masses or mass to charge ratios, of the peptide products from proteins that have been enzymatically digested. These may be compared to those expected from a library of known proteins. It is also known that when the results of this comparison suggest more than one possible protein then the ambiguity can be resolved by analysis of the fragments of one or more of the peptides.

The preferred embodiment allows a mixture of proteins, which have been enzymatically digested, to be identified in a single analysis. The masses or mass to charge ratios, or exact masses or mass to charge ratios, of all the peptides and their associated fragment ions may be searched against a library of known proteins. Alternatively, the peptide masses or mass to charge ratios, or exact masses or mass to charge ratios, may be searched against the library of known proteins, and where more than one protein is suggested the correct protein may be confirmed by searching for fragment ions which match those to be expected from the relevant peptides from each candidate protein.

The step of identifying each final candidate parent or precursor ion preferably comprises: recalling the elution time of the final candidate parent or precursor ion, generating a list of possible candidate fragment, product, daughter or adduct ions which comprises previously recognised fragment, product, daughter or adduct ions which are present in both the low fragmentation or reaction mass spectrum obtained immediately before the elution time of the final candidate parent or precursor ion and the low fragmentation or reaction mass spectrum obtained immediately after the elution time of the final candidate parent or precursor ion, generating a mass chromatogram of each possible candidate fragment, product, daughter or adduct ion, determining the centre of each peak in each possible candidate fragment, product, daughter or adduct ion mass chromatogram, and determining the corresponding possible candidate fragment, product, daughter or adduct ion elution time(s). The possible candidate fragment, product, daughter or adduct ions may then be ranked according to the closeness of fit of their elution time with the elution time of the final candidate parent or precursor ion. A list of final candidate fragment, product, daughter or adduct ions may then be formed by rejecting possible candidate fragment, product, daughter or adduct ions if the elution time of the possible candidate fragment, product, daughter or adduct ion precedes or exceeds the elution time of the final candidate parent or precursor ion by more than a predetermined amount.

The list of final candidate fragment, product, daughter or adduct ions may be yet further refined or reduced by generating a list of neighbouring parent or precursor ions which are present in the low fragmentation or reaction mass spectrum obtained nearest in time to the elution time of the final candidate parent or precursor ion. A mass chromatogram of each parent or precursor ion contained in the list is then generated and the centre of each mass chromatogram is determined along with the corresponding neighbouring parent or precursor ion elution time(s). Any final candidate fragment, product, daughter or adduct ion having an elution time which corresponds more closely with a neighbouring parent or precursor ion elution time than with the elution time of the final candidate parent or precursor ion may then be rejected from the list of final candidate fragment, product, daughter or adduct ions.

Final candidate fragment, product, daughter or adduct ions may be assigned to a final candidate parent or precursor ion according to the closeness of fit of their elution times, and all final candidate fragment, product, daughter or adduct ions which have been associated with the final candidate parent or precursor ion may be listed.

An alternative embodiment which involves a greater amount of data processing but yet which is intrinsically simpler is also contemplated. Once parent and fragment, product, daughter or adduct ions have been identified, then a parent or precursor ion mass chromatogram for each recognised parent or precursor ion is generated. The centre of each peak in the parent or precursor ion mass chromatogram and the corresponding parent or precursor ion elution time(s) are then determined. Similarly, a fragment, product, daughter or adduct ion mass chromatogram for each recognised fragment, product, daughter or adduct ion is generated, and the centre of each peak in the fragment, product, daughter or adduct ion mass chromatogram and the corresponding fragment, product, daughter or adduct ion elution time(s) are then determined. Rather than then identifying only a sub-set of the recognised parent or precursor ions, all (or nearly all) of the recognised parent or precursor ions are then identified. Daughter, fragment, product or adduct ions are assigned to parent or precursor ions according to the closeness of fit of their respective elution times and all fragment, product, daughter or adduct ions which have been associated with a parent or precursor ion may then be listed.

Although not essential to the present invention, ions generated by the ion source may be passed through a mass filter, preferably a quadrupole mass filter, prior to being passed to the collision, fragmentation or reaction device. This presents an alternative or an additional method of recognising a fragment, product, daughter or adduct ion. A fragment, product, daughter or adduct ion may be recognised by recognising ions in a high fragmentation or reaction mass spectrum which have a mass to charge ratio which is not transmitted to the collision, fragmentation, or reaction device i.e. fragment, product, daughter or adduct ions are recognised by virtue of their having a mass to charge ratio falling outside of the transmission window of the mass filter. If the ions would not be transmitted by the mass filter then they must have been produced in the collision, fragmentation or reaction device.

According to a particularly preferred embodiment the ion source may comprise either an Electrospray, Atmospheric Pressure Chemical Ionization or a Matrix Assisted Laser Desorption Ionization ("MALDI") ion source. Such ion sources may be provided with an eluent over a period of time, the eluent having been separated from a mixture by means of liquid chromatography or capillary electrophoresis.

Alternatively, the ion source may comprise an Electron Impact, Chemical Ionization or Field Ionisation ion source. Such ion sources may be provided with an eluent over a period of time, the eluent having been separated from a mixture by means of gas chromatography.

In a first mode of operation (i.e. high fragmentation or reaction mode) a voltage may be supplied to the collision, fragmentation or reaction device selected from the group comprising: (i)≧15V; (ii)≧20V; (iii)≧25V; (iv)≧30V; (v)≧50V; (vi)≧100V; (vii)≧150V; and (viii)≧200V. In a second mode of operation (i.e. low fragmentation or reaction mode) a voltage may be supplied to the collision, fragmentation or reaction device selected from the group comprising: (i)≦5V; (ii)≦4.5V; (iii)≦4V; (iv)≦3.5V; (v)≦3V; (vi) ≦2.5V; (vii)≦2V; (viii)≦1.5V; (ix)≦1V; (x)≦0.5V; and (xi) substantially 0V. However, according to less preferred embodiments, voltages below 15V may be supplied in the first mode and/or voltages above 5V may be supplied in the second mode. For example, in either the first or the second mode a voltage of around 10V may be supplied. Preferably, the voltage difference between the two modes is at least 5V, 10V, 15V, 20V, 25V, 30V, 35V, 40V, 50V or more than 50V.

Various embodiments of the present invention will now be described, by way of example only, and with reference to the accompanying drawings in which.

Figure 4A:
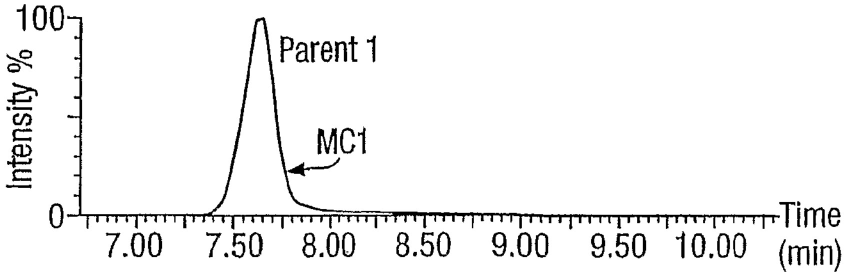
Figure 4B:
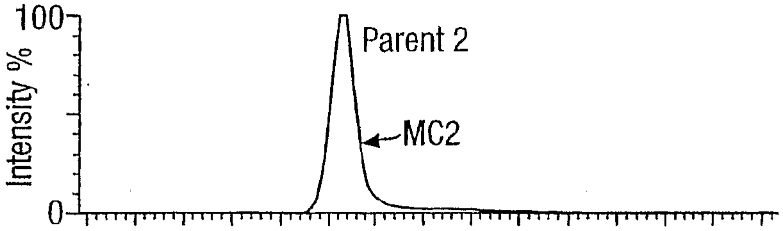
Figure 4C:
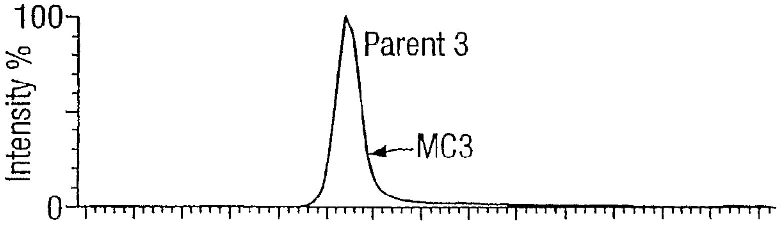
Figure 4D:
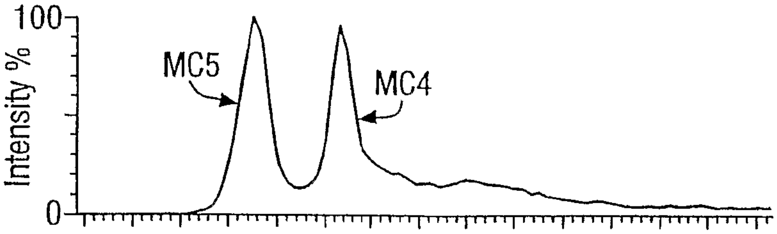
Figure 4E:
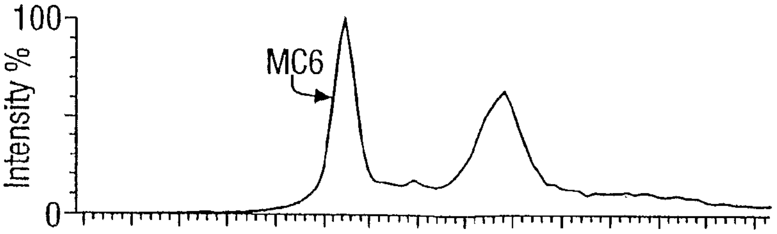
Figure 5:
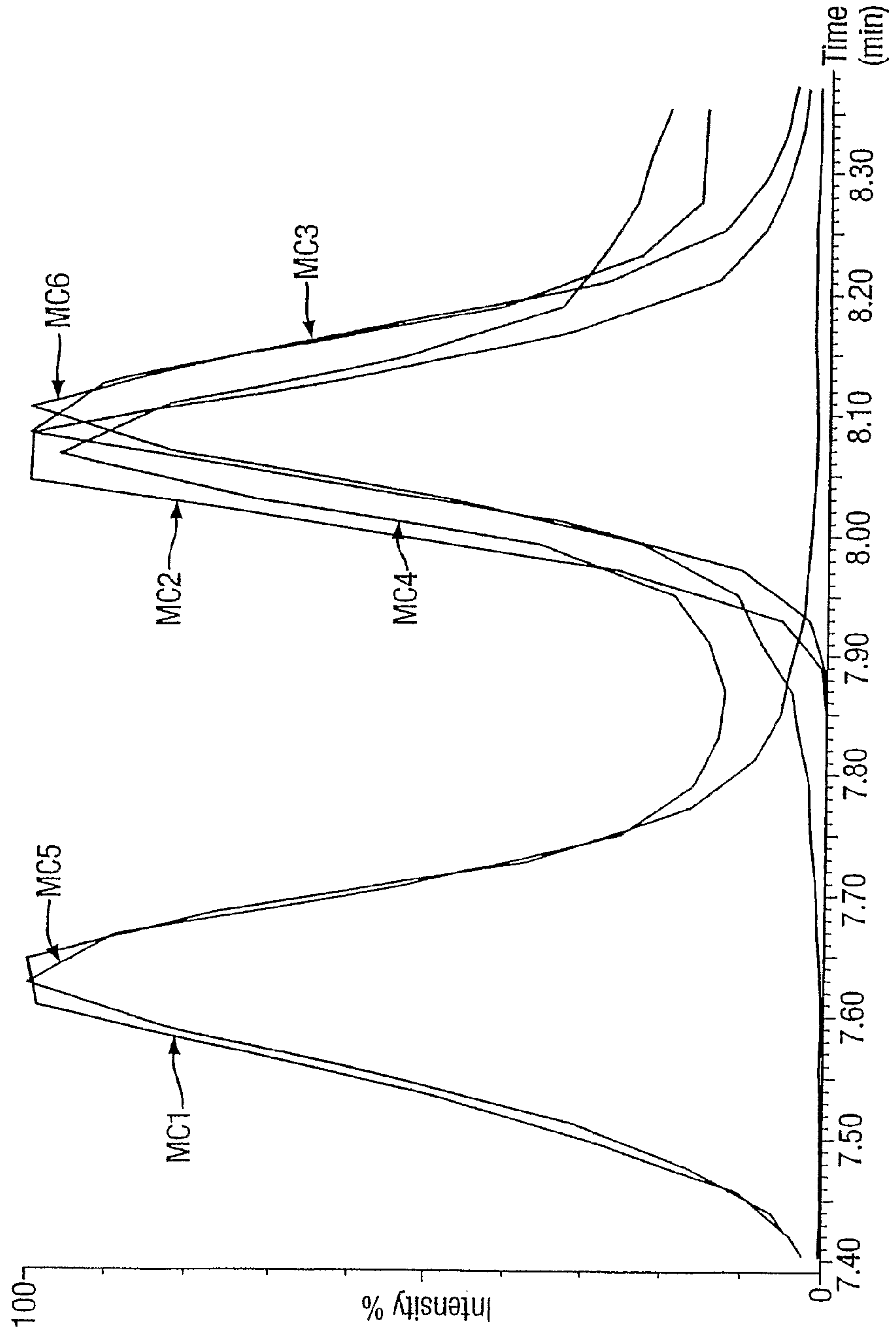
Figure 6:
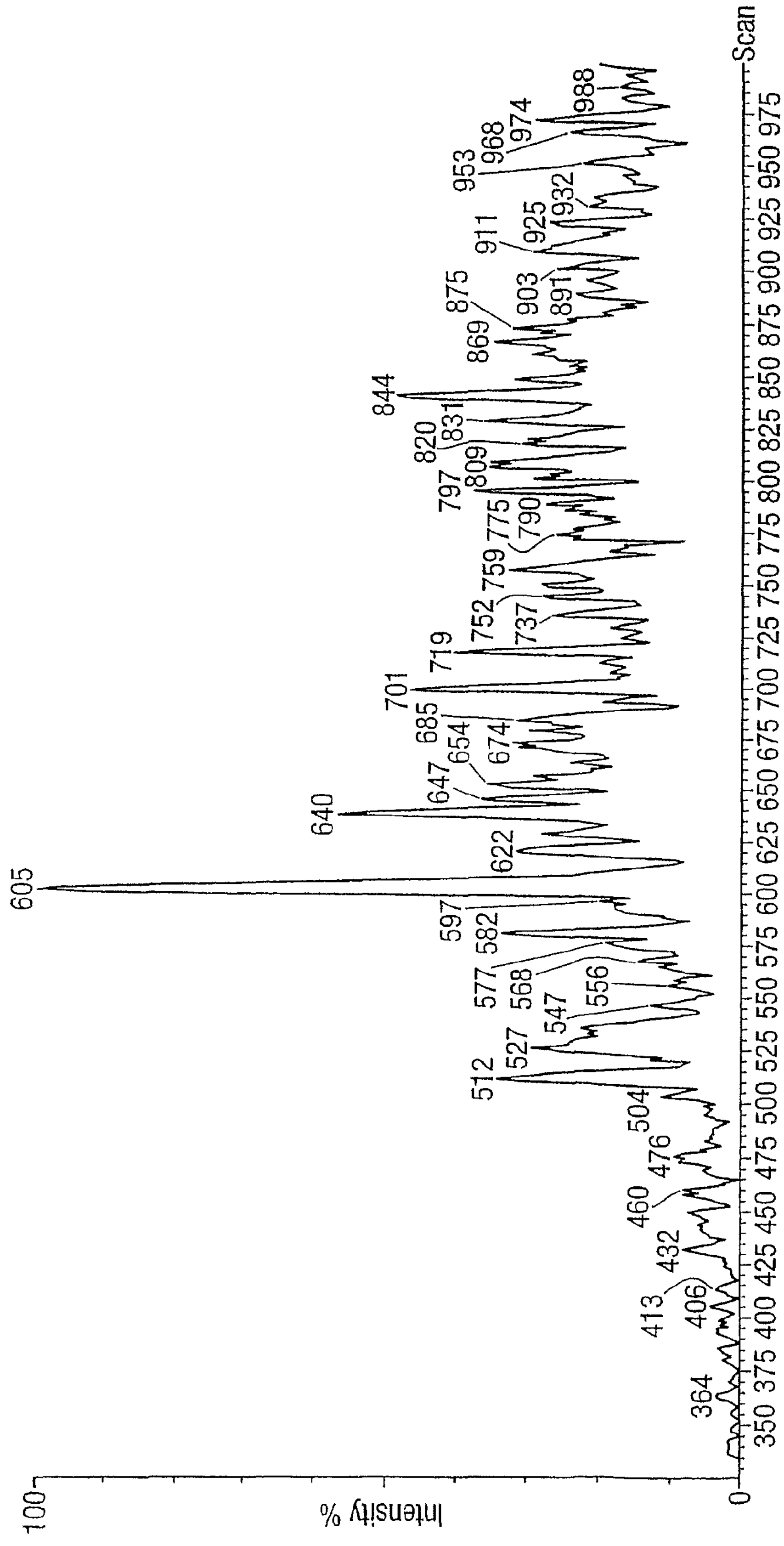
Figure 7:
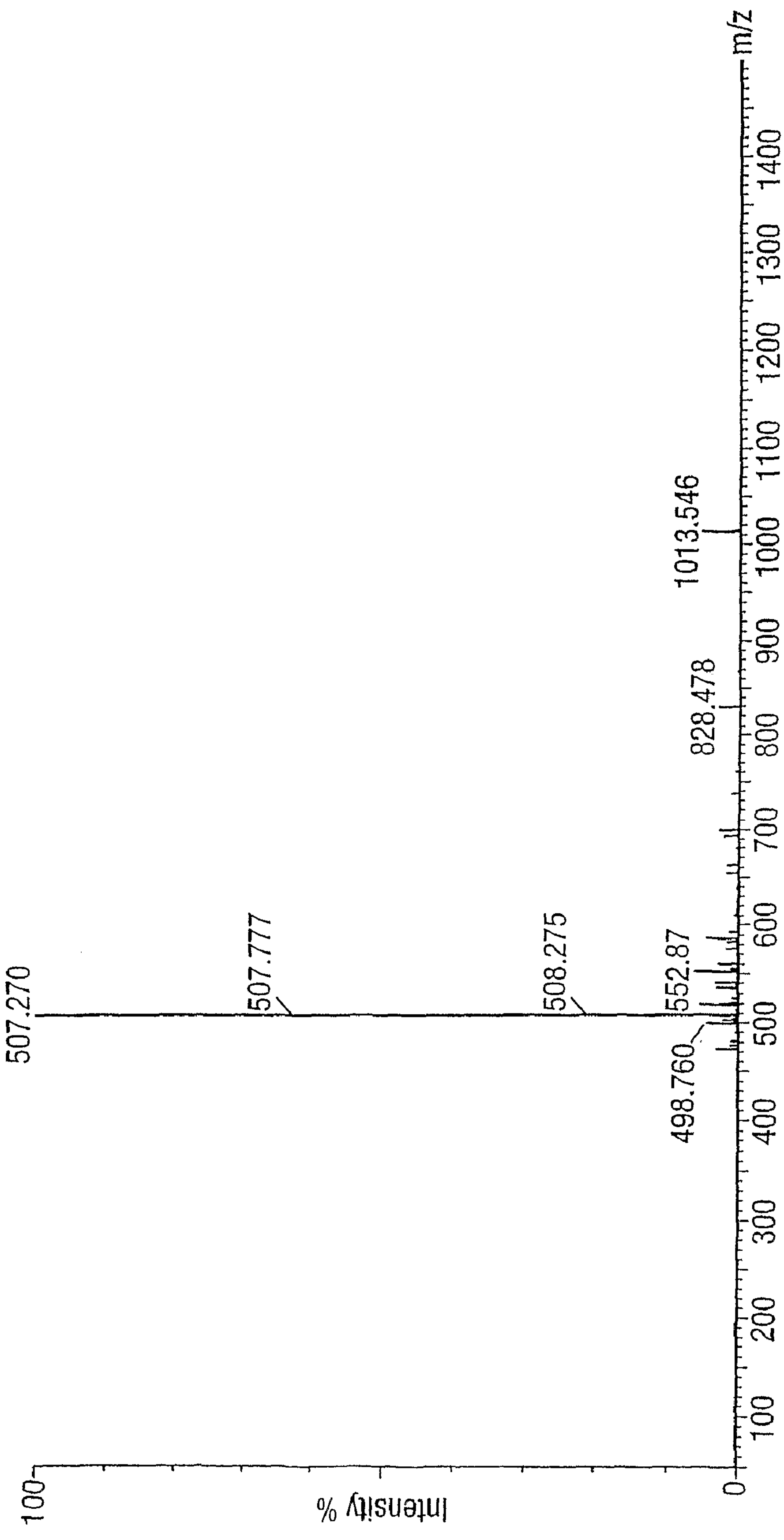
Figure 8:
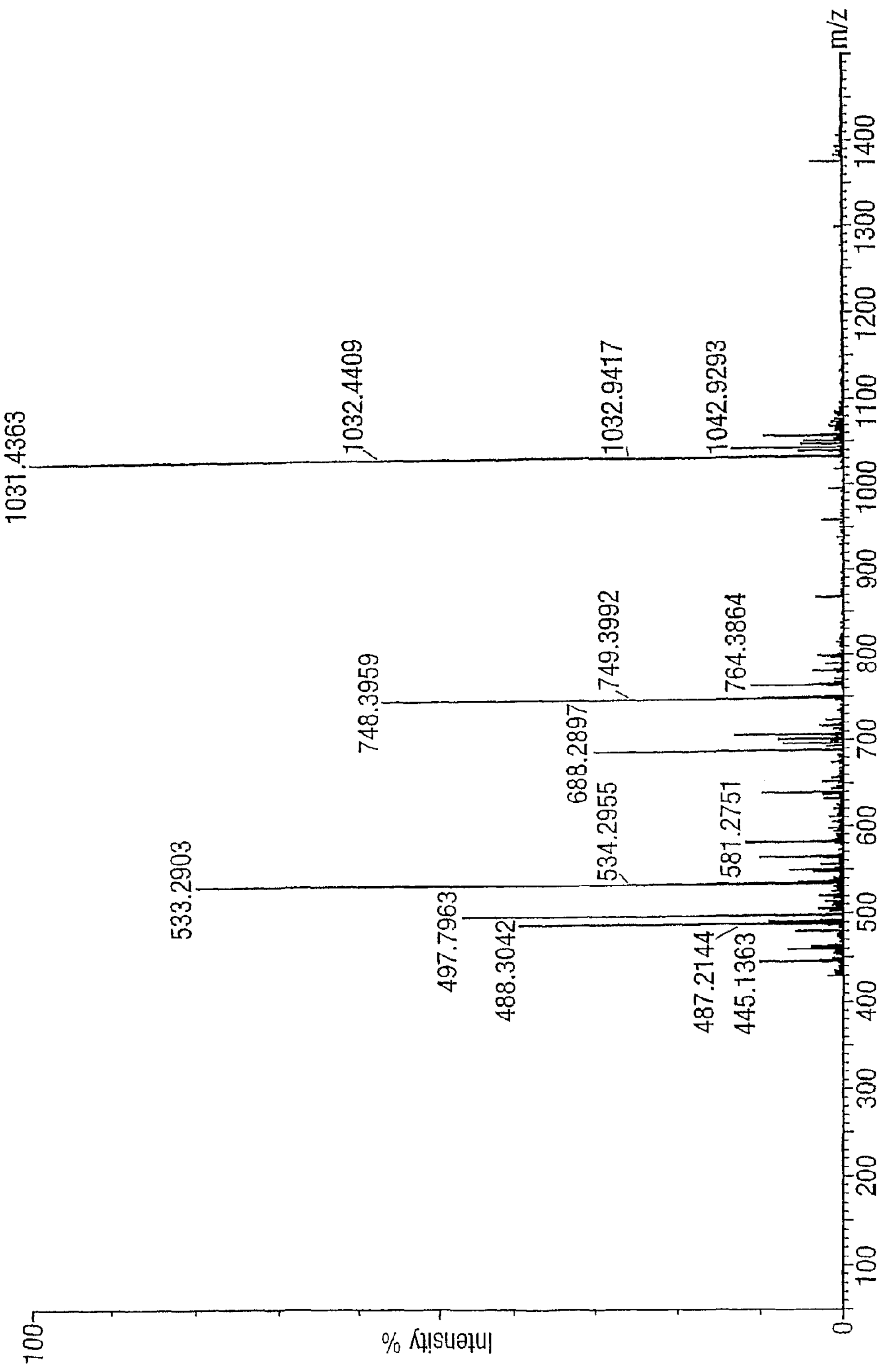
Figure 9:
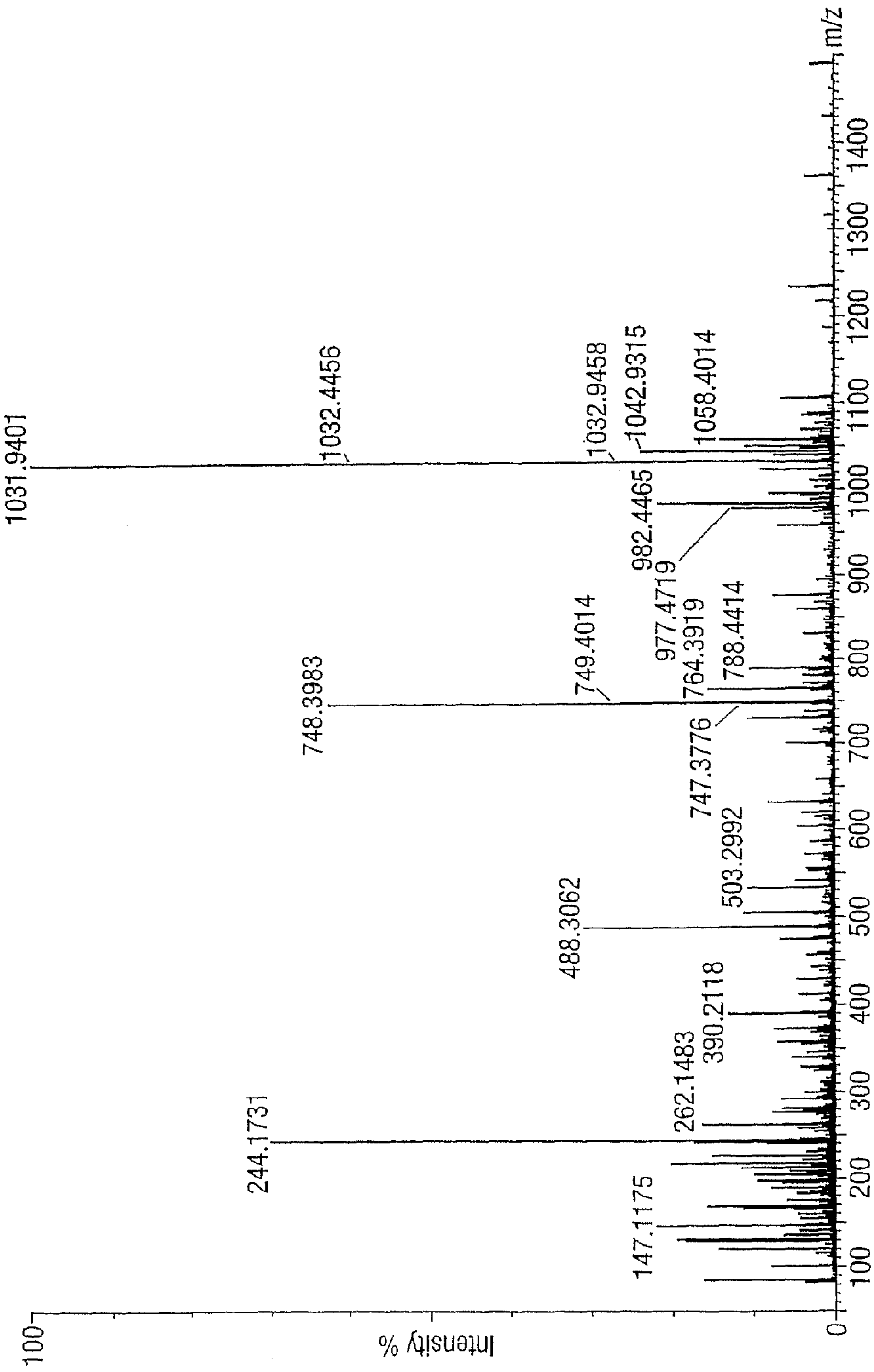
Figure 10:
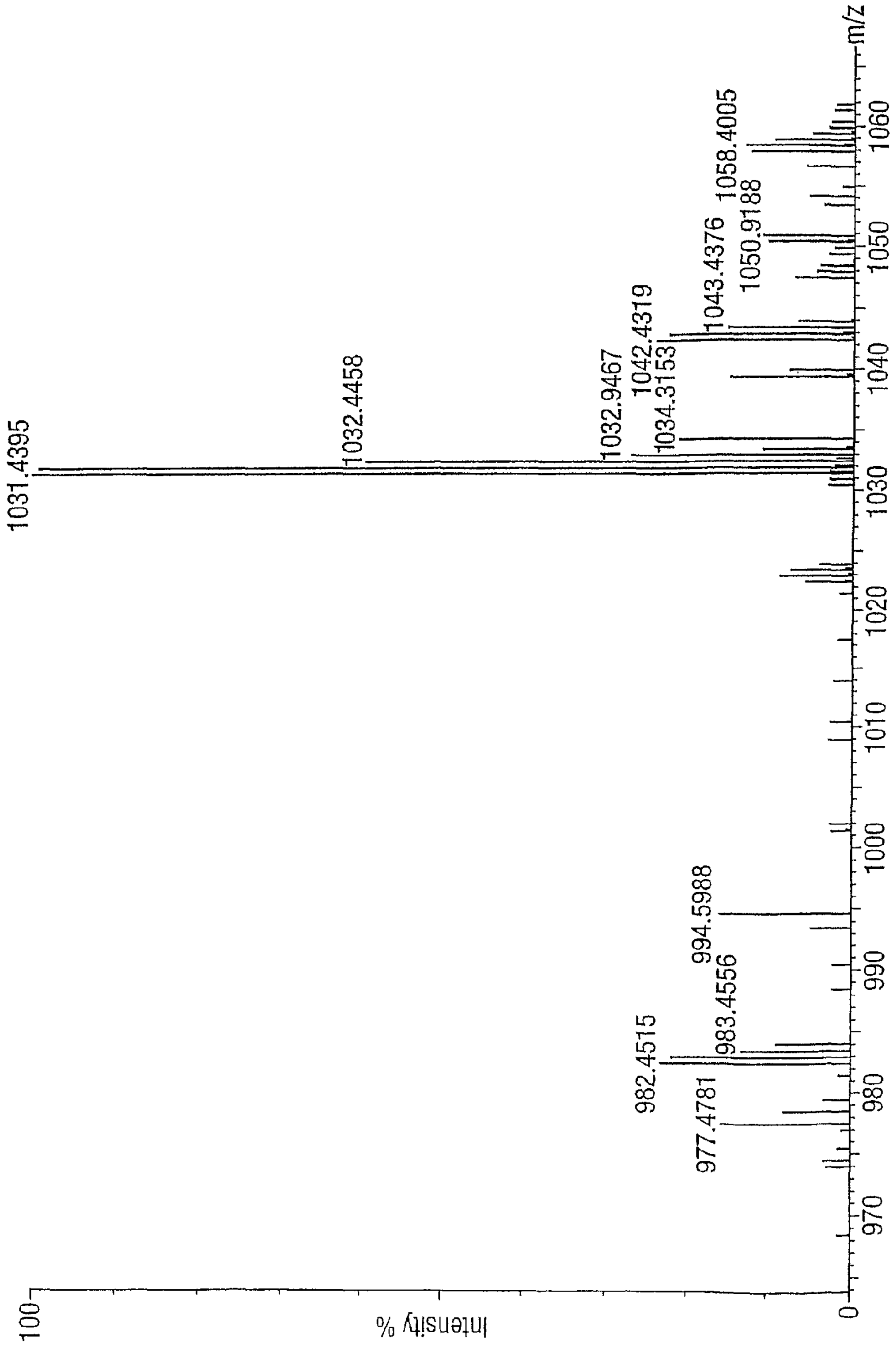
Figure 11:
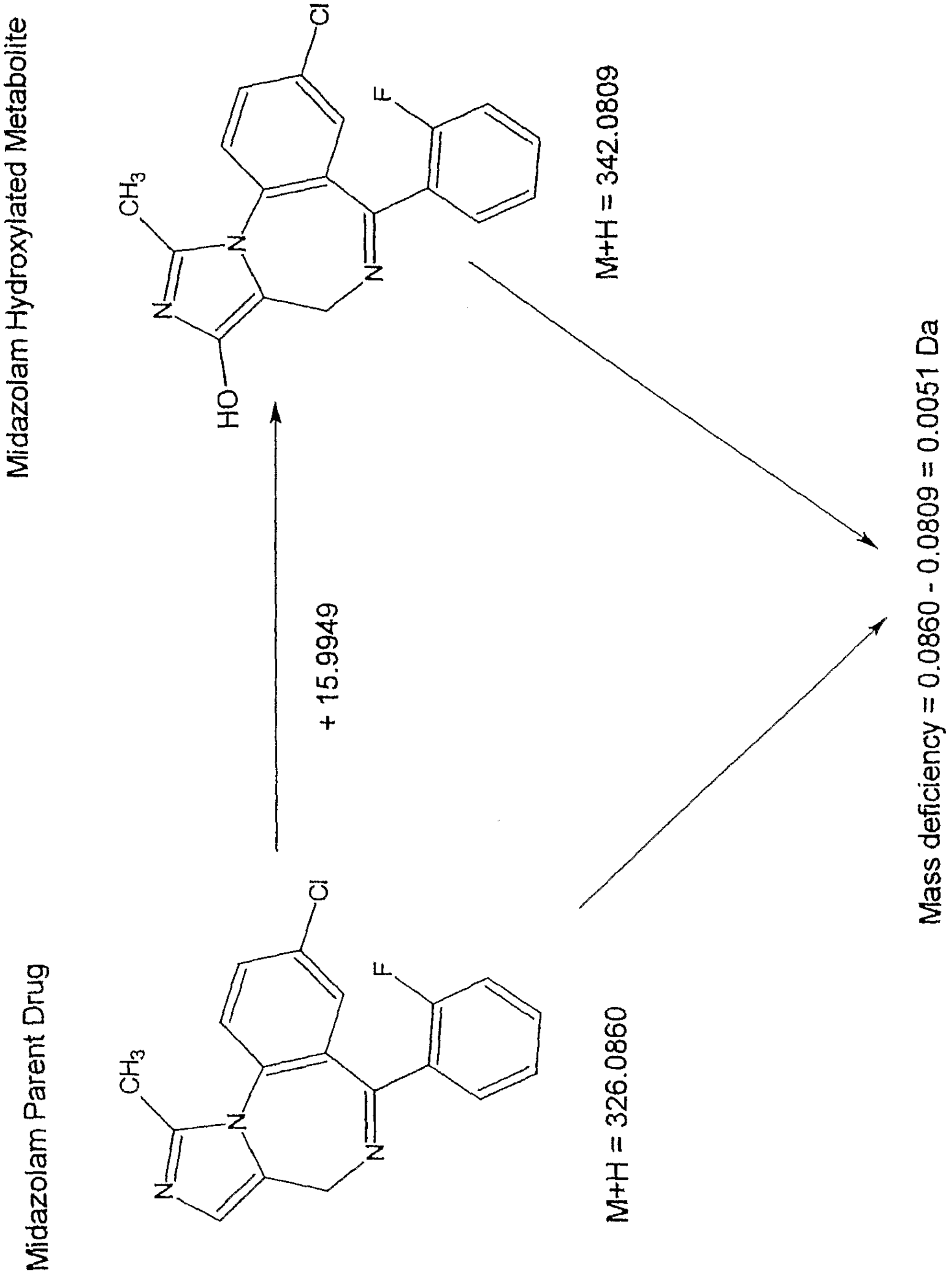
Figure 12:
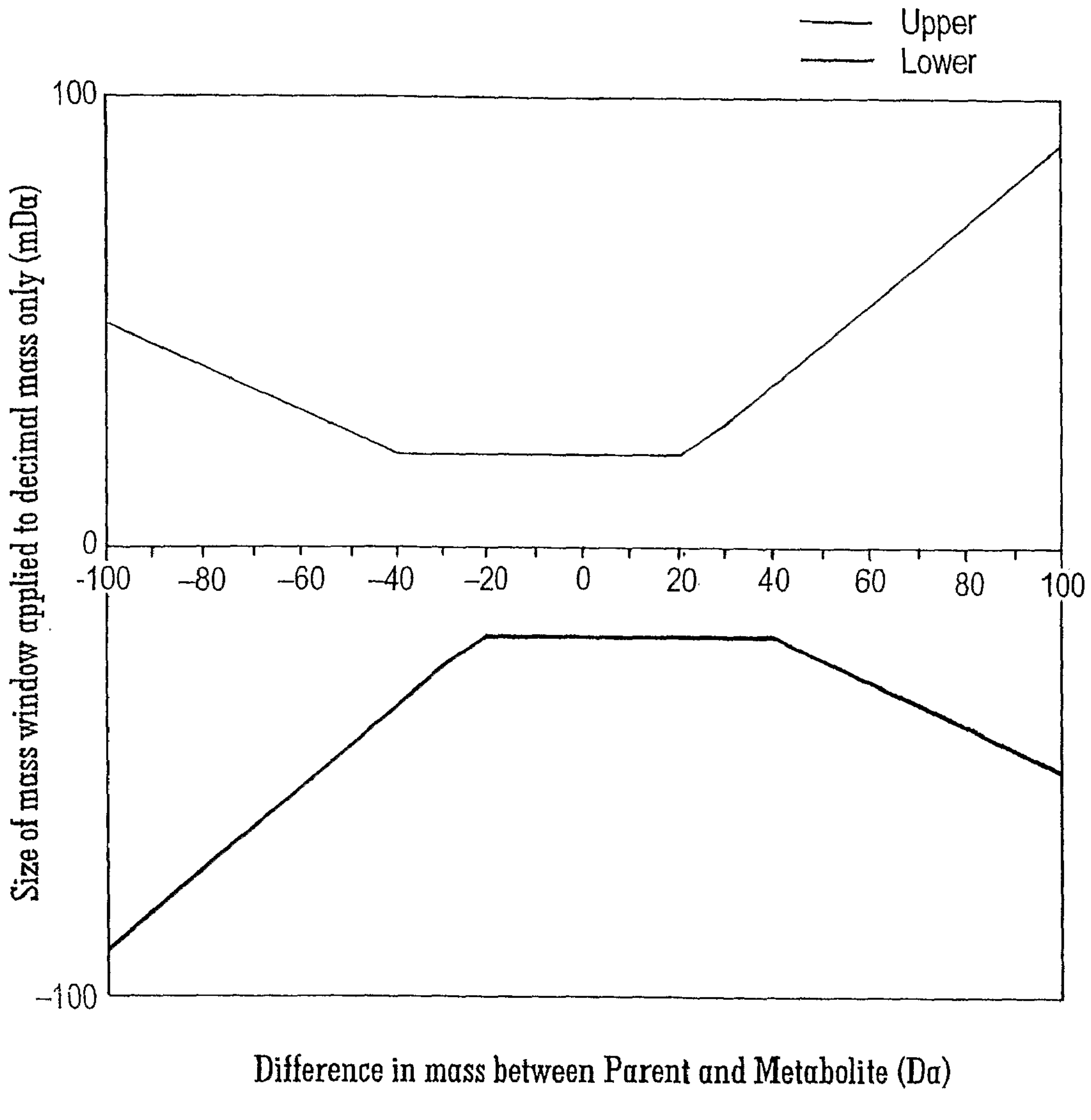
Figure 13:
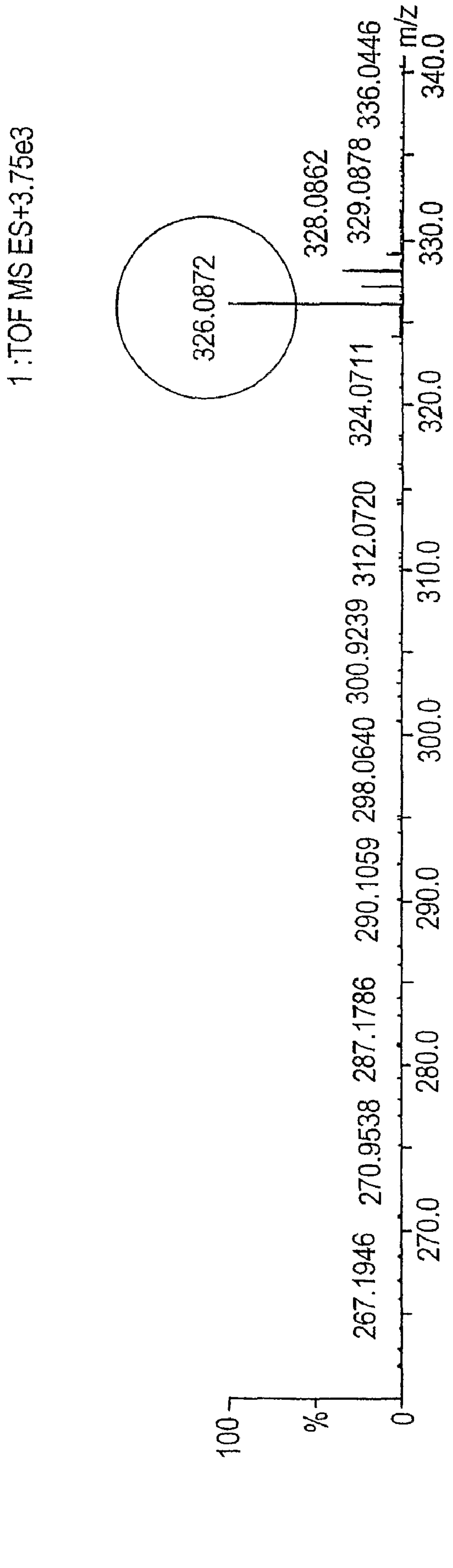
Figure 14:
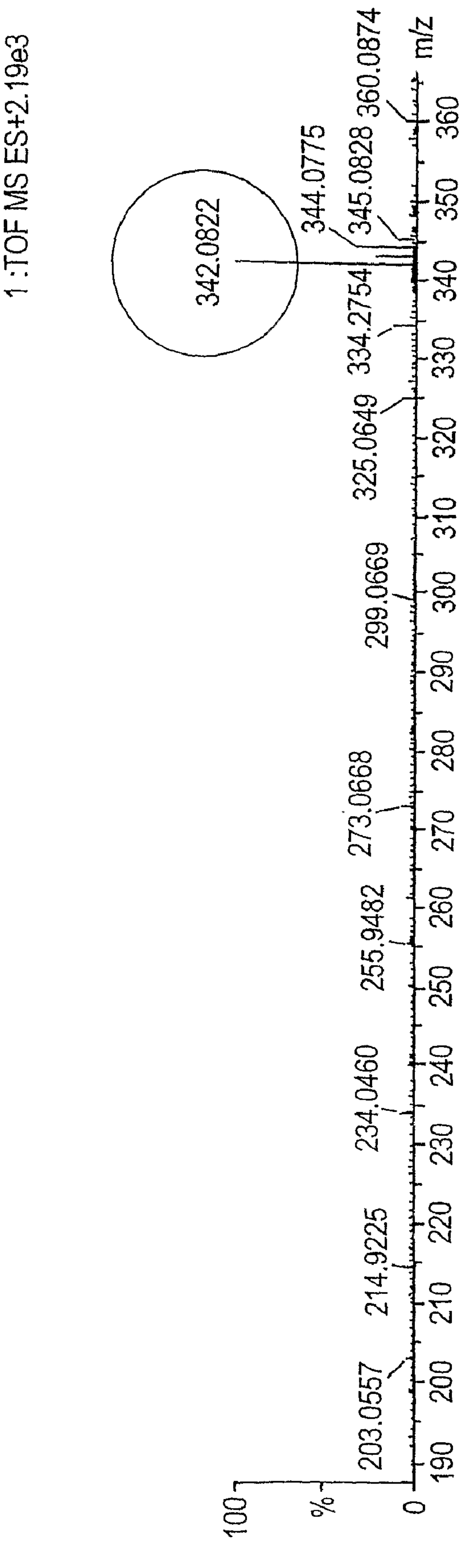
Figure 15A:
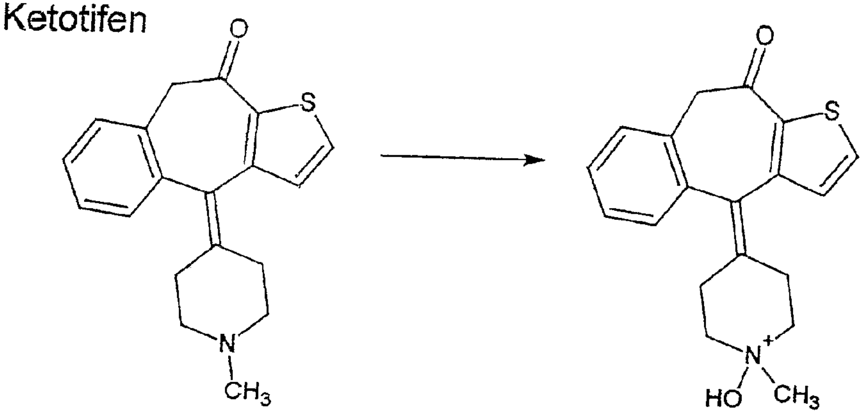
Figure 15A:
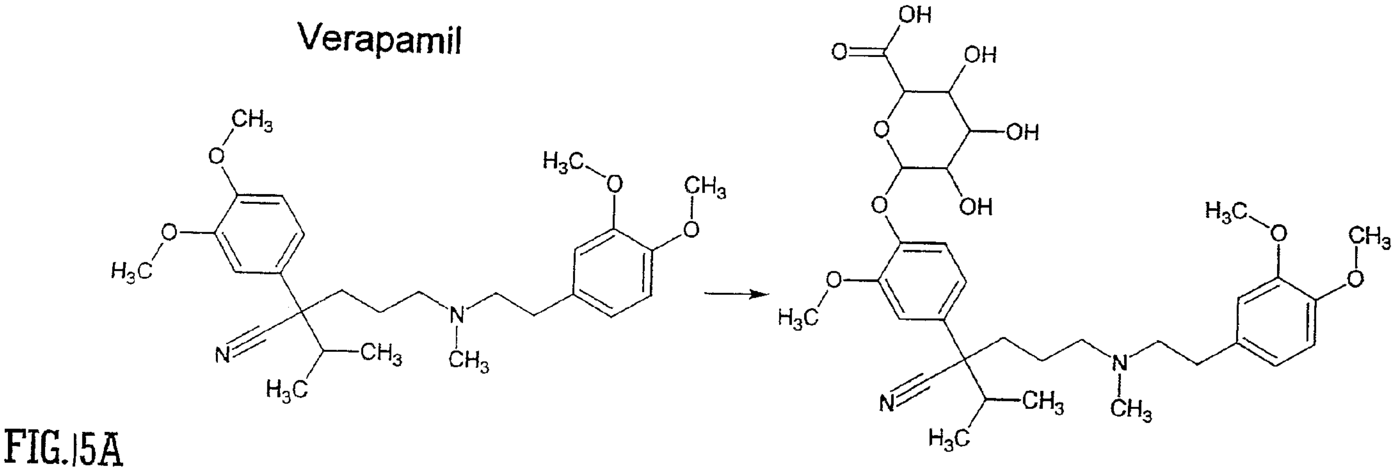
Figure 15B:
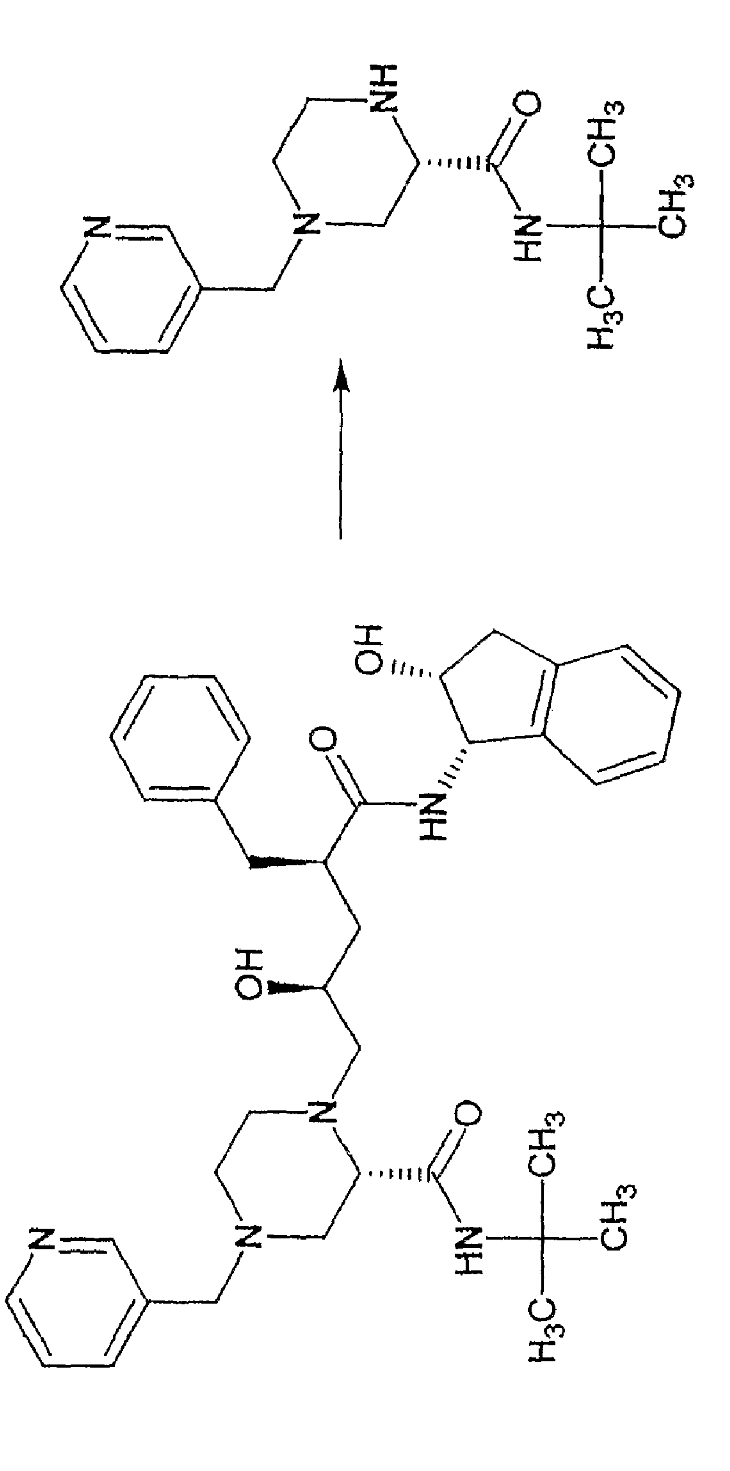
Figure 16:
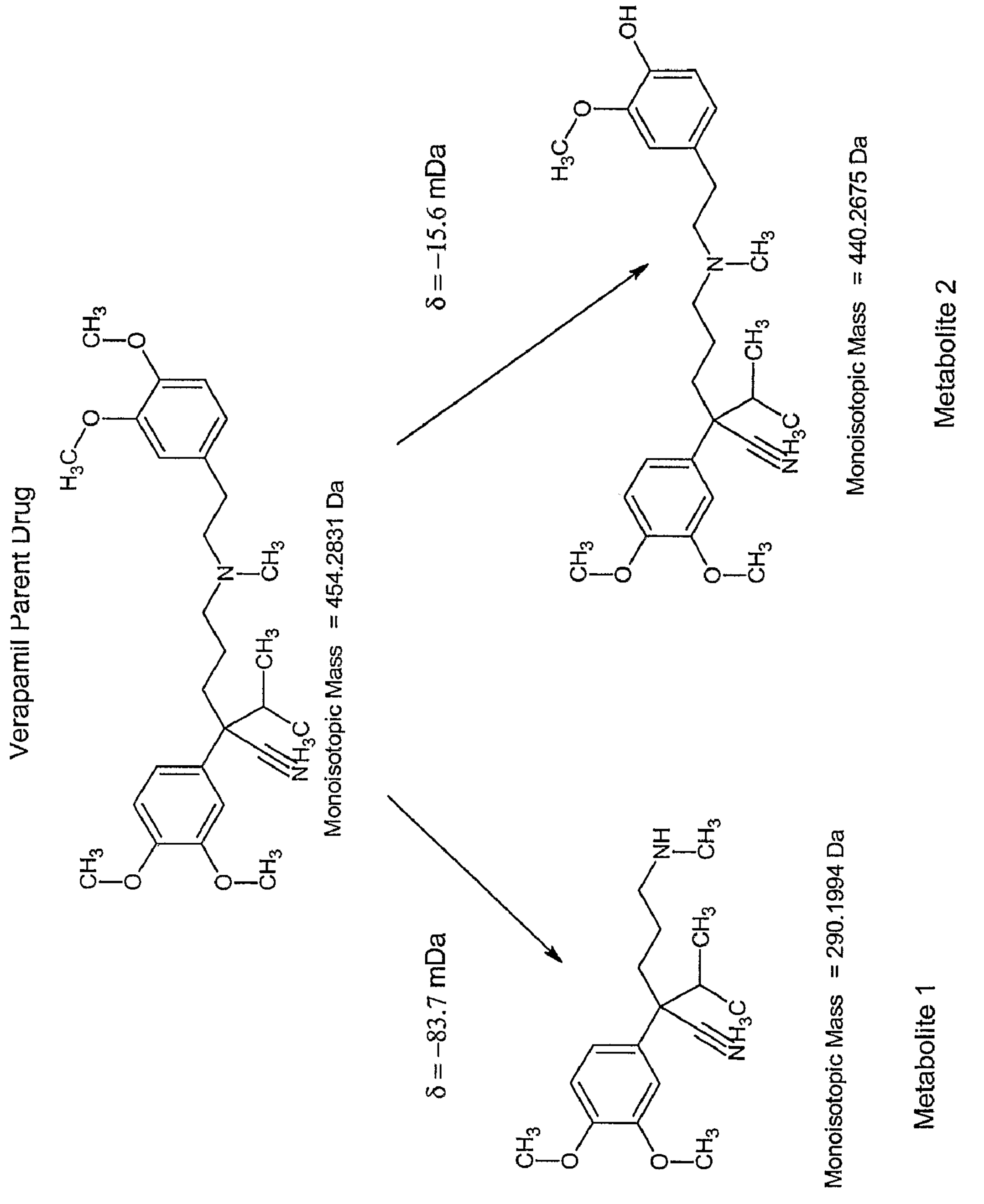
Figure 17:
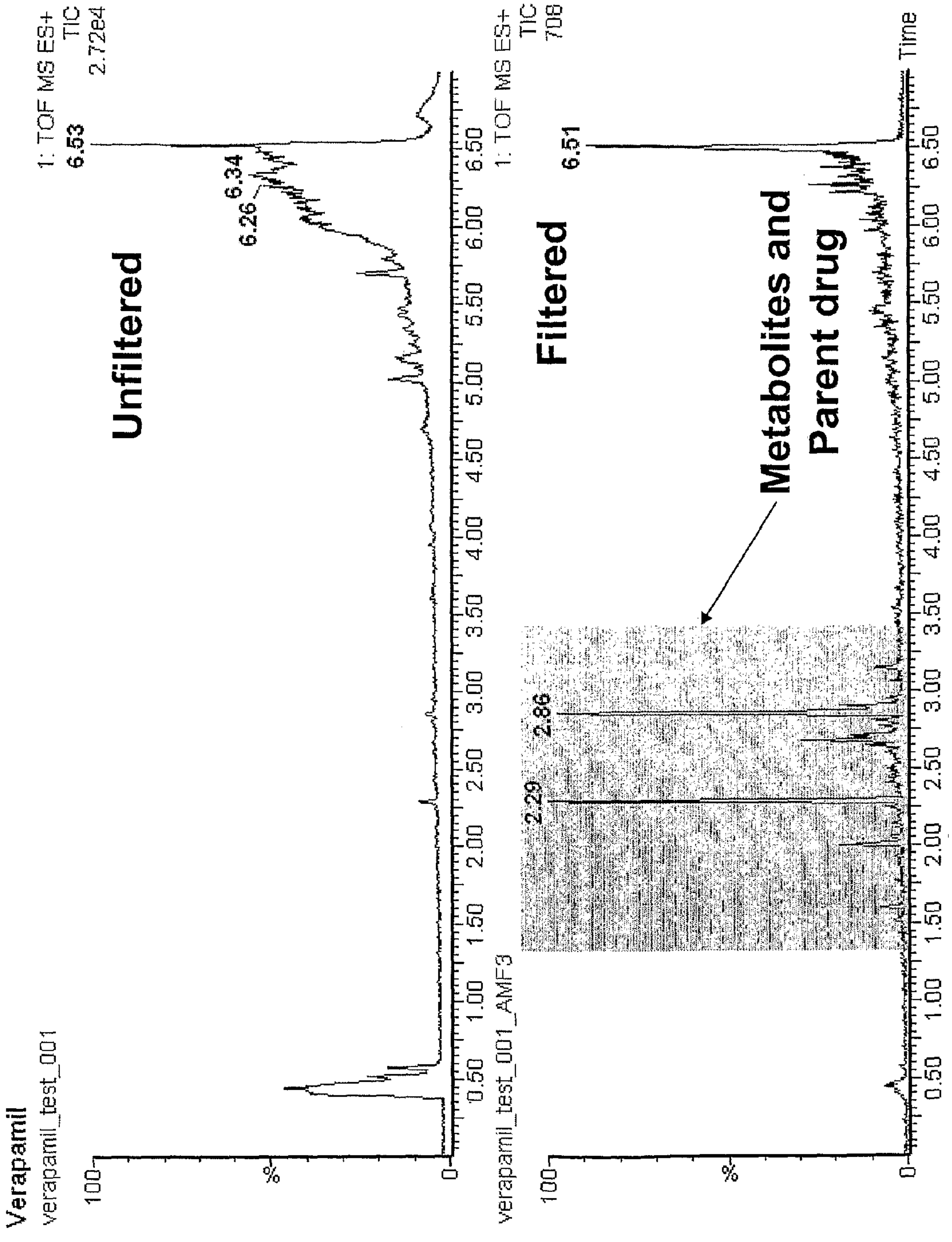

FIG. 4A shows a mass chromatogram showing the time profile of various mass ranges, FIG. 4B shows a mass chromatogram showing the time profile of various mass ranges, FIG. 4C shows a mass chromatogram showing the time profile of various mass ranges, FIG. 4D shows a mass chromatogram showing the time profile of various mass ranges, and FIG. 4E shows a mass chromatogram showing the time profile of various mass ranges;

FIG. 5 shows the mass chromatograms of FIGS. 4A-4E superimposed upon one another;

FIG. 6 shows a mass chromatogram of 87.04 (Asparagine immonium ion);

FIG. 7 shows a fragment T5 from ADH sequence ANELLINVK MW 1012.59;

FIG. 8 shows a mass spectrum for a low energy spectra of a tryptic digest of β-Caesin;

FIG. 9 shows a mass spectrum for a high energy spectra of a tryptic digest of β-Caesin;

FIG. 10 shows a processed and expanded view of the same spectrum as in FIG. 9;

FIG. 11 shows the structure and exact mass of a parent drug called Midazolam and the structure and exact mass of a hydroxylated metabolite of Midazolam;

FIG. 12 indicates the upper and lower limits of a decimal mass or mass to charge ratio window according to the preferred embodiment which is applied to the decimal mass or mass to charge ratio value of ions when searching mass spectral data or a mass spectrum for potential metabolites of a parent ion or fragment ions related to the parent ion;

FIG. 13 shows a parent ion mass spectrum of Midazolam;

FIG. 14 shows a parent ion mass spectrum of a hydroxylated metabolite of Midazolam;

FIG. 15A shows the structure and exact masses of Ketotifen and Verapamil and the structure and exact masses of a metabolite of Ketotifen and Verapamil and FIG. 15B shows the structure and exact mass of Indinavir and the structure and exact mass of a metabolite of Indinavir;

FIG. 16 shows how according to an embodiment different width decimal mass filters which vary about a decimal mass value which varies as a function of absolute mass may be used to identify potential metabolites of a parent drug; and FIG. 17 shows a total ion current or mass chromatogram of a sample of Verapamil obtained in a conventional manner together with a total ion current or mass chromatogram obtained according to a preferred embodiment of the present invention wherein a decimal mass window was applied to the data enabling the parent drug and potential metabolites to be observed.

Figure 1:
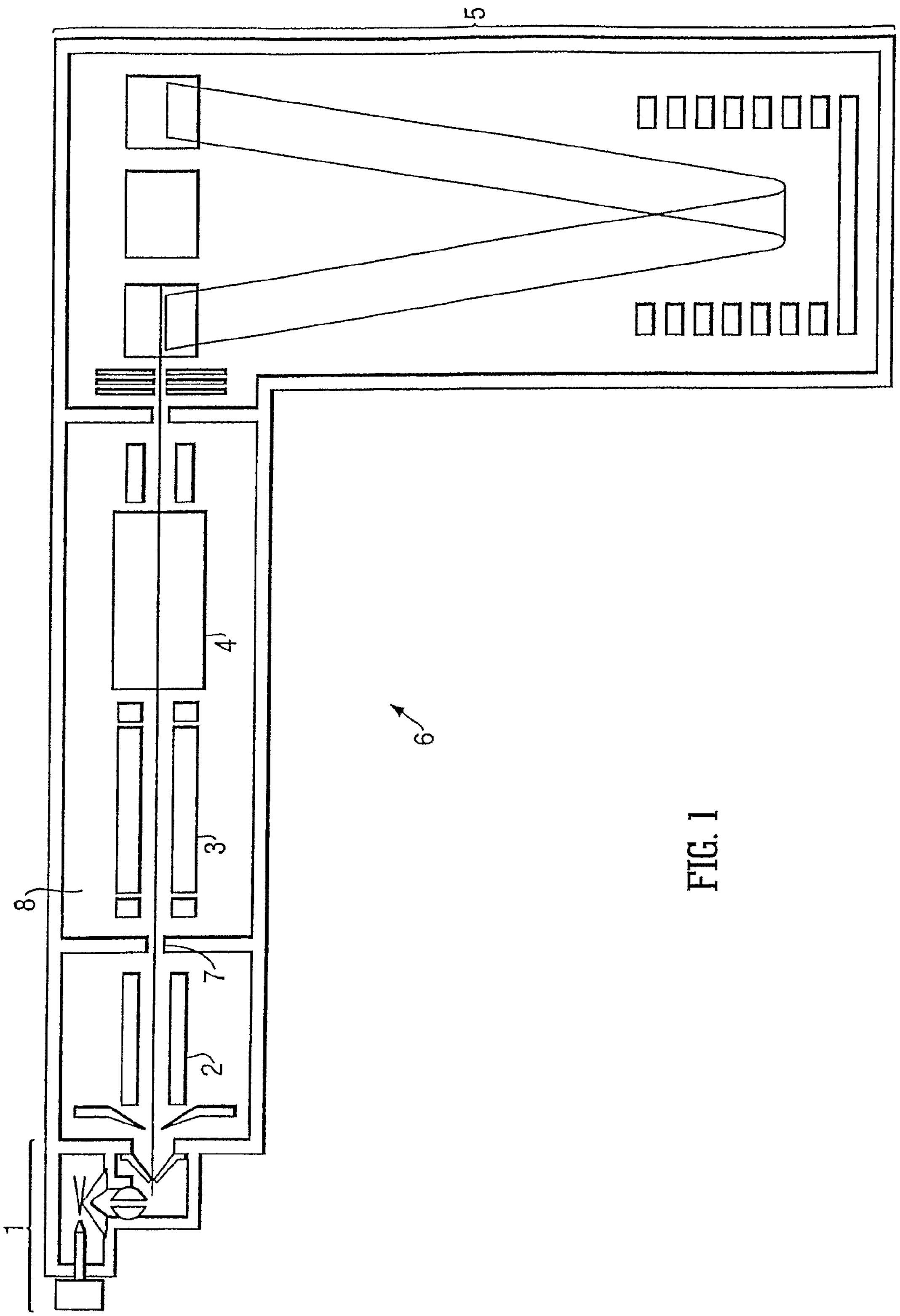
FIG. 1 is a schematic drawing of an embodiment of the present invention.

A preferred embodiment of the present invention will now be described with reference to FIG. 1. A mass spectrometer 6 is provided which preferably comprises an ion source 1, preferably an Electrospray ionization source, an ion guide 2, a quadrupole rod set mass filter 3, a collision, fragmentation or reaction device 4 and an orthogonal acceleration Time of Flight mass analyser 5 incorporating a reflectron. The ion guide 2 and the mass filter 3 may be omitted if necessary. The mass spectrometer 6 is preferably interfaced with a chromatograph, such as a liquid chromatograph (not shown) so that the sample entering the ion source 1 may be taken from the eluent of the liquid chromatograph.

The quadrupole rod set mass filter 3 is preferably disposed in an evacuated chamber which is preferably maintained at a relatively low pressure e.g. less than $10^{-5}$ mbar. The rod electrodes comprising the mass filter 3 are preferably connected to a power supply which generates both RF and DC potentials which determine the range of mass to charge values that are transmitted by the mass filter 3.

The collision, fragmentation or reaction device 4 preferably comprises a Collision Induced Dissociation Fragmentation device.

According to another embodiment the collision, fragmentation or reaction device 4 may comprise a Surface Induced Dissociation ("SID") fragmentation device, an Electron Transfer Dissociation fragmentation device, an Electron Capture Dissociation fragmentation device, an Electron Collision or Impact Dissociation fragmentation device, a Photo Induced Dissociation ("PID") fragmentation device, a Laser Induced Dissociation fragmentation device, an infrared radiation induced dissociation device, an ultraviolet radiation induced dissociation device, a thermal or temperature source fragmentation device, an electric field induced fragmentation device, a magnetic field induced fragmentation device, an enzyme digestion or enzyme degradation fragmentation device, an ion-ion reaction fragmentation device, an ion-molecule reaction fragmentation device, an ion-atom reaction fragmentation device, an ion-metastable ion reaction fragmentation device, an ion-metastable molecule reaction fragmentation device, an ion-metastable atom reaction fragmentation device, an ion-ion reaction device for reacting ions to form adduct or product ions, an ion-molecule reaction device for reacting ions to form adduct or product ions, an ion-atom reaction device for reacting ions to form adduct or product ions, an ion-metastable ion reaction device for reacting ions to form adduct or product ions, an ion-metastable molecule reaction device for reacting ions to form adduct or product ions or an ion-metastable atom reaction device for reacting ions to form adduct or product ions.

The collision, fragmentation or reaction device may according to one embodiment form part of the ion source. For example, the collision, fragmentation or reaction device may comprise a nozzle-skimmer interface fragmentation device, an in-source fragmentation device or an ion-source Collision Induced Dissociation fragmentation device.

According to an embodiment the collision, fragmentation or reaction device 4 may comprise a quadrupole or hexapole rod set which may be enclosed in a substantially gas-tight casing (other than a small ion entrance and exit orifice) into which a gas such as helium, argon, nitrogen, air or methane may be introduced at a pressure of between $10^{-4}$ and $10^{-1}$ mbar, preferably $10^{-3}$ mbar to $10^{-2}$ mbar. Suitable RF potentials for the electrodes comprising the collision, fragmentation or reaction device 4 may be provided by a power supply (not shown).

Ions generated by the ion source 1 are preferably transmitted by ion guide 2 and pass via an interchamber orifice 7 into a vacuum chamber 8. Ion guide 2 is preferably maintained at a pressure intermediate that of the ion source and vacuum chamber 8. In the embodiment shown, ions are mass filtered by the mass filter 3 before entering the collision, fragmentation or reaction device 4. However, mass filtering is not essential to the present invention. Ions exiting from the collision, fragmentation or reaction device 4 preferably pass into a Time of Flight mass analyser 5. Other ion optical components, such as further ion guides and/or electrostatic lenses, may be present (which are not shown in the figures or described herein) to maximise ion transmission between various parts or stages of the apparatus. Various vacuum pumps (not shown) may be provided for maintaining optimal vacuum conditions in the device. The Time of Flight mass analyser 5 incorporating a reflectron operates in a known way by measuring the transit time of the ions comprised in a packet of ions so that their mass to charge ratios can be determined.

A control means (not shown) preferably provides control signals for the various power supplies (not shown) which respectively provide the necessary operating potentials for the ion source 1, the ion guide 2, the quadrupole mass filter 3, the collision, fragmentation or reaction device 4 and the Time of Flight mass analyser 5. These control signals preferably determine the operating parameters of the instrument, for example the mass to charge ratios transmitted through the mass filter 3 and the operation of the analyser 5. The control means may be controlled by signals from a computer (not shown) which may also be used to process the mass spectral data acquired. The computer may also display and store mass spectra produced from the analyser 5 and receive and process commands from an operator. The control means may be automatically set to perform various methods and make various determinations without operator intervention, or may optionally require operator input at various stages.

The control means is preferably arranged to switch, vary or alter the collision, fragmentation or reaction device 4 back and forth between at least two different modes. In one mode a relatively high voltage or potential difference such as $\geqq$15V may be applied or maintained to the collision, fragmentation or reaction device 4. In a second mode a relatively low voltage or potential difference such as<5V may be applied or maintained to the collision, fragmentation or reaction device 4.

The control means switches between modes according to an embodiment approximately once every second. When the mass spectrometer is used in conjunction with an ion source being provided with an eluent separated from a mixture by means of liquid or gas chromatography, the mass spectrometer 6 may be run for several tens of minutes over which period of time several hundred high fragmentation or reaction mass spectra and several hundred low fragmentation or reaction mass spectra may be obtained.

According to the preferred embodiment the mass spectra or mass spectral data which are obtained are preferably subjected to a decimal mass filter as will be discussed in more detail below.

The accurate or exact mass or mass to charge ratio of a first (e.g. parent) substance or ion is preferably determined. The accurate or exact mass or mass to charge ratio preferably comprises a first integer nominal mass or mass to charge ratio component and a first decimal mass or mass to charge ratio component. A decimal window is preferably applied to the mass spectral data and is preferably arranged and adapted to search for one or more second substances or ions having a decimal mass or mass to charge ratio component which is between 0 to $x_1$ mDa or milli-mass to charge ratio units greater than the first decimal mass or mass to charge ratio component and/or between 0 to $x_2$ mDa or milli-mass to charge ratio units lesser than the first decimal mass or mass to charge ratio component.

The preferred embodiment preferably comprises searching for potential metabolites of a parent drug on the basis of the metabolites having substantially similar decimal mass or mass to charge ratios to that of the parent drug or decimal mass or mass to charge ratios which fall within a range which can be predicted if the decimal mass of the parent drug is known.

Ions relating to a potential metabolite of a parent drug may be fragmented so that a plurality of fragment ions are produced. The fragment ions are then preferably mass analysed.

According to an embodiment of the present invention the mass spectrometer may search for potential metabolites of a parent drug and in particular may search for ions having substantially similar decimal mass or mass to charge ratios to that of the parent drug.

At the end of the experimental run the data which has been obtained is, preferably analysed and parent or precursor ions and fragment, product, daughter or adduct ions may be recognised on the basis of the relative intensity of a peak in a mass spectrum obtained when the collision, fragmentation or reaction device 4 was in the first mode compared with the intensity of the same peak in a mass spectrum obtained approximately a second later in time when the collision, fragmentation or reaction device 4 was in the second mode.

According to an embodiment, mass chromatograms for each parent and fragment, product, daughter or adduct ion are preferably generated and fragment, product, daughter or adduct ions are preferably assigned to parent or precursor ions on the basis of their relative elution times.

An advantage of this method is that since all the data is acquired and subsequently processed then all fragment, product, daughter or adduct ions may be associated with a parent or precursor ion by closeness of fit of their respective elution times. This allows all the parent or precursor ions to be identified from their fragment, product, daughter or adduct ions, irrespective of whether or not they have been discovered by the presence of a characteristic fragment, product, daughter or adduct ion or characteristic “neutral loss”.

According to another embodiment an attempt may be made to reduce the number of parent or precursor ions of interest. A list of possible (i.e. not yet finalised) candidate parent or precursor ions is preferably formed by looking for parent or precursor ions which may have given rise to a predetermined fragment, product, daughter or adduct ion of interest e.g. an immonium ion from a peptide. Alternatively, a search may be made for parent and fragment, product, daughter or adduct ions wherein the parent or precursor ion could have fragmented into a first component comprising a predetermined ion or neutral particle and a second component comprising a fragment, product, daughter or adduct ion. Various steps may then be taken to further reduce/refine the list of possible candidate parent or precursor ions to leave a number of final candidate parent or precursor ions which are then subsequently identified by comparing elution times of the parent and fragment, product, daughter or adduct ions. As will be appreciated, two ions could have similar mass to charge ratios but different chemical structures and hence would most likely fragment differently enabling a parent or precursor ion to be identified on the basis of a fragment, product, daughter or adduct ion.

Figure 2:
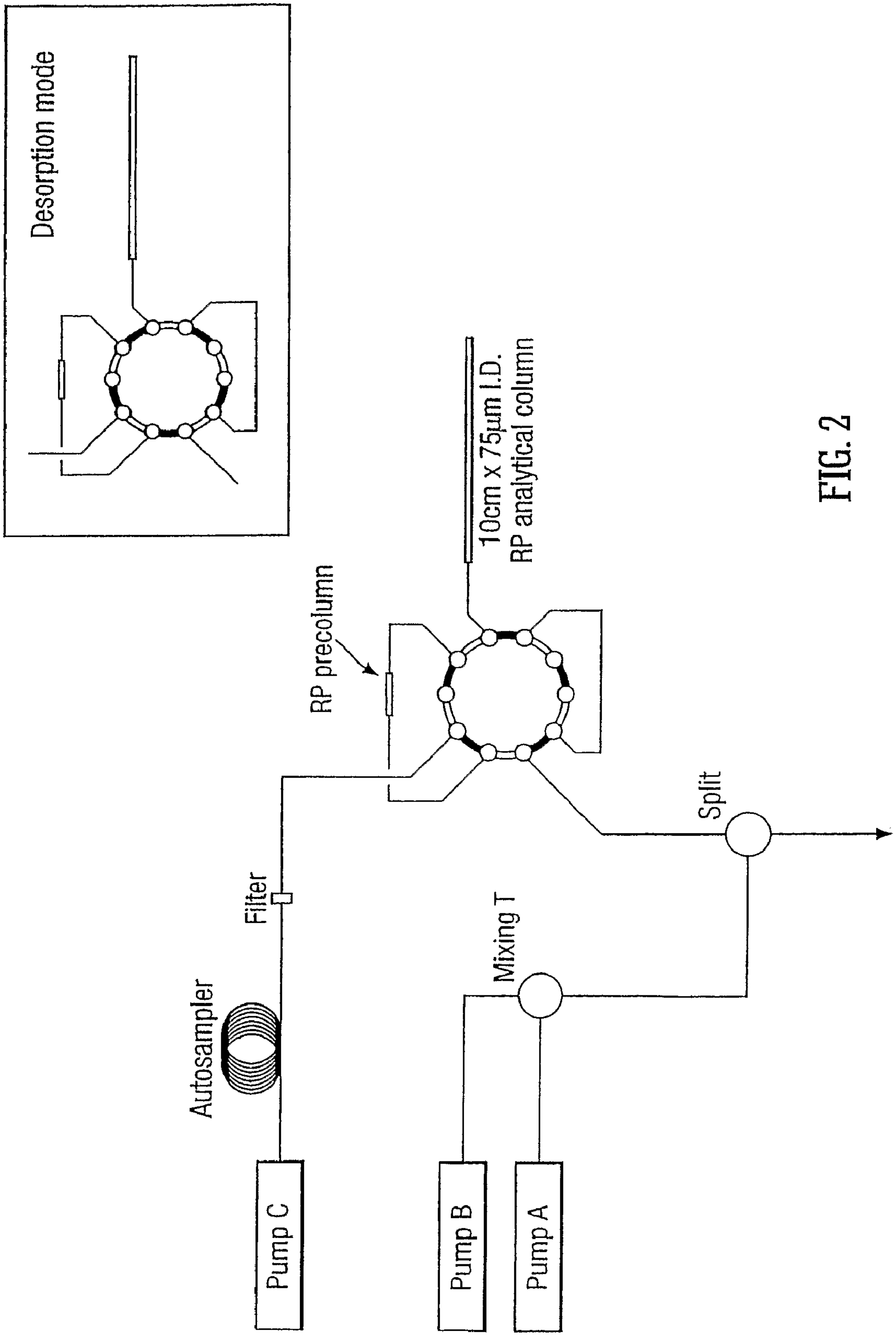
FIG. 2 shows a schematic of a valve switching arrangement during sample loading and desalting and the inset shows desorption of a sample from an analytical column.

According to an illustrative arrangement, samples were introduced into the mass spectrometer by means of a Micromass modular CapLC system. Samples were loaded onto a C18 cartridge (0.3 mm×5 mm) and desalted with 0.1% HCOOH for 3 minutes at a flow rate of 30 μL per minute (see FIG. 2). The ten port valve was then switched such that the peptides were eluted onto the analytical column for separation, see inset FIG. 2. The flow from pumps A and B were split to produce a flow rate through the column of approximately 200 nL/min.

The analytical column used was a PicoFrit (RTM) (www.newobjective.com) column packed with Waters (RTM) Symmetry C18 (www.waters.com). This was set up to spray directly into the mass spectrometer. The Electrospray potential (ca. 3 kV) was applied to the liquid via a low dead volume stainless steel union. A small amount (ca. 5 psi) of nebulising gas was introduced around the spray tip to aid the Electrospray process.

Data was acquired using a Q-Time of Flight2 (RTM) quadrupole orthogonal acceleration Time of Flight hybrid mass spectrometer (www.micromass.co.uk) fitted with a Z-spray (RTM) nanoflow Electrospray ion source. The mass spectrometer was operated in the positive ion mode with a source temperature of 80° C. and a cone gas flow rate of 40 L/hr.

The instrument was calibrated with a multi-point calibration using selected fragment ions that resulted from the Collision Induced Decomposition (CID) of Glu-fibrinopeptide b. All data were processed using the MassLynx suite of software.

Figure 3A:
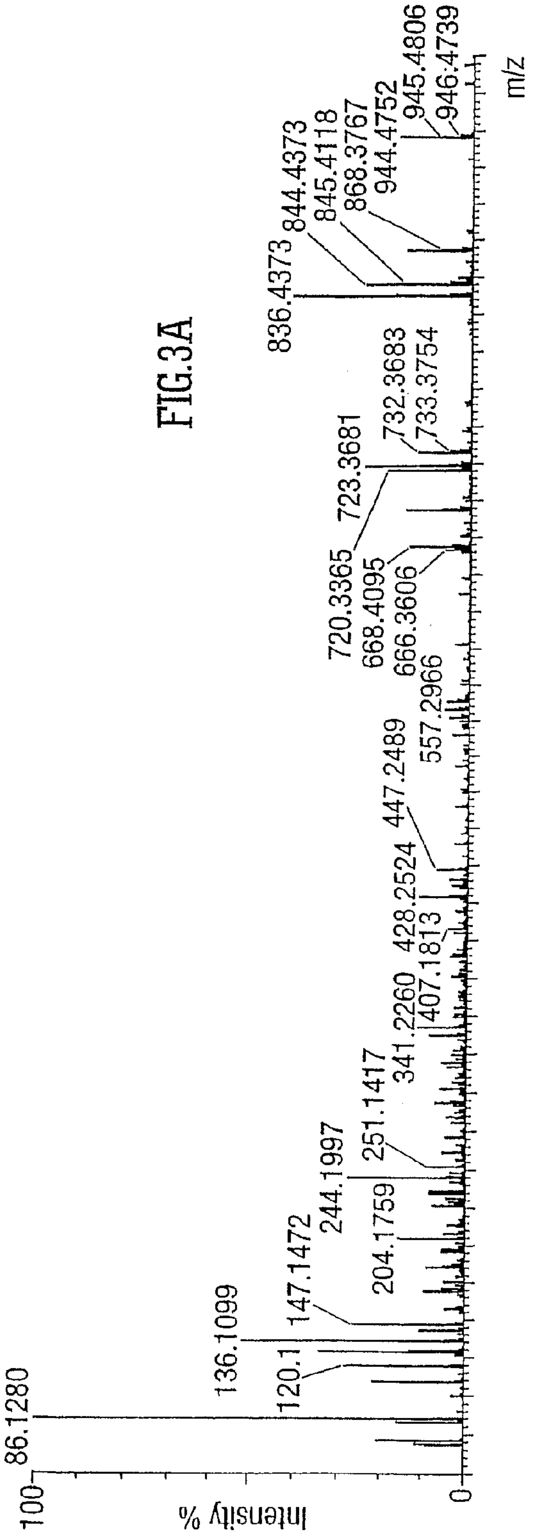
FIG. 3A shows a fragment or daughter ion mass spectrum and FIG. 3B shows a corresponding parent or precursor ion mass spectrum when a mass filter allowed parent or precursor ions having a mass to charge ratio greater than 350 to be transmitted.
Figure 3B:
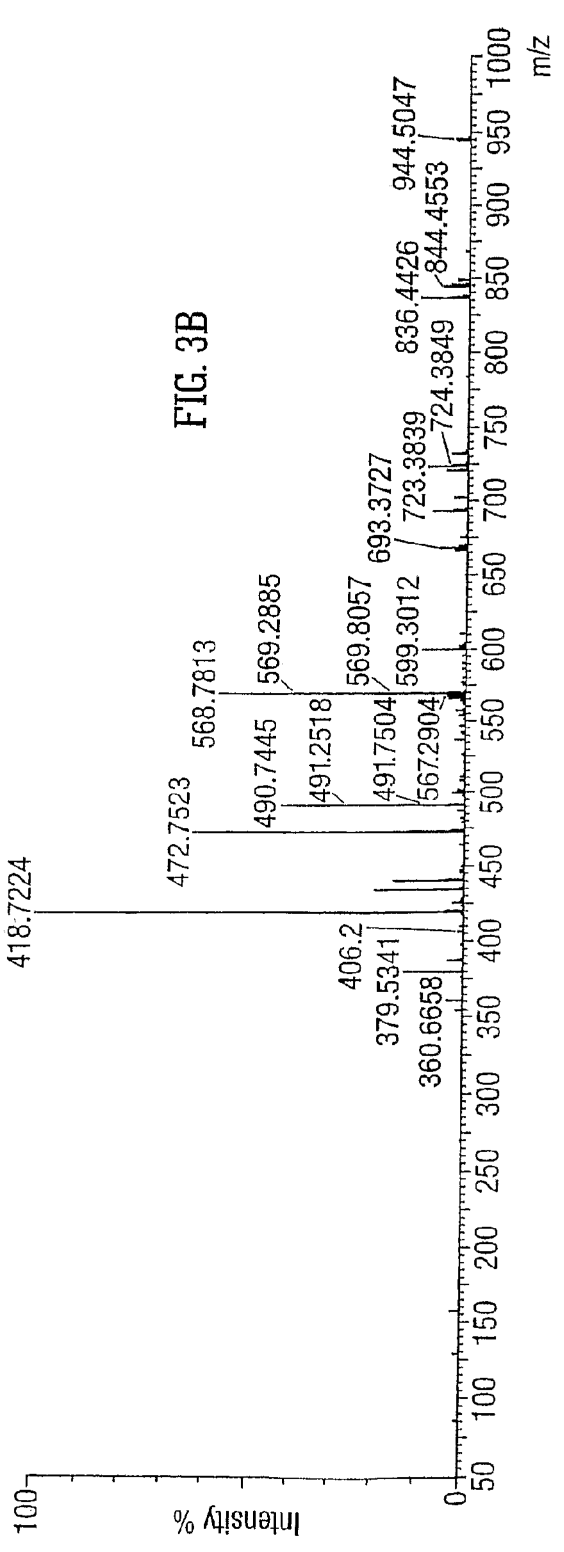

FIGS. 3A and 3B show respectively fragment or daughter and parent or precursor ion spectra of a tryptic digest of ADH known as alcohol dehydrogenase. The fragment or daughter ion spectrum shown in FIG. 3A was obtained while a gas collision cell was maintained at a relatively high potential of around 30V which resulted in significant fragmentation of ions passing therethrough. The parent or precursor ion spectrum shown in FIG. 3B was obtained at low collision energy e.g.<5V. The data presented in FIG. 3B was obtained using a mass filter 3 set to transmit ions having a mass to charge ratio>350. The mass spectra in this particular example were obtained from a sample eluting from a liquid chromatograph, and the spectra were obtained sufficiently rapidly and close together in time that they essentially correspond to the same component or components eluting from the liquid chromatograph.

In FIG. 3B, there are several high intensity peaks in the parent or precursor ion spectrum, e.g. the peaks at 418.7724 and 568.7813, which are substantially less intense in the corresponding fragment, product, daughter or adduct ion spectrum. These peaks may therefore be recognised as being parent or precursor ions. Likewise, ions which are more intense in the fragment, product, daughter or adduct ion spectrum than in the parent or precursor ion spectrum may be recognised as being fragment, product, daughter or adduct ions (or indeed are not present in the parent or precursor ion spectrum due to the operation of a mass filter upstream of the collision, fragmentation or reaction device). All the ions having a mass to charge value<350 in FIG. 3A can therefore be readily recognised as fragment, product, daughter or adduct ions either on the basis that they have a mass to charge value less than 350 or more preferably on the basis of their relative intensity with respect to the corresponding parent or precursor ion spectrum.

FIGS. 4A-4E show respectively mass chromatograms (i.e. plots of detected ion intensity versus acquisition time) for three parent or precursor ions and two fragment or daughter ions. The parent or precursor ions were determined to have mass to charge ratios of 406.2 (peak "MC1"), 418.7 (peak "MC2") and 568.8 (peak "MC3") and the two fragment or daughter ions were determined to have mass to charge ratios of 136.1 (peaks "MC4" and "MC5") and 120.1 (peak "MC6").

It can be seen that parent or precursor ion peak MC1 correlates well with fragment or daughter ion peak MC5 i.e. a parent or precursor ion with m/z=406.2 seems to have fragmented to produce a fragment or daughter ion with m/z=136.1. Similarly, parent or precursor ion peaks MC2 and MC3 correlate well with fragment or daughter ion peaks MC4 and MC6, but it is difficult to determine which parent or precursor ion corresponds with which fragment or daughter ion.

FIG. 5 shows the peaks of FIGS. 4A-4E overlaid on top of one other (drawn at a different scale). By careful comparison of the peaks of MC2, MC3, MC4 and MC6 it can be seen that in fact parent or precursor ion MC2 and fragment or daughter ion MC4 correlate well whereas parent or precursor ion MC3 correlates well with fragment or daughter ion MC6. This suggests that parent or precursor ions with m/z=418.7 fragmented to produce fragment or daughter ions with m/z=136.1 and that parent or precursor ions with m/z=568.8 fragmented to produce fragment or daughter ions with m/z=120.1.

This cross-correlation of mass chromatograms can be carried out by an operator or more preferably by automatic peak comparison means such as a suitable peak comparison software program running on a suitable computer.

FIG. 6 show the mass chromatogram for m/z 87.04 extracted from a HPLC separation and mass analysis obtained using Micromass' Q-TOF (RTM) mass spectrometer. The immonium ion for the amino acid Asparagine has a m/z value of 87.04. This chromatogram was extracted from all the high energy spectra recorded on the Q-TOF (RTM).

FIG. 7 shows the full mass spectrum corresponding to scan number 604. This was a low energy mass spectrum recorded on the Q-TOF (RTM), and is the low energy spectrum next to the high energy spectrum at scan 605 that corresponds to the largest peak in the mass chromatogram of m/z 87.04. This shows that the parent or precursor ion for the Asparagine immonium ion at m/z 87.04 has a mass of 1012.54 since it shows the singly charged $(M+H)^+$ ion at m/z 1013.54, and the doubly charged $(M+2H)^{++}$ ion at m/z 507.27.

FIG. 8 shows a mass spectrum from the low energy spectra recorded on a Q-TOF (RTM) mass spectrometer of a tryptic digest of the protein β-Caesin. The protein digest products were separated by HPLC and mass analysed. The mass spectra were recorded on the Q-TOF (RTM) operating in the MS mode and alternating between low and high collision energy in the gas collision cell for successive spectra.

FIG. 9 shows the mass spectrum from the high energy spectra recorded during the same period of the HPLC separation as that in FIG. 8 above.

FIG. 10 shows a processed and expanded view of the same spectrum as in FIG. 9 above. For this spectrum, the continuum data has been processed such to identify peaks and display as lines with heights proportional to the peak area, and annotated with masses corresponding to their centroided masses. The peak at m/z 1031.4395 is the doubly charged $(M+2H)^{++}$ ion of a peptide, and the peak at m/z 982.4515 is a doubly charged fragment ion. It has to be a fragment or daughter ion since it is not present in the low energy spectrum. The mass difference between these ions is 48.9880. The theoretical mass for $H_3PO_4$ is 97.9769, and the m/z value for the doubly charged $H_3PO_4^{++}$ ion is 48.9884, a difference of only 8 ppm from that observed.

In drug metabolism studies metabolites of interest cannot usually be predicted. This is because the formation of metabolites may be determined by novel enzymatic reactions and by factors which are difficult to predict in advance such as bioavailability.

At present in order to detect and identify metabolites it is known to separate out the many different components present in a complex biological matrix using liquid chromatography (LC or HPLC). The mass or mass to charge ratio of the components eluting from the liquid chromatograph is then measured using mass spectrometry (MS).

It is usually necessary to make many measurements using LC-MS (wherein parent ions eluting from a liquid chromatograph are mass analysed) and LC-MS-MS (wherein specific parent ions eluting from a liquid chromatograph are fragmented and the fragment products are mass analysed) often in both positive and negative ionisation modes. The exact accurate mass or mass to charge ratio of the components eluting from the liquid chromatograph is normally determined since this enables many of the large number of endogenous peaks present in different biological matrices such as bile, plasma, faeces and urine to be discounted.

Ions which are determined as having a mass to charge ratio which indicates that they may relate to a metabolite of interest are then fragmented in a collision cell. The resulting fragment products are then mass analysed enabling the structure of each possible metabolite to be predicted.

The conventional approach is, however, relatively time consuming since it is necessary to interrogate all of the mass spectral data to look for potential metabolites of interest. It is then necessary to arrange for all ions which are considered likely to, relate to metabolites of interest then to be separately fragmented so that the structure of potential metabolites of interest can then be determined.

It will be appreciated that the process of searching mass spectra relating to a complex mixture, identifying potential ions which may relate to metabolites of interest, selecting certain ions to be fragmented, fragmenting the ions of interest and then mass analysing the fragment products can be relatively time consuming.

Within the pharmaceutical and biotechnology industries it is particularly important to be able to analyse samples quickly and accurately. This has led to automated methods wherein the major peaks present in a mass spectrum are automatically selected for analysis by MS/MS (wherein specific parent ions are selected for fragmentation). This allows the user to acquire parent ion mass spectra and several MS/MS spectra from a single HPLC injection. It is known for to automatically select most intense peaks (i.e. ions) in a parent ion mass spectrum for subsequent analysis by MS/MS. Some conventional systems allow a few filters to be defined to make this process slightly more efficient. For example, ions having certain masses or mass to charge ratios may be entered into a data system so that they are automatically excluded from consideration. These masses or mass to charge ratios may, for example, correspond to the masses or mass to charge ratios of solvent peaks which are known to be present, or the masses or mass to charge ratios of components which have already been analysed.

An advantage of the conventional automated mode of data acquisition is that a fair degree of data may be acquired from a single HPLC injection. However, a disadvantage of the conventional approach is that only those peaks which have an intensity which exceeds a pre-defined intensity threshold are normally selected for subsequent MS/MS analysis (i.e. fragmentation analysis). Importantly, if a large number of intense peaks are present or observed at any one particular time, then some of these peaks may simply fail to be selected for MS/MS analysis due to there being insufficient time to record all the separate MS/MS spectra within the relatively short duration of an observed chromatography peak.

Another particular problem with the conventional approach is that since the mass or mass to charge ratios of potential metabolites is not generally known in advance, then time can be wasted analysing a large number of peaks all or many of which subsequently turn out to be of little or no interest. This can also mean that actual peaks of potential interest which could have been analysed if only they had been recognised fail to be analysed at all because the mass spectrometer is busy analysing other ions.

An advantage of the preferred embodiment is that potentially only drug related metabolite peaks are selected for subsequent analysis or are displayed and that all or at least a majority of the endogenous peaks are effectively ignored from further consideration. The preferred embodiment therefore significantly improves the process of searching for, mass analysing and identifying ions relating to metabolites of interest. The preferred embodiment also enables metabolites of interest to be selected for further analysis by, for example, fragmenting them within the inherent short timescales of liquid chromatography.

The preferred embodiment, in effect, filters out or substantially removes from further consideration a number of possible precursor ions in drug metabolism studies by selecting or displaying only those ions which have a mass or mass to charge ratio wherein the decimal part of the mass or mass to charge ratio falls within a pre-defined and preferably relatively narrow decimal mass or mass to charge ratio window. The decimal mass window is preferably centred about a decimal mass value which preferably varies as a function of absolute mass. According to an embodiment the decimal mass window is preferably centred about a decimal mass value which may vary from the decimal mass of the parent ion to zero (for low mass metabolites).

In metabolism studies the elemental composition of a parent drug is usually generally well known and hence it is possible to calculate the theoretical exact mass or mass to charge ratio of the parent drug. An example of a pharmaceutical drug and a related metabolite which may be recognised (and hence selected for further analysis) according to the preferred embodiment is shown in FIG. 11. FIG. 11 shows the elemental composition of a parent drug called Midazolam (C18 H13 Cl F N3) which has a monoisotopic protonated mass of 326.0860 Da. A common metabolic route for the drug is the addition of oxygen. Accordingly, if an oxygen is added to Midazolem then the mass will be increased by +15.9949 Da so that the monoisotopic mass of the new compound (i.e. the hydroxylated metabolite of Midazolem) will be 342.0809 Da.

The structure of the hydroxylated metabolite of Midazolem is also shown in FIG. 11. It is to be noted that the difference in the decimal part of the accurate mass of the parent drug Midazolem and its hydroxylated metabolite is only 0.0860−0.0809=0.0051 Da (i.e. a mass deficiency of only 5.1 mDa). It is apparent, therefore, that there is only a very small difference in the decimal mass component of the parent drug and the corresponding metabolite even though the total or absolute mass of the parent and metabolite differ by nearly 16 Da.

In mass spectrometry an ion may be assigned either an integer or absolute nominal mass or mass to charge ratio (e.g. 326 in the case of Midazolam) or an accurate or exact mass or mass to charge ratio (e.g. 326.0860 in the case of Midazolam). Accurate or exact masses or mass to charge ratios can be considered as comprising an integer component or value and a decimal component or value. This largely stems from the fact that all the elements (with the exception of Carbon) have approximately but not exactly integer masses. In the international scale for atomic masses the most abundant isotope of carbon is assigned an exact atomic mass of 12.0000 Dalton (Da). On this scale, the accurate atomic masses of the most abundant isotopes of the most abundant elements in biological systems are Hydrogen (H) 1.0078 Da, Nitrogen (N) 14.0031 Da and Oxygen (0) 15.9949 Da.

Accurate or exact (i.e. non-integer) masses or mass to charge ratios can be represented as an integer or absolute nominal mass or mass to charge ratio value or component together with a corresponding mass sufficiency or deficiency value or component. The mass sufficiency or deficiency may be considered to represent the deviation from an integer value and may be expressed in milli-dalton (mDa). For example, Hydrogen (H) can be expressed as having an integer or absolute nominal mass of 1 and a mass sufficiency of 7.8 mDa, Nitrogen (N) can be expressed as having an integer nominal mass of 14 and a mass sufficiency of 3.1 mDa and Oxygen (O) can be expressed as having an integer nominal mass of 16 and a mass deficiency of 5.1 mDa.

In a similar manner, the mass or mass to charge ratio of an ion of an organic molecule can be assigned an integer nominal mass or mass to charge ratio together with a corresponding mass sufficiency or deficiency from that integer value.

When considering the mass or mass to charge ratio of ions or compounds according to the preferred embodiment, the method of ionisation is also preferably taken into consideration as this allows the ionic elemental composition to be determined and hence also the ionic mass or mass to charge ratio to be calculated. For example, if a solution is ionised by Electrospray ionisation then the analyte molecules may be protonated to form positively charged ions.

From knowledge of the theoretical accurate mass or mass to charge ratio of these ions it is possible, according to the preferred embodiment, to make certain predictions concerning the accurate mass or mass to charge ratio of possible or potential metabolites of interest. This in turn allows a better prediction of peaks that are likely to be metabolites of interest and thus potential metabolites can be searched for, recognised and then passed or selected for further analysis such as structural analysis by MS/MS.

Metabolites are the result of bio-transformations to a parent drug. An aspect of the preferred embodiment is the recognition and exploitation of the fact that the mass sufficiency or mass deficiency of a potential metabolite of interest will be substantially similar to the mass sufficiency or mass deficiency of the corresponding parent drug.

An aspect of the preferred embodiment is the recognition that the potential similarity between the mass sufficiency or mass deficiency of a parent ion and potential metabolites can be used to search more strategically for potential metabolites of interest and/or to filter out ions from mass spectral data which are unrelated to a parent ion of interest. In particular, the preferred embodiment searches for metabolites in mass spectral data on the basis that the decimal part of the accurate or exact mass or mass to charge ratio of a parent drug will be substantially similar to the decimal part of the accurate or exact mass or mass to charge ratio of a metabolite of the parent drug.

According to the preferred embodiment the decimal part of the accurate mass or mass to charge ratio of a precursor ion of a parent drug is calculated. A decimal mass or mass to charge ratio window is then preferably set about the precise decimal mass or mass to charge ratio of the parent drug. According to the preferred embodiment an upper limit and a lower limit to the decimal mass window are preferably set. However, according to other embodiments only an upper limit or only a lower limit to the decimal mass window may be set. According to an embodiment the upper and lower limits may have the same magnitude or width, or alternatively the upper and lower limits may differ in magnitude or width.

According to a preferred embodiment a precursor or parent ion mass spectrum of a sample believed to contain one or more metabolites of interest is preferably obtained. The parent ion mass spectrum may be automatically searched for some or all mass peaks which meet the criteria that the decimal part of the accurate mass or mass to charge ratio of an ion must be very close to the decimal mass part of the accurate mass or mass to charge ratio of the known parent compound or ion. According to the preferred embodiment, ions of potential interest (which preferably relate to one or more metabolites of the parent compound) are preferably recognised, identified or otherwise selected for further analysis by virtue of the fact that the decimal mass or mass to charge ratio of the ion is determined as falling within a relatively narrow band or range of masses or mass to charge ratios about the decimal mass or mass to charge ratio of the parent compound or ion.

The characteristics of the decimal mass or mass to charge ratio window which is preferably used in the process of searching for metabolites of interest will now be described in more detail with reference to FIG. 12.

FIG. 12 indicates the width of a decimal mass or mass to charge ratio window which may be used or applied to mass spectral data according to the preferred embodiment. The width of the decimal mass or mass to charge ratio window (in mDa) is shown as a function of the difference in the absolute mass (in Da) or mass to charge ratio between that of the parent ion or compound and ions or compounds being searched for which may include metabolite ions or compounds. The difference in absolute mass or mass to charge ratio between the parent compound or ion and the ions or compounds being searched for, which may include metabolite ions or compounds of interest, may be referred to as $\Delta M$. Similarly, the upper and lower limits of the decimal mass or mass to charge ratio window may be referred to as having a value $\delta m$.

By way of example, if the absolute difference in mass or mass to charge ratio between the parent ion and a potential ion of interest is 10 Da then according to the embodiment shown in FIG. 12 a decimal mass or mass to charge ratio window having an upper limit+20 mDa greater than the precise decimal mass or mass to charge ratio of the parent ion and a lower limit 20 mDa below the precise decimal mass or mass to charge ratio of the parent ion may be set.

According to an embodiment, the upper and lower limits of the decimal mass or mass to charge ratio window may vary as a function of the absolute difference $\Delta M$ in the mass or mass to charge ratio of the parent ion to that of a possible metabolite ion. Therefore, as also shown in FIG. 12, if the absolute difference in mass or mass to charge ratio between the parent ion and a potential ion of interest is for example 100 Da, then according to the embodiment shown and described with reference to FIG. 12 the upper and lower limits of the decimal mass or mass to charge ratio window are asymmetric. According to the particular embodiment shown in FIG. 12 the mass or mass to charge ratio window has an upper limit+92 mDa greater than the precise decimal mass or mass to charge ratio of the parent ion and a lower limit only 50 mDa less than the precise decimal mass or mass to charge ratio of the parent ion.

In general terms and as shown in FIG. 12, when the difference $\Delta M$ in mass or mass to charge ratio between the parent ion or compound and the metabolite ion or compound of interest is relatively small (e.g. ±0-30 Da) then the size of the upper and lower limits of the decimal mass or mass to charge ratio window according to the preferred embodiment may also be relatively small (e.g. in the region of 20-30 mDa). However, as the absolute difference $\Delta M$ in the mass or mass to charge ratio between the parent ion or compound and a possible metabolite ion or compound of interest increases, then so the size of the upper and lower limits of the decimal mass or mass to charge ratio window also preferably increases.

According to the embodiment shown in FIG. 12, when searching for metabolites of interest wherein the mass or mass to charge ratio difference $\Delta M$ (i.e. the mass or mass to charge ratio of the parent ion or compound minus the mass or mass to charge ratio of the metabolite ion or compound) is in the range −40 to 20 Da, then the upper limit of the decimal mass or mass to charge ratio window is preferably set to a constant value of 20 mDa. If the mass or mass to charge ratio difference between the parent ion or compound and the metabolite ion or compound of interest is >20 Da, then the upper limit of the decimal mass or mass to charge ratio window preferably increases at a rate of +0.09% times $\Delta M$ above 20 Da (i.e. when $\Delta M$ is +100, then the upper limit of the decimal mass window or mass to charge ratio is preferably set at 20 mDa+0.09% * (100 Da−20 Da)=20 mDa+0.072 Da=92 mDa). If the mass or mass to charge ratio difference between the parent ion or compound and the metabolite ion or compound of interest is<−40 Da, then the upper limit of the decimal mass or mass to charge ratio window preferably increases at a rate of 0.05% times ΔM below −40 Da (i.e. when ΔM is −100, then the upper limit of the decimal mass or mass to charge ratio window is set at 20 mDa+0.05% * (100 Da−40 Da)=20 mDa+0.030 Da=50 mDa).

Similarly, when searching for metabolites of interest wherein the mass or mass to charge ratio difference ΔM between the parent ion or compound and the metabolite ion or compound is in the range −20 to 40 Da, then the lower limit of the decimal mass or mass to charge ratio window is preferably set to a constant value of −20 mDa. If the mass or mass to charge ratio difference between the parent ion or compound and the metabolite ion or compound of interest is>40 Da, then the lower limit of the decimal mass or mass to charge ratio window preferably increases negatively at a rate of −0.05% times ΔM above 40 Da (i.e. when ΔM is+100, then the lower limit of the decimal mass or mass to charge ratio window is preferably set at−20 mDa−0.05% * (100 Da−40 Da)=−20 mDa−0.030 Da=−50 mDa). If the mass or mass to charge ratio difference between the parent ion or compound and the metabolite ion or compound of interest is<−20 Da, then the lower limit of the decimal mass or mass to charge ratio window preferably increases negatively at a rate of −0.09% times ΔM below −20 Da (i.e. when ΔM is −100, then the lower limit of the decimal mass or mass to charge ratio window is set at −20 mDa−0.09% * (100 Da−20 Da)=−20 mDa−0.072 Da=−92 mDa).

It will be appreciated that each different parent drug will have a specific known mass or mass to charge ratio. The approach according to the preferred embodiment assumes that metabolites of the parent drug will have a similar structure to that of the parent drug and that the decimal part of the accurate mass or mass to charge ratio of each metabolite will be similar to the decimal part of the accurate mass or mass to charge ratio of the parent drug.

Ions which according to the preferred embodiment are determined as having an accurate mass or mass to charge ratio with a decimal part which falls within the decimal mass or mass to charge ratio window as determined by the preferred embodiment may be selected for further analysis in a subsequent mode of operation. For example, a mass filter such as a quadrupole mass filter may be used to select specific ions which are considered to be potentially metabolite ions of interest having a specific mass to charge ratio to be onwardly transmitted to a collision or fragmentation cell. The ions may then be fragmented within the collision or fragmentation cell and the resulting fragment product ions may then be mass analysed.

The preferred embodiment enables a large number of endogenous ion peaks to be automatically eliminated from further consideration. This is particularly advantageous and as a result the preferred embodiment relates to a significantly improved method of recognising potential metabolites in a sample.

The decimal mass or mass to charge ratio window within which the decimal part of the accurate mass or mass to charge ratio of a metabolite or other ion should fall may be defined prior to proceeding with LC-MS and/or LC-MS-MS experiments. The value or size of the decimal mass or mass to charge ratio window may be set to accommodate the mass errors likely to occur during an experimental run. The value or size may also be set according to the elemental composition of the parent drug. For example, if the parent drug does not contain elements other than carbon, hydrogen, nitrogen, oxygen and fluorine, then the upper and/or lower limits of the decimal mass or mass to charge ratio window may be set to a lower (smaller) value than if the parent drug contains any or all of the elements phosphorous, sulphur and chlorine. This is because phosphorous, sulphur and chlorine all have larger mass deficiencies than carbon, hydrogen, nitrogen, oxygen and fluorine.

The greater the mass or mass to charge ratio difference between that of the parent drug and that of the metabolite, then the more atoms which are likely to be involved in the bio-transformation. Accordingly, if several atoms are considered to be involved in the bio-transformation then greater allowance should preferably be made for the change in the decimal part of the accurate mass or mass to charge ratio. In other words, as the difference in the absolute mass or mass to charge ratio between that of the parent drug and of the metabolite increases, then preferably the width or size of the decimal mass or mass to charge ratio window or the upper and/or lower limits of the decimal mass or mass to charge ratio window should also increase since the metabolite is likely to have a greater mass deficiency or sufficiency.

According to the preferred embodiment allowance may be made for the fact that the maximum change in mass sufficiency that may have occurred in the bio-transformation may be different to the maximum change in mass deficiency which may have occurred. Accordingly, an asymmetric decimal mass or mass to charge ratio window may be used similar, for example, to the asymmetric decimal mass or mass to charge ratio window shown and described in relation to the embodiment depicted in FIG. 12.

According to other less preferred embodiments a simple symmetrical decimal mass or mass to charge ratio window may be used. For example, for mass or mass to charge ratio differences ΔM between that of parent drug and ions of interest of up to±20 Da, a decimal mass or mass to charge ratio window having upper and lower limits of±20 mDa may be used. If the mass or mass to charge ratio difference between that of the parent drug and an ion of interest is<−20 Da or>20 Da then the upper and lower limits of the decimal mass or mass to charge ratio window may increase at a rate of 0.1% for mass or mass to charge ratio differences<−20 Da or>20 Da.

In the general case, the decimal mass or mass to charge ratio window may have multiple values of decimal mass or mass to charge ratio difference δm for a mass or mass to charge ratio difference ΔM between that of the parent drug ions of interest. The values of δm and ΔM may preferably be defined independently for each polarity of δm and ΔM.

According to the preferred embodiment, the mass spectrometer preferably records parent ion mass spectra and fragment ion mass spectra from selected precursor or parent ions that are induced to fragment. The mass spectrometer may, for example, comprise a magnetic sector, a Time of Flight, an orthogonal Time of Flight, a quadrupole mass filter, a 3D quadrupole ion trap, a linear quadrupole ion trap or an FT-ICR mass analyser, or any combination thereof.

According to a particularly preferred embodiment, the mass spectrometer may comprise either a magnetic sector, a Time of Flight, an orthogonal Time of Flight or an FT-ICR mass analyser.

The mass spectrometer may in a mode of operation default to the acquisition of full parent ion mass spectra unless and until a mass peak is detected wherein the decimal part of the accurate mass or mass to charge ratio of the detected ion falls within a preferably pre-defined decimal mass or mass to charge ratio window. Once such a mass peak is detected then the mass spectrometer and related control software may then preferably switch the instrument so that parent ions having a specific decimal mass or mass to charge ratio or interest are selected and transmitted by a mass filter whilst other ions having decimal masses or mass to charge ratios falling outside the decimal mass or mass to charge ratio window are preferably substantially attenuated or lost to the system. Selected parent ions of interest are then preferably passed to a fragmentation or collision cell which preferably comprises an ion guide and a collision gas maintained at a pressure preferably>$10^{-3}$ mbar. The ions are preferably accelerated into the collision or fragmentation cell at energies such that upon colliding with the collision gas present in the collision or fragmentation cell, the ions are preferably caused to fragment into fragment product ions. The fragment product ions are then preferably mass analysed and a full mass spectrum of the fragment product ions is then preferably obtained. The fragmentation or collision cell may then be repeatedly switched between a high fragmentation and a low fragmentation mode of operation.

Although the size of the decimal mass or mass to charge ratio window is preferably pre-defined, according to other less preferred embodiments the size of the decimal mass or mass to charge ratio window may be altered in response to experimental data or on the basis of another parameter. According to an embodiment, for example, a first experimental run may be performed wherein a decimal mass or mass to charge ratio window having a first profile or size as a function of $\Delta M$, $M_1$ or $M_2$ may be applied and then in a second subsequent experimental run a decimal mass or mass to charge ratio window having a second different profile or size as a function of $\Delta M$, $M_1$ or $M_2$ may be applied.

According to an embodiment control software may select or determine other parameters including the optimum fragmentation collision energy appropriate for a selected precursor or parent ion.

An important advantage of the preferred embodiment is that it enables more useful MS/MS spectra to be acquired within the limited timescale of a single LC-MS experiment. This reduces the time taken to get the required data. Another important advantage of the preferred embodiment is that the preferred method facilitates the detection of low level metabolites that might otherwise be missed if a conventional approach were adopted due to the presence of a large number of relatively intense endogenous mass peaks.

With reference to the example of Midazolem, FIG. 13 shows a parent ion mass spectrum of the drug Midazolem as recorded using a hybrid quadrupole Time of Flight mass spectrometer. The measured mass to charge ratio for the major isotope was determined as being 326.0872 (cf. a theoretical value of 326.0860). FIG. 14 shows a parent ion mass spectrum of the hydroxylated metabolite of Midazolam as recorded using the same hybrid quadrupole Time of Flight mass spectrometer. The measured mass to charge ratio for the major isotope was determined as being 342.0822 (cf. a theoretical value of 342.0809). From the experimental data, the difference in the decimal part of the accurately determined mass to charge ratio of the parent drug and the decimal part of the accurately determined mass to charge ratio of the hydroxylated metabolite was 0.0872−0.0822=0.0050 Da i.e. a mass deficiency of only 5 mDa.

From the experimental data shown in FIGS. 13 and 14 it will be appreciated that more generally, potential metabolites of Midazolem including the hydroxylated metabolite of Midazolem could be searched for, located and then be selected for further consideration and analysis (preferably by MS-MS). This can be achieved by searching parent ion mass spectral data for mass peaks which may have potentially quite different absolute mass to charge ratios but wherein the difference in the decimal mass or mass to charge ratio of the parent drug and the ion in question is, for example, less than 10 mDa.

The method according to the preferred embodiment provides an effective way of being able to detect efficiently mass peaks likely to be (or at least include) metabolites of interest with no (or relatively few) ions relating to endogenous components also being analysed. The preferred method therefore advantageously effectively filters out or removes from further consideration numerous endogenous mass peaks which would otherwise have been included for consideration according to the conventional techniques.

The preferred embodiment advantageously enables in a mode of operation a mass spectrometer to switch to record the fragment ion spectrum of ions which are likely to relate to metabolites of interest within the time scales during which a typical liquid chromatography mass peak is observed without wasting time analysing a large number of ions which turn out not to be metabolites of interest.

According to an embodiment an intelligent exact mass deficiency algorithm may be used together with in silico metabolite prediction to predetermine DDA experiments for metabolism studies preferably using a hybrid quadrupole Time of Flight mass spectrometer.

One of the main problems when carrying out DDA (data dependant experiments) is that a considerable amount of time may be spent performing DDA experiments on ions that turn out not be of interest. As a result, important putative metabolites can easily be missed.

According to an embodiment specific metabolites may be predicted in advance by computer and an appropriate exact decimal mass or mass to charge ratio data filter window may be set. According to the embodiment the metabolites from a given new chemical entity or a standard compound may be predicted and then searched for. Once the metabolites have been predicted, an exact decimal mass window may be set so as to only switch to perform a DDA experiment when ions having decimal masses or mass to charge ratios within the set decimal mass or mass to charge ratio window (which may, for example, have an upper and/or lower limit of 10-20 mDa) are observed as being present.

According to an embodiment potentially unknown metabolites or fragments may be discovered. A user may, for example, select or set an exact decimal mass or mass to charge ratio window to detect metabolites already predicted on the basis of their exact decimal mass or mass to charge ratio so that MS/MS experiments may be carried out in a mode of operation. In addition to this, an exact mass deficiency based upon the exact mass or mass to charge ratio of the parent compound can be determined. This particular data filter may be considered more specific than the data filter according to the previously described embodiment since there may be cases where not all of the metabolites will be predicted. Therefore, metabolites which are not predicted will be detected in the DDA experiments with an exact mass or mass to charge ratio data filter.

An exact mass or mass to charge ratio deficiency filter may operate in the following mode. An exact mass or mass to charge ratio deficiency filter based upon the decimal places of the mass or mass to charge ratio of the parent drug under analysis may be used. According to this embodiment a post processing filter may be used that allows the removal of unexpected metabolite entries in a MetaboLynx browser which do not agree with user-defined criteria. The use of this filter can dramatically reduce the number of false entries in an unexpected metabolite table by filtering out the vast majority of matrix-related entries which may share the same nominal mass as potential metabolites. This allows users to use low threshold values during data processing so that very low metabolite levels are identified without going through the tedious task of manually excluding false positives. The filter is preferably an accurate and specific filter since it is based on exact mass and mass deficiencies which are specific to each parent drug of interest.

Each parent drug is comprised of a specific number of elements (C, H, N, O etc.). Depending upon the number of each one of the elements mentioned, the decimal mass or mass to charge ratio of the drug will be very specific. For example, with reference to FIG. 15A, Verapamil contains the following elements: C27 H38 N2 O4. This equates to a monoisotopic protonated mass of 455.2910 Da. If an alkyl group is taken away (N-dealkylation, a common metabolic route) and a glucuronide is added, then the mass is shifted by precisely+162.0164 Da. The metabolite therefore has a monoisotopic mass of 617.3074 Da. The decimal mass difference between Verapamil and its N-dealkylated metabolite corresponds with an exact mass deficiency of 0.3074−0.2910=0.0164 Da (16.4 mDa). Therefore, if a decimal mass or mass to charge ratio window of around 20 mDa were used then it would be possible to detect its N-dealkylated glucuronidated metabolite. Prior knowledge of the metabolites of Verapamil may not be necessary if some or all of the following assumptions are made: (i) all metabolites will have decimal masses or mass to charge ratios within 250 mDa of the decimal mass or mass to charge ratio of the corresponding parent; (ii) the metabolites of interest will, in general, have a decimal mass or mass to charge ratio within 100 mDa of the parent if there are no major cleavages leading to much smaller fragments (e.g. the largest phase II biotransformation, glutathione conjugation, will lead to a mass defect difference of 68 mDa compared to the parent drug); and (iii) most metabolites will fall within a 180 mDa decimal mass or mass to charge ratio window of the parent compound even if certain cleavages take place in the structure to yield smaller fragments.

FIGS. 15A and 15B show a metabolite of Ketotifen, Verapamil and Indinavir and include cleavages. The maximum decimal mass or mass to charge ratio deficiency is in the case of Indinavir (FIG. 15B) wherein the metabolite has a decimal mass or mass to charge ratio which is 167.7 mDa different from the decimal mass or mass to charge ratio of the parent compound. Mass deficiency shifts are very specific for each metabolite and parent drug.

The various embodiments of the present invention may be implemented not only on hybrid quadrupole orthogonal Time of Flight instruments as according to the preferred embodiment, but also using nominal mass instruments such as triple quadrupoles, linear and 3D ion traps and exact mass instruments such as MALDI/Quadrupole Time of Flight and FTMS.

According to an embodiment the decimal mass window which is applied to mass spectral data varies as shown in FIG. 12 as function of the difference in mass between the parent ion or compound and the metabolite. However, other embodiments are contemplated wherein the width of the decimal mass filter varies as function of the absolute or integer mass of the compound or metabolite being investigated. FIG. 16 shows a parent drug (Verapamil) having a monoisotopic mass of 454.2831 Da. Metabolites are searched for by applying a decimal mass window which varies as a function of the absolute mass of the compound or metabolite under consideration. The decimal mass window is applied about a mass defect value which also varies as a function of the absolute mass of the compound or metabolite under consideration.

With the example shown in FIG. 16, compounds or metabolites having an absolute or integer mass in the range 260-305 Da are subjected to a decimal mass window which is applied about a decimal mass or mass defect value of 0.2060. The decimal mass window applied has an upper limit of+7 mDa and a lower limit of −25 mDa i.e. for ions having an absolute or integer mass in the range 260-305 Da ions which have a decimal mass in the range 0.1810-0.2130 are considered to be ions of potential interest (e.g. metabolite ions) and ions having a decimal mass outside of this range are preferably attenuated or reduced in significance.

Compounds or metabolites having an absolute or integer mass in the range 400-480 Da are subjected to a decimal mass window which is applied about a decimal mass or mass defect value of 0.2910. The decimal mass window has an upper limit of+7 mDa and a lower limit of−30 mDa i.e. for ions having an absolute or integer mass in the range 400-490 Da ions which have a decimal mass in the range 0.2610-0.2980 are considered to be ions of potential interest (e.g. metabolite ions) and ions having a decimal mass outside of this range are preferably attenuated or reduced in significance.

As shown in FIG. 16, a first metabolite of Verapamil has a monoisotopic mass of 290.1994 Da. For ions having an absolute or integer mass in the range 260-305 a decimal mass window having a range 0.1810-0.2130 is applied and hence the first metabolite having a decimal mass of 0.1994 Da falls within the decimal mass window and can be identified as being a potential metabolite of the parent drug.

A second metabolite of Verapamil has a monoisotopic mass of 440.2675 Da. For ions having an absolute or integer mass in the range 400-480 a decimal mass window having a range 0.2610-0.2980 is applied and hence the second metabolite having a decimal mass of 0.2675 falls within the decimal mass window and can also be identified as being a potential metabolite of the parent drug.

FIG. 17 shows a mass chromatogram or total ion current of Verapamil obtained in a conventional manner and another mass chromatogram or total ion current of Verapamil obtained according to an embodiment of the present invention wherein a decimal mass window was applied to the mass spectral data. The parent drug and metabolites can be seen clearly when the approach according to the preferred embodiment is adopted.

Although the present invention has been described with reference to preferred embodiments, it will be understood by those skilled in the art that various changes in form and detail may be made without departing from the scope of the invention as set forth in the accompanying claims.

The invention claimed is:

1. A method of mass spectrometry comprising the steps of:

(a) passing parent or precursor ions to a collision, fragmentation or reaction device;

(b) operating said collision, fragmentation or reaction device in a first mode of operation wherein at least some of said parent or precursor ions are collided, fragmented or reacted to produce fragment, product, daughter or adduct ions;

(c) recording first mass spectral data relating to ions emerging from or which have been transmitted through said collision, fragmentation or reaction device operating in said first mode of operation;

(d) switching, altering or varying said collision, fragmentation or reaction device to operate in a second mode of operation wherein substantially fewer parent or precursor ions are collided, fragmented or reacted;

(e) recording second mass spectral data relating to ions emerging from or which have been transmitted through said collision, fragmentation or reaction device operating in said second mode of operation;

(f) repeating steps (b)-(e) a plurality of times;

(g) determining the accurate or exact mass or mass to charge ratio of one or more parent or precursor substances or ions, wherein said accurate or exact mass or mass to charge ratio of said one or more parent or precursor substances or ions comprise a first integer nominal mass or mass to charge ratio component $M_1$ and a first decimal mass or mass to charge ratio component $m_1$; and (h) searching for or determining one or more fragment, product, daughter or adduct substances or ions in or from said first mass spectral data, wherein said one or more fragment, product, daughter or adduct substances or ions comprise a second integer nominal mass or mass to charge ratio component $M_2$ and a second decimal mass or mass to charge ratio component $m_2$, wherein said second decimal mass or mass to charge ratio component $m_2$ is between 0 to $x_1$ mDa or milli-mass to charge ratio units greater than said first decimal mass or mass to charge ratio component $m_1$ and/or between 0 to $x_2$ mDa or milli-mass to charge ratio units less than said first decimal mass or mass to charge ratio component $m_1$.

2. A method as claimed in claim 1, wherein said parent or precursor substances or ions comprise or relate to:

(i) a pharmaceutical compound, drug or active component; or (ii) one or more metabolites or derivatives of a pharmaceutical compound, drug or active element; or (iii) a biopolymer, protein, peptide, polypeptide, oligionucleotide, oligionucleoside, amino acid, carbohydrate, sugar, lipid, fatty acid, vitamin, hormone, portion or fragment of DNA, portion or fragment of cDNA, portion or fragment of RNA, portion or fragment of mRNA, portion or fragment of tRNA, polyclonal antibody, monoclonal antibody, ribonuclease, enzyme, metabolite, polysaccharide, phosphorolated peptide, phosphorolated protein, glycopeptide, glycoprotein or steroid.

3. A method as claimed in claim 1, wherein said step of searching for or determining one or more fragment, product, daughter or adduct substances or ions comprises searching for or determining solely on the basis of the decimal mass or mass to charge ratio component of said one or more fragment, product, daughter or adduct substances or ions and not on the basis of the integer nominal mass or mass to charge ratio component of said one or more fragment, product, daughter or adduct substances or ions.

4. A method as claimed in claim 1, wherein said step of searching for or determining one or more fragment, product, daughter or adduct substances or ions further comprises applying a decimal mass or mass to charge ratio window to said first mass spectral data or a mass spectrum, wherein said decimal mass or mass to charge ratio window filters out, removes, attenuates or at least reduces the significance of fragment, product, daughter or adduct substances or ions having a decimal mass or mass to charge ratio component which falls outside of said decimal mass or mass to charge ratio window.

5. A method as claimed in claim 1, further comprising selecting for further analysis either:

(i) one or more second substances or ions which have a decimal mass or mass to charge ratio component which is between 0 to $x_1$ mDa or milli-mass to charge ratio units greater than said first decimal mass or mass to charge ratio component $m_1$ and/or between 0 to $x_2$ mDa or milli-mass to charge ratio units less than said first decimal mass or mass to charge ratio component $m_1$; and/or (ii) one or more second substances or ions which when collided, fragmented or reacted produce one or more fragment, product, daughter or adduct substances or ions which have a decimal mass or mass to charge ratio component which is between 0 to $x_1$ mDa or milli-mass to charge ratio units greater than said first decimal mass or mass to charge ratio component $m_1$ and/or between 0 to $x_2$ mDa or milli-mass to charge ratio units less than said first decimal mass or mass to charge ratio component $m_1$.

6. A method as claimed in claim 5, wherein said step of selecting for further analysis comprises:

(i) fragmenting said one or more second substances or ions; and/or (ii) onwardly transmitting said one or more second substances or ions which have a decimal mass or mass to charge ratio component which is between 0 to $x_1$ mDa or milli-mass to charge ratio units greater than said first decimal mass or mass to charge ratio component $m_1$ and/or between 0 to $x_2$ mDa or milli-mass to charge ratio units less than said first decimal mass or mass to charge ratio component $m_1$ to a collision fragmentation or reaction device.

7. A method of mass spectrometry comprising the steps of:

(a) passing parent or precursor ions to a collision, fragmentation or reaction device;

(b) operating said collision, fragmentation or reaction device in a first mode of operation wherein at least some of said parent or precursor ions are collided, fragmented or reacted to produce fragment, product, daughter or adduct ions;

(c) recording first mass spectral data relating to ions emerging from or which have been transmitted through said collision, fragmentation or reaction device operating in said first mode of operation;

(d) switching, altering or varying said collision, fragmentation or reaction device to operate in a second mode of operation wherein substantially fewer parent or precursor ions are collided, fragmented or reacted;

(e) recording second mass spectral data relating to ions emerging from or which have been transmitted through said collision, fragmentation or reaction device operating in said second mode of operation;

(f) repeating steps (b)-(e) a plurality of times;

(g) determining the accurate or exact mass or mass to charge ratio of one or more first parent or precursor substances or ions, wherein said accurate or exact mass or mass to charge ratio of said one or more first parent or precursor substances or ions comprises a first integer nominal mass or mass to charge ratio component $M_1$ and a first decimal mass or mass to charge ratio component $m_1$; and (h) searching for or determining one or more second parent or precursor substances or ions in or from said first mass spectral data, wherein said one or more second parent or precursor substances or ions comprise a second integer nominal mass or mass to charge ratio component $M_2$ and a second decimal mass or mass to charge ratio component $m_2$, and wherein said second decimal mass or mass to charge ratio component $m_2$ is between 0 to $x_1$ mDa or milli-mass to charge ratio units greater than said first decimal mass or mass to charge ratio component $m_1$ and/or between 0 to $x_2$ mDa or milli-mass to charge ratio units less than said first decimal mass or mass to charge ratio component $m_1$.

8. A method as claimed in claim 7, wherein said step of searching for or determining one or more second parent or precursor substances or ions comprises searching solely on the basis of said second decimal mass or mass to charge ratio component $m_2$ and not on the basis of said second integer nominal mass or mass to charge ratio component $M_2$.

9. A method as claimed in claim 7, wherein said step of searching for or determining one or more second parent or precursor substances or ions further comprises applying a decimal mass or mass to charge ratio window to said first mass spectral data and/or said second mass spectral data and/or a mass spectrum, wherein said decimal mass or mass to charge ratio window filters out, removes, attenuates or at least reduces the significance of second parent or precursor substances or ions having a second decimal mass or mass to charge ratio component $m_2$ which falls outside of said decimal mass or mass to charge ratio window.

10. A method as claimed in claim 7, further comprising selecting for further analysis one or more second parent or precursor substances or ions which have a decimal mass or mass to charge ratio component $m_2$ which is between 0 to $x_1$ mDa or milli-mass to charge ratio units greater than said first decimal mass or mass to charge ratio component $m_1$ and/or between 0 to $x_2$ mDa or milli-mass to charge ratio units less than said first decimal mass or mass to charge ratio component $m_1$.

11. A method as claimed in claim 10, wherein said step of selecting for further analysis comprises:

(i) fragmenting said one or more second parent or precursor substances or ions; and/or (ii) onwardly transmitting said one or more second parent or precursor substances or ions which have a second decimal mass or mass to charge ratio component $m_2$ which is between 0 to $x_1$ mDa or milli-mass to charge ratio units greater than said first decimal mass or mass to charge ratio component $m_1$ and/or between 0 to $x_2$ mDa or milli-mass to charge ratio units less than said first decimal mass or mass to charge ratio component $m_1$ to a collision, fragmentation or reaction device.

12. A method as claimed in claim 1, wherein said collision, fragmentation or reaction device comprises a Collision Induced Dissociation device, or said collision, fragmentation or reaction device is selected from the group consisting of: (i) a Surface Induced Dissociation ("SID") fragmentation device; (ii) an Electron Transfer Dissociation fragmentation device; (iii) an Electron Capture Dissociation fragmentation device; (iv) an Electron Collision or Impact Dissociation fragmentation device; (v) a Photo Induced Dissociation ("PID") fragmentation device; (vi) a Laser Induced Dissociation fragmentation device; (vii) an infrared radiation induced dissociation device; (viii) an ultraviolet radiation induced dissociation device; (ix) a nozzle-skimmer interface fragmentation device; (x) an in-source fragmentation device; (xi) an ion-source Collision Induced Dissociation fragmentation device; (xii) a thermal or temperature source fragmentation device; (xiii) an electric field induced fragmentation device; (xiv) a magnetic field induced fragmentation device; (xv) an enzyme digestion or enzyme degradation fragmentation device; (xvi) an ion-ion reaction fragmentation device; (xvii) an ion-molecule reaction fragmentation device; (xviii) an ion-atom reaction fragmentation device; (xix) an ion-metastable ion reaction fragmentation device; (xx) an ion-metastable molecule reaction fragmentation device; (xxi) an ion-metastable atom reaction fragmentation device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

13. A method as claimed in claim 1, further comprising ionising components, analytes or molecules in a sample to be analysed, using an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; and (xvii) a Thermospray ion source.

14. A mass spectrometer comprising:

a collision, fragmentation or reaction device;

a mass analyser; and a control system arranged and adapted to:

(a) pass parent or precursor ions to said collision, fragmentation or reaction device;

(b) operate said collision, fragmentation or reaction device in a first mode of operation wherein at least some of said parent or precursor ions are collided, fragmented or reacted to produce fragment, product, daughter or adduct ions;

(c) record first mass spectral data relating to ions emerging from or which have been transmitted through said collision, fragmentation or reaction device operating in said first mode of operation;

(d) switch, alter or vary said collision, fragmentation or reaction device to operate in a second mode of operation wherein substantially fewer parent or precursor ions are collided, fragmented or reacted;

(e) record second mass spectral data relating to ions emerging from or which have been transmitted through said collision, fragmentation or reaction device operating in said second mode of operation;

(f) repeat steps (b)-(e) a plurality of times;

(g) determine the accurate or exact mass or mass to charge ratio of one or more parent or precursor substances or ions, wherein said accurate or exact mass or mass to charge ratio of said one or more parent or precursor substances or ions comprise a first integer nominal mass or mass to charge ratio component $M_1$ and a first decimal mass or mass to charge ratio component $m_1$; and (h) search for or determine one or more fragment, product, daughter or adduct substances or ions in or from said first mass spectral data, wherein said one or more fragment, product, daughter or adduct substances or ions comprise a second integer nominal mass or mass to charge ratio component $M_2$ and a second decimal mass or mass to charge ratio component $m_2$, wherein said second decimal mass or mass to charge ratio component $m_2$ is between 0 to $x_1$ mDa or milli-mass to charge ratio units greater than said first decimal mass or mass to charge ratio component $m_1$ and/or between 0 to $x_2$ mDa or milli-mass to charge ratio units less than said first decimal mass or mass to charge ratio component $m_1$.

15. A mass spectrometer comprising:

a collision, fragmentation or reaction device;

a mass analyser; and a control system arranged and adapted to:

(a) pass parent or precursor ions to said collision, fragmentation or reaction device;

(b) operate said collision, fragmentation or reaction device in a first mode of operation wherein at least some of said parent or precursor ions are collided, fragmented or reacted to produce fragment, product, daughter or adduct ions;

(c) record first mass spectral data relating to ions emerging from or which have been transmitted through said collision, fragmentation or reaction device operating in said first mode of operation;

(d) switch, alter or vary said collision, fragmentation or reaction device to operate in a second mode of operation wherein substantially fewer parent or precursor ions are collided, fragmented or reacted;

(e) record second mass spectral data relating to ions emerging from or which have been transmitted through said collision, fragmentation or reaction device operating in said second mode of operation;

(f) repeat steps (b)-(e) a plurality of times;

(g) determine the accurate or exact mass or mass to charge ratio of one or more first parent or precursor substances or ions, wherein said accurate or exact mass or mass to charge ratio of said one or more first parent or precursor substances or ions comprise a first integer nominal mass or mass to charge ratio component $M_1$ and a first decimal mass or mass to charge ratio component $m_1$; and (h) search for or determine one or more second parent or precursor substances or ions in or from said first mass spectral data, wherein said one or more second parent or precursor substances or ions comprise a second integer nominal mass or mass to charge ratio component $M_2$ and a second decimal mass or mass to charge ratio component $m_2$, wherein said second decimal mass or mass to charge ratio component $m_2$ is between 0 to $x_1$ mDa or milli-mass to charge ratio units greater than said first decimal mass or mass to charge ratio component $m_1$ and/or between 0 to $x_2$ mDa or milli-mass to charge ratio units less than said first decimal mass or mass to charge ratio component $m_1$.

* * * * *